US012560084B2

(12) United States Patent
Hsu et al.

(10) Patent No.: US 12,560,084 B2
(45) Date of Patent: Feb. 24, 2026

(54) SYSTEM AND METHOD FOR CONTAMINATION MONITORING

(71) Applicant: Schlumberger Technology Corporation, Sugar Land, TX (US)

(72) Inventors: Kai Hsu, Sugar Land, TX (US); Thomas Pfeiffer, Katy, TX (US); Kang Wang, Houston, TX (US); Dan Schulz, Houston, TX (US); Morten Kristensen, Cambridge, MA (US); Youxiang Zuo, Burnaby (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 733 days.

(21) Appl. No.: 17/285,925

(22) PCT Filed: Oct. 17, 2019

(86) PCT No.: PCT/US2019/056754
§ 371 (c)(1),
(2) Date: Apr. 16, 2021

(87) PCT Pub. No.: WO2020/081825
PCT Pub. Date: Apr. 23, 2020

(65) Prior Publication Data
US 2021/0388721 A1     Dec. 16, 2021

Related U.S. Application Data

(60) Provisional application No. 62/746,600, filed on Oct. 17, 2018.

(51) Int. Cl.
E21B 49/08 (2006.01)
E21B 49/10 (2006.01)
(Continued)

(52) U.S. Cl.
CPC .......... E21B 49/0875 (2020.05); E21B 49/10 (2013.01); G01N 21/31 (2013.01);
(Continued)

(58) Field of Classification Search
CPC ...... E21B 49/0875; E21B 49/10; E21B 49/00; G01N 21/31; G01N 21/5907;
(Continued)

(56) References Cited

U.S. PATENT DOCUMENTS

| | | | |
|---|---|---|---|
| 6,301,959 B1 | 10/2001 | Hrametz et al. | |
| 6,343,507 B1 * | 2/2002 | Felling ................... | E21B 49/10 |
| | | | 175/5 |

(Continued)

FOREIGN PATENT DOCUMENTS

| | | | | |
|---|---|---|---|---|
| AU | 2010272254 A1 * | 2/2012 | ......... | E21B 49/0875 |
| CN | 101315030 B * | 5/2014 | ............. | E21B 49/10 |

(Continued)

OTHER PUBLICATIONS

Hsu et al. ("Multichannel Oil-Base Mud Contamination Monitoring Using Downhole Optical Spectrometer." Paper presented at the SPWLA 49th Annual Logging Symposium, Austin, Texas, May 2008, p. 1-13) (Year: 2008).*

(Continued)

*Primary Examiner* — Shelby A Turner
(74) *Attorney, Agent, or Firm* — Jeffrey D. Frantz

(57) ABSTRACT

A method includes receiving first fluid property data from a sample flowline of a focused sampling system and receiving second fluid property data from a guard flowline of the focused sampling system. The sample flowline and the guard flowline are each configured to sample formation fluid from a hydrocarbon reservoir, the formation fluid includes native formation fluid and a contaminant, and the first fluid property data includes an optical density of the native formation (Continued)

fluid and the second fluid property data includes an optical density of the contaminant

20 Claims, 36 Drawing Sheets

(51) Int. Cl.
$$\begin{array}{ll}
\textit{G01N 21/31} & (2006.01) \\
\textit{G01N 21/59} & (2006.01) \\
\textit{G01N 21/85} & (2006.01) \\
\textit{G01N 21/94} & (2006.01)
\end{array}$$

(52) U.S. Cl.
CPC ..... *G01N 21/5907* (2013.01); *G01N 21/8507* (2013.01); *G01N 21/94* (2013.01)

(58) Field of Classification Search
CPC .. G01N 21/8507; G01N 21/94; G01N 15/075; G01N 21/85; G01N 33/2823; G01N 15/06; G01N 1/14
See application file for complete search history.

(56) References Cited

U.S. PATENT DOCUMENTS

| | | | | |
|---|---|---|---|---|
| 8,024,125 | B2 | 9/2011 | Hsu et al. | |
| 8,271,248 | B2 * | 9/2012 | Pomerantz | E21B 49/00 |
| | | | | 703/10 |
| 8,434,356 | B2 * | 5/2013 | Hsu | E21B 49/0875 |
| | | | | 175/48 |
| 2005/0216196 | A1 | 9/2005 | Akkurt et al. | |
| 2006/0236758 | A1 * | 10/2006 | DiFoggio | E21B 49/005 |
| | | | | 73/152.55 |
| 2008/0073078 | A1 * | 3/2008 | Sherwood | E21B 49/10 |
| | | | | 166/264 |
| 2008/0156088 | A1 * | 7/2008 | Hsu | G01N 21/5907 |
| | | | | 702/11 |
| 2010/0155061 | A1 | 6/2010 | Zazovsky et al. | |
| 2012/0273194 | A1 * | 11/2012 | Verma | E21B 49/08 |
| | | | | 166/250.01 |
| 2013/0020480 | A1 | 1/2013 | Ford et al. | |
| 2015/0211363 | A1 * | 7/2015 | Pop | E21B 49/0875 |
| | | | | 73/152.28 |
| 2015/0267521 | A1 | 9/2015 | Ayan et al. | |
| 2016/0061743 | A1 * | 3/2016 | Wang | G01N 21/8507 |
| | | | | 356/70 |
| 2016/0090836 | A1 * | 3/2016 | Wang | E21B 49/08 |
| | | | | 702/12 |
| 2016/0130940 | A1 | 5/2016 | Hsu et al. | |
| 2016/0186559 | A1 * | 6/2016 | Wang | E21B 49/10 |
| | | | | 702/6 |
| 2016/0186562 | A1 * | 6/2016 | Lee | G06Q 50/02 |
| | | | | 702/6 |
| 2017/0152743 | A1 * | 6/2017 | Gisolf | E21B 47/12 |

FOREIGN PATENT DOCUMENTS

| | | | | |
|---|---|---|---|---|
| WO | WO-2006116088 | A1 * | 11/2006 | G01N 21/64 |
| WO | WO-2009064691 | A1 * | 5/2009 | E21B 49/08 |

OTHER PUBLICATIONS

Exam Report issued in United Kingdom Patent Application GB2105550.4 dated Mar. 29, 2022, 4 pages.

International Preliminary Report on Patentability issued in PCT Application PCT/US2019/056754 dated Apr. 29, 2021, 8 pages.

C. Del Campo, C. Dong, R. Vasques, P. Hegeman, Y. Yamate, "Advances in Fluid Sampling with Formation Testers for Offshore Exploration," OTC 18201, 2006. (10 pages).

P. Weinheber, R. Vasques, "New Formation Tester Probe Design for Low-Contamination Sampling," Paper Q, SPWLA 47th Annual Logging Symposium, Jun. 4-7, 2006. (11 pages).

M. O'Keefe, K.O. Eriksen, S. Williams, D. Stensland, R. Vasques, "Focused Sampling of Reservoir Fluids Achieves Undetectable Levels of Contamination," SPE 101084, 2006 (14 pages).

M. Kristensen , C. Ayan, Y. Chang, R. Lee, A. Gisolf, J. Leonard, P-Y. Corre, and H. Dumont, "Flow Modeling and Comparative Analysis for a New Generation of Wireline Formation Tester Modules," SPE-169341, May 2014 (16 pages).

M. A. Fischler, R. C. Bolles. Random Sample Consensus: A Paradigm for Model Fitting with Applications to Image Analysis and Automated Cartography. Comm. of the ACM, vol. 24, pp. 381-395, 1981.

International Search Report and Written Opinion issued in PCT Application PCT/US2019/056754 dated Feb. 12, 6 2020 (12 pages).

* cited by examiner

110

112

120

122

130

132

140

142

150

152

160

162

170

172

180

182

190

192

200

202

210

212

220 ⟍

222 ⟍

230

232

240

242

290 ⌐

310

312

320

360

400

402

410

412

430

432

440

SYSTEM AND METHOD FOR CONTAMINATION MONITORING

CROSS REFERENCE PARAGRAPH

This application is a National Stage Entry of International Application No. PCT/US2019/056754, filed Oct. 17, 2019, which claims the benefit of U.S. Provisional Application No. 62/746,600, entitled "SYSTEM AND METHOD FOR CONTAMINATION MONITORING," filed Oct. 17, 2018, the disclosure of which is hereby incorporated herein by reference.

BACKGROUND

This disclosure relates to determining and monitoring fluid contamination level and efficiency in downhole fluid analysis applications.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Reservoir fluid analysis may be used to better understand a hydrocarbon reservoir in a geological formation. Indeed, reservoir fluid analysis may be used to measure and model fluid properties within the reservoir to determine a quantity and/or quality of formation fluids—such as liquid and/or gas hydrocarbons, condensates (e.g., gas condensates), formation water, drilling muds, and so forth—that may provide much useful information about the reservoir. This may allow operators to better assess the economic value of the reservoir, obtain reservoir development plans, and identify hydrocarbon production concerns for the reservoir. A downhole acquisition tool may carry out reservoir fluid analysis by drawing in formation fluid and testing the formation fluid downhole or collecting a sample of the formation fluid to bring to the surface. Although native reservoir fluid (e.g., oil, gas, or water) from the hydrocarbon reservoir may be the fluid of interest for reservoir fluid analysis, fluids other than the native reservoir fluid may contaminate the native reservoir fluid. As such, the formation fluid obtained by the downhole acquisition tool may contain extraneous materials other than pure native reservoir fluid. Drilling muds, for example, may be used in drilling operations and may invade the formation and mix with the native reservoir fluid. The formation fluid drawn from the wellbore thus may be a mixture of native reservoir fluid and drilling mud filtrate.

SUMMARY

This summary is provided to introduce a selection of concepts that are further described below in the detailed description. This summary is not intended to identify key or essential features of the subject matter described herein, nor is it intended to be used as an aid in limiting the scope of the subject matter described herein. Indeed, this disclosure may encompass a variety of aspects that may not be set forth below.

In one example, a method includes receiving first fluid property data from a sample flowline of a focused sampling system and receiving second fluid property data from a guard flowline of the focused sampling system. The sample flowline and the guard flowline are each configured to sample formation fluid from a hydrocarbon reservoir, the formation fluid includes native formation fluid and a contaminant, and the first fluid property data includes an optical density of the native formation fluid and the second fluid property data includes an optical density of the contaminant. The method also includes combining optical density data from the sample flowline and the guard flowline, determining a derivative of the combined optical density data over a respective pumped volume of formation fluid through the sample flowline and the guard flowline, performing a linear analysis based on the combined optical density data and the derivative of the combined optical density to determine an intercept, and estimating a contamination profile of the formation fluid based on the intercept and the combined optical density data.

In another example, a focused sampling system includes a sample flowline that draws a native formation fluid from a hydrocarbon reservoir, a guard flowline that draws a contaminant fluid from the hydrocarbon reservoir, a sample sensor that generates first feedback indicative of a first optical density of the native formation fluid, a guard sensor that generates second feedback indicative of a second optical density of the contaminant fluid, and a controller communicatively coupled to the sample sensor and the guard sensor. The controller receives the first feedback and the second feedback, combines the first optical density of the native formation fluid and the second optical density of the contaminant fluid to generate combined optical density data, determines a derivative of the combined optical density data as a function of pumped volume of the native formation fluid and the contaminant fluid, performs linear analysis on the combined optical density data and the derivative of the combined optical density data to determine an intercept, and estimates a contamination profile based on the intercept and the combined optical density data.

In another example, a method includes receiving first fluid property data from a sample flowline of a focused sampling system and receiving second fluid property data from a guard flowline of the focused sampling system. The first fluid property data includes a plurality of first data points indicative of a first optical density of a native formation fluid as a function of pumped volume of the native formation fluid through the sample flowline. The second property data includes a plurality of second data points indicative of a second optical density of a contaminant fluid as a function of pumped volume of the contaminant fluid through the guard line. The method further includes combining the plurality of first data points and the plurality of second data points to generate combined data, calculating a derivative of the combined data over the pumped volume of the native formation fluid through the sample line, the pumped volume of the contaminant through the guard line, or both, performing linear analysis on the combined data and the derivative of the combined data to determine an intercept, receiving a measured optical density of the contaminant fluid, and estimating a contamination profile of the native formation fluid based on the intercept and the measured optical density of the contaminant fluid.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated examples may be incorporated into any of the above-described aspects of the present disclosure alone or in any combination. The brief summary presented above is intended to familiarize the reader with certain aspects and contexts of examples of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
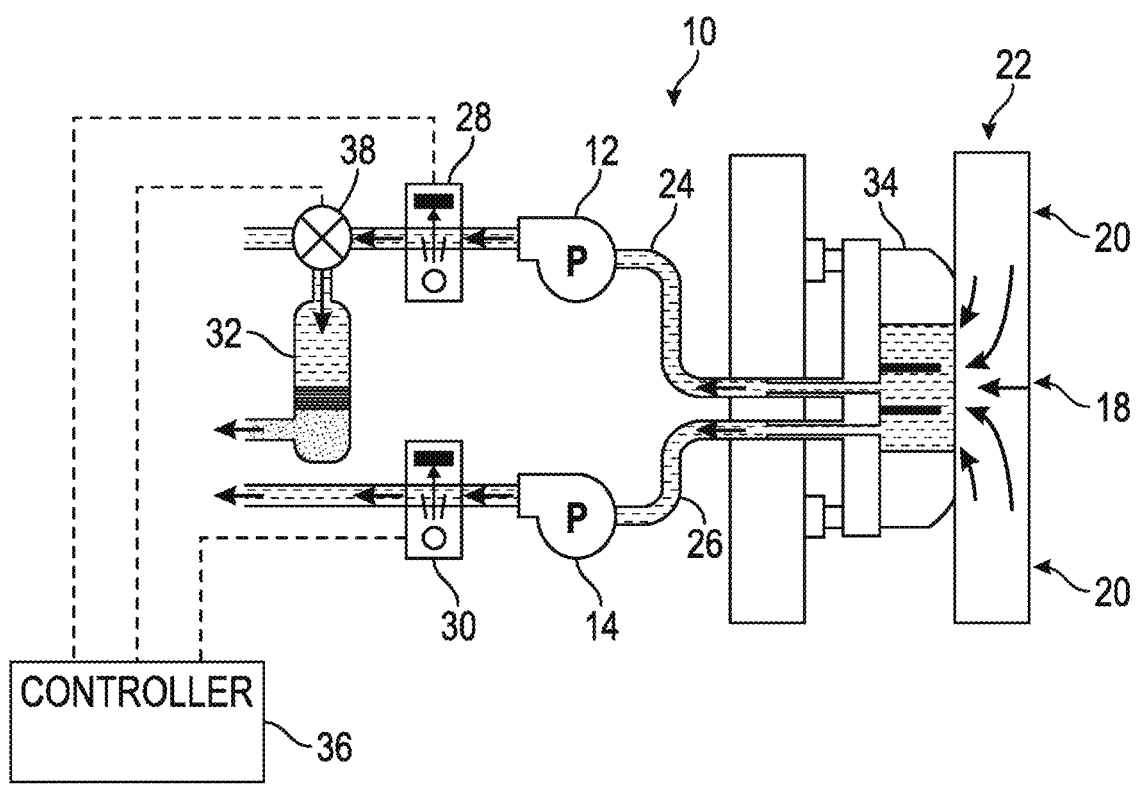
FIG. 1 is a schematic of a focused sampling system, in accordance with an example of the present techniques.

One or more specific example of the present disclosure will be described below. These described embodiments are examples of the presently disclosed techniques. Additionally, in an effort to provide a concise description of these example, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various example of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one example" or "an example" of the present disclosure are not intended to be interpreted as excluding the existence of additional example that also incorporate the recited features.

Contamination of formation fluid in a hydrocarbon reservoir may be caused by a filtrate of drilling mud that invades the formation surrounding a borehole within the hydrocarbon reservoir during and after drilling. Consequently, during downhole fluid analysis, a fluid sample taken by a downhole formation tester tool includes a mixture of the drilling mud (e.g., mud filtrate) and native fluid. Contamination of the native fluid may reduce a quality of the fluid sample, which decreases the accuracy of pressure/volume/temperature (PVT) analysis. In contamination monitoring, formation fluid pumped from the formation through a flow line is continuously analyzed using downhole fluid analysis until a desirable contamination level is reached. Once the desired contamination level is reached, the downhole formation tester tool extracts and captures the fluid sample. Recent advances in certain sampling techniques, such as focused sampling, have improved downhole fluid sampling by enabling a downhole formation tester to obtain uncontaminated (e.g., clean) fluid samples in a shorter amount of time compared to conventional techniques.

The present disclosure relates to systems and methods for estimating contamination level and determining efficiency of focused sampling tools used in downhole fluid analysis. It is now recognized that an asymptotic behavior of contamination profiles evolve into a power law trend with a fixed, but unknown, exponent if operation conditions do not undergo an abrupt change. An asymptotic trend and the contamination level may be determined and validated based on Eclipse simulation data of various focused and non-focused sampling tools. Real-time monitoring features may facilitate the effectiveness for quality control of results.

Additionally, the dynamic response of contaminated fluid flowing through flowlines of the sampling tool may provide information as to the efficiency of the sampling operations. As discussed in further detail below, integration of downhole fluid analysis data acquired in sample and guard flowlines of the sampling tool during pumping operations may be used to determine the efficiency of the sampling operations. Integration may include matching responses in both sample and guard flowlines, making this technique suitable for downhole formation testers having a dual-flowline spectrometer. Moreover, the disclosed system and methods may allow monitoring and controlling the efficiency of focused sampling operations while also adjusting a flow rate ratio between a sample pump and a guard pump. By knowing the efficiency of the sampling operations, contamination level in the sample flowline may be estimated with improved accuracy, thereby mitigating pitfalls associated with fitting power law models for extrapolation to obtain end point values of the native fluid and the mud filtrate.

FIG. 1 is a schematic of a focused sampling tool 10 in accordance with an example of the present disclosure. In the illustrated example, the focused sampling tool 10 includes two separate pumps (e.g., a first pump 12 and a second pump 14) to control fluid flow from a formation in a hydrocarbon reservoir 16 of interest through a central area 18 and a perimeter area 20 of a sampling zone 22. Fluid pumped through the central area 18 flows into a sample flowline 24, and fluid pumped through the perimeter area 20 flows into a guard flowline 26. Fluid cleanup process is monitored during the sampling operation using optical spectrometers on both the sample flowline (e.g., a sample optical spectrometer 28) and the guard flowline (e.g., a guard optical spectrometer 30). Optical measurements obtained from the optical spectrometers 28, 30 may allow an operator of the focused sampling tool 10 to control operation of the focused sampling tool 10. For example, the operator may adjust pump flow rates and filling of sample bottles 32 of the focused sampling tool when a desirable contamination level has been reached. In certain examples, the focused sampling tool 10 may include a 3D radial probe 34, which improves the operating envelope of fluid sampling by using multiple fluid drains spaced circumferentially around the focused sampling tool 10. Accordingly, the focused sampling tool 10 may sample fluid in low mobility formations and sustain a high pressure differential.

In some examples, the focused sampling tool 10 includes a controller 36 that is communicatively coupled to the sample optical spectrometer 28, the guard optical spectrometer 30, and/or a valve 38 that is disposed along the sample flowline 24. The controller 36 receives feedback from the sample optical spectrometer 28 and/or the guard optical spectrometer 30 to perform the calculations of the presently disclosed method for estimating contamination of the formation fluid. The controller 36 may then utilize the estimate of the contamination of the formation fluid to adjust the valve 38. For example, the valve 38 may be adjusted between an open position that enables formation fluid from the sample flowline 24 to enter and/or fill the sample bottle 32 and a closed position that blocks formation fluid from the sample flowline 24 from entering the sample bottle 32. As such, the controller 36 may determine the estimate of the contamination of the formation fluid and adjust the valve 38 from the closed position to the open position when the estimate of the contamination of the formation fluid falls below a threshold value that is suitable for sampling.

Figure 2:
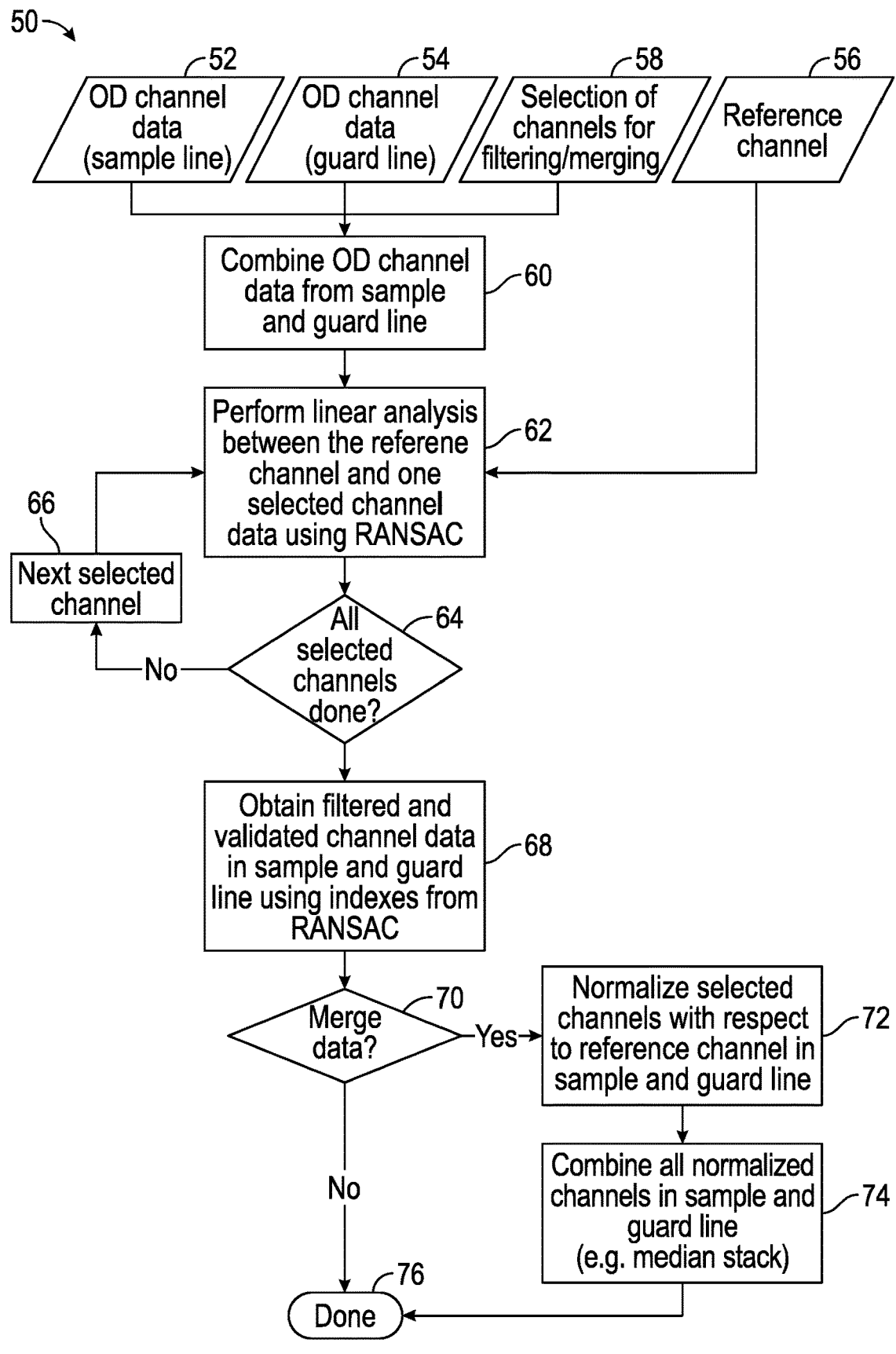
FIG. 2 is a flow diagram of a method for a preprocessing step used to validate, filter, and merge data, in accordance with an example of the present techniques.

Data from multiple sensors used to monitor the sampled fluid in the sample flowline follow linear mixing laws. For example, optical data follows the Beer-Lambert law. Similarly, measured density ($\rho$) is linearly related to a density of the native formation fluid (e.g., uncontaminated formation fluid) and a density of the mud filtrate (e.g., contaminate, drilling mud) by the same mixing law. Other measured fluid properties such as conductivity in water sampling follows a similar linear mixing law with the contamination as the weighting factor. Based on the linear mixing law, the cross-plot of any two data channels would exhibit a linear relationship and, therefore, this characteristic can be used to select valid data (e.g., data satisfying the linear mixing law) prior to subsequent processing. For example, an in-situ fluid analyzer ("IFA") example of a preprocessing step includes the following steps: 1.) automatic determination of valid data; 2.) filter and exclude noisy data (e.g., scatterings, spiky noise caused by sample bottle opening, etc.); and 3.) extrapolate filtered data to determine end point properties of the native formation fluid and the mud filtrate. This preprocessing step may be carried out using any suitable algorithm such as the RANSAC algorithm, which is capable of automatically detecting valid data that follows a linear trend. By way of non-limiting example, an example of a workflow 50 of the preprocessing step that includes validating, filtering, and combining measured data is illustrated in FIG. 2. In the illustrated example, measured optical density (OD) data from the sample flowline 52 and measured OD data from the guard flowline 54 are combined into a single reference channel 56 using a median stack. Otherwise, the validated data and filtered multi-channel data are available for subsequent processing.

For instance, channels for filtering/merging 58 the measured OD data from the sample flowline 52 and the measured OD data from the guard flowline 54 are chosen. Subsequently, the measured OD data from the sample flowline 52 and the measured OD data from the guard flowline 54 are combined at each of the selected channels for filtering/merging 58 the data, as shown at block 60. At block 62, the RANSAC algorithm is utilized to perform linear analysis between the reference channel 56 and one of the selected channels for filtering/merging 58 the data. The RANSAC algorithm is performed iteratively for each of the selected channels for filtering/merging 58 the data, as shown at blocks 64 and 66. Once linear analysis has been performed for each of the selected channels for filtering/merging 58 the data, filtered and/or validated channel data from the sample flowline 24 and the guard flowline 26 is obtained from indexes determined from the RANSAC algorithm, as shown at block 68. A determination of whether to merge the filtered and/or validated data is made based on the data from the sample flowline 24 and the data the guard flowline 26 having similar responses, trends, and/or patterns, as shown at block 70. If the data is to be merged, the data from each of the selected channels for filtering/merging 58 the data is normalized with respect to the reference channel, as shown at block 72. At block 74, the normalized data from each of the channels for filtering/merging 58 the data is combined in a median stack. If it is determined that the data is not to be merged and/or after combining the normalized data at block 74, the process ends, as shown at block 76.

Figure 3:
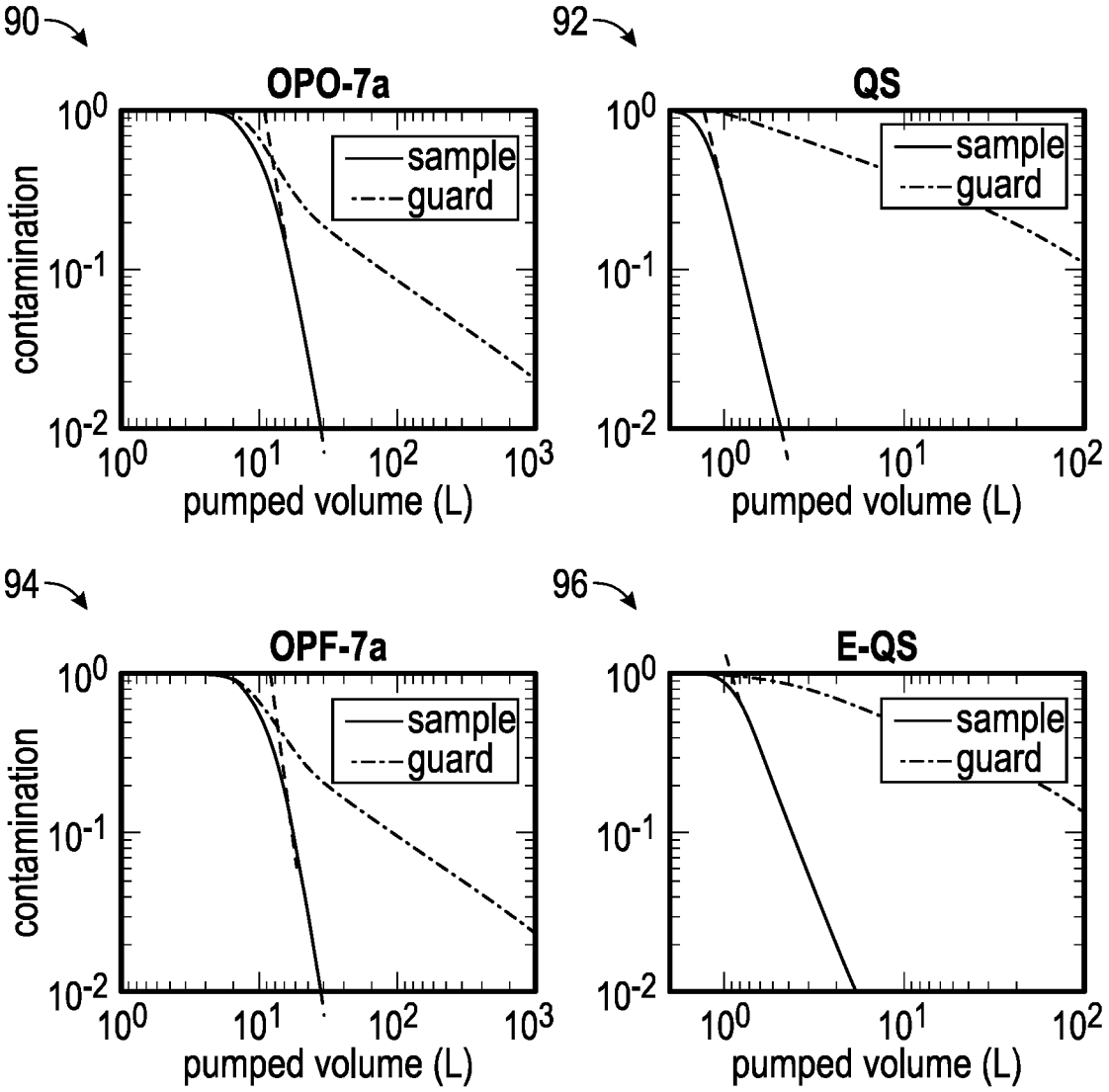
FIG. 3 illustrates example plots illustrating simulated evolution of sample and guard line contamination versus the pumped volume using the focused OPD-7a packer (top-left), the focused Quick-silver (QS) probe (top-right), the focused OPF-7a packer (bottom-left), and the focused Elliptical Quick-silver (E-QS) probe (bottom-right), in accordance with an example of the present techniques.

Eclipse model simulations for focused sampling probes may be used to simulate certain aspects of a hydrocarbon reservoir. Information obtained from the simulations may suggest that the evolution of contamination profiles (versus pumped volume) for the focused sampling probe 10 asymptotically approaches a power law trend with a fixed, but unknown, exponent if the operation condition (e.g., flow rate or drawdown pressure) does not change abruptly. The trend may be established when the level of contamination in the flowline 24, 26 approaches a low value. FIG. 3 illustrates various plots that simulate evolution of sample flowline 24 and guard flowline 26 contamination as a function of the pumped volume using various focused sampling tools. For example, plot 90 of FIG. 3 illustrates the evolution of the sample flowline 24 and the guard flowline 26 contamination as a function of the pumped volume for a focused OPF packer. Sample and guard profiles are plotted in a log-log scale and therefore, a straight line approximation (e.g. dash lines) on the plot 90 indicates a power law model with a fixed exponent. Note that the evolution of contamination profiles in the sample flowline 24 and the guard flowline 26 does not initially follow a power law with a fixed exponent. However, the contamination in the sample flowline 24 quickly develops into a fixed-exponent power law trend when the contamination level drops to approximately 10-15 percent. In comparison, the contamination level in the guard flowline 26 appears to take a longer time compared to the sample flowline 24 to develop into a fixed-exponent power law trend. Other focused sampling tools also appear to have a similar observation, as shown in plot 92 of FIG. 3 corresponding to a focused Quick-silver (QS) probe, plot 94 corresponding to a focused OPF-7a packer, and plot 96 corresponding to a focused Elliptical Quick-silver (E-QS) probe. The dashed line in each plot is representative of a linear trend approximation to the sample contamination profile.

From the simulation shown in FIG. 3, drawbacks of the simulations may be apparent. For example, in the aforementioned approach, a user selects the fitting interval and fits the data (e.g. OD data) in the selected interval with a fixed-exponent power law model. However, the selection of the interval by the user may be subjective. Moreover, the data in the selected interval may not be prescribed by a fixed-exponent power law model, as shown in the simulations in FIG. 3. Consequently, depending on a selection window, the data-fitting and extrapolation scheme in the preprocessing may lead to variations in end point estimation. As such, the contamination level estimated based on the simulations may be inaccurate.

While the fixed-exponent trend is developed in the sample flowline 24, the exponent itself is still an unknown variable. Therefore, the value of the fixed exponent is estimated. Additionally, based on the plots illustrated in FIG. 3, a region of linear trend is also unknown. In some cases, the trend begins between approximately 10-15 percent contamination in the sample flowline 24 (e.g., as shown in the plot 90 and the plot 94 of FIG. 3). However, in other cases, the trend begins between approximately 30-40 percent contamination (e.g., the plot 92 and the plot 96 of FIG. 3). As described in further detail below, the system and method disclosed herein may be used to determine estimation of contamination end point values even though the value of an exponent and the region of the linear trend are unknown.

As discussed above, the exponent of power-law for evolving contamination is unknown in focused sampling and can vary with different probes and formation and operating conditions. However, the exponent may develop into a trend of fixed-exponent power law model asymptotically in the sample flowline 24. Therefore, sample-line data, which closely follow a fixed-exponent power law model, can be represented as $$OD = C\, Dv^{-\alpha} \qquad \text{EQ. 1}$$

where C and D are unknown constants, v is pumped volume, and α is the unknown fixed exponent. Some manipulation of EQ. 1 may simplify EQ. 1. For example, taking a derivative of OD with respect to v, results in the following relationship:

$$\frac{dOD}{dv} = \alpha Dv^{-\alpha-1} \qquad \text{EQ. 2}$$

Substituting EQ. 2 into EQ. 1, yields the following relationship:

$$OD = C\frac{1}{\alpha}\frac{dOD}{dv}v \qquad \text{EQ. 3}$$

Notably, EQ.3 does not depend on the unknown parameter D as is in EQ. 1 and 2. Furthermore, the relationship of OD versus dOD/dv*v is linear from which a linear fitting may be performed to obtain the unknown parameter C (e.g., native formation fluid end point) and α (e.g., exponent). For contamination estimation, we are interested in the end point value which is C, i.e. the intersect of OD versus dOD/dv*v.

The disclosed method includes calculating the OD derivative with respect to the pumped volume, v. A numerical differentiation is known to be unstable and sensitive to noise. In the disclosed examples, the OD-vs-volume data that is locally around $v_0$ is estimated using the following second-order polynomial model:

$$OD(v) = a + b(v\ v) + c(v\ v_0)^2,\ v_0\frac{v_w}{2} \le v \le v_0 + \frac{v_w}{2} \qquad \text{EQ. 4}$$

where OD(v) is the OD-vs-volume response, $v_0$ and $v_w$ are the center and size of a local volume window. Specifically, the local volume window slides through the OD-vs-volume data and at each location (specified by $v_0$) the data within the local volume window are fitted with the model expressed in EQ. 4. Once the fitting is complete, "a" represents the filtered/smoothed data at $v_0$ whereas "b" and "c" are related to the first and second derivative of the optical signal response at $v_0$, respectively, as expressed below in EQ. 5-7.

$$OD(v_0) = a \qquad \text{EQ. 5}$$

$$\frac{dOD}{dv}\bigg|_{v=v_0} = b \qquad \text{EQ. 6}$$

$$\frac{d^2OD}{dv^2}\bigg|_{v=v_0} = 2c \qquad \text{EQ. 7}$$

The method disclosed herein may use the relationship of OD data versus dOD/dv*v data, where the OD data are the filtered/smoothed data (i.e., a) and dOD/dv is the first order derivative data (i.e., b) to derive a model that may be used to estimate a contamination level of the formation fluid when using downhole fluid analysis.

In certain examples, the fitting may use the weighted least-squares (WLS) criterion expressed in EQ. 8 below.

$$\min_{a,b,c}\sum_{v=v_0-v_w/2}^{v=v_0+v_w/2}W(v)(M(v)\ OD(v))^2 \qquad \text{EQ. 8}$$

where M(v) is the measured optical signal versus volume data and W(v) is the weighting factor for the squared residuals. Introducing weighting factors in EQ. 8 is important because it allows noisy data or data with unexpected fluctuations to be down-weighted, while estimating the unknown parameters a, b and c. In certain examples, the weighting can be set to zero to completely disregard data that is unsuitable (e.g., noisy).

Furthermore, since the least-squares criterion is not effective in removing the spiky noise or outliers in the data, a robust scheme based on the least-absolute error criterion (e.g., $L_1$-norm) expressed in EQ. 9 may be used.

$$\min_{a,b,c} \sum_{v=v_0-v_w/2}^{v=v_0+v_w/2} W(v)|M(v) \ OD(v)| \qquad \text{EQ. 9}$$

Fitting the data with the $L_1$-norm in EQ. 9 may be accomplished (e.g., solving the parameters a, b and c) using an iterative re-weighted least-squares (IRWLS) algorithm. The weighted factor $W(v)$ in EQ. 9 may be effectively combined with the weighting factors computed in the IRWLS iteration, and therefore, may not introduce extra computational burden.

Following fitting of the data, end points for the native formation fluid may be estimated based on EQ. 3 by the intercept (e.g., C) of a linear approximation to the OD versus dOD/dv*v data, provided the data have reached the region with a fixed exponent. The ECLIPSE simulation results may provide an indication that the trend occurs in the sample flowline 24 when the contamination level drops to below 10-15 percent. The linear model may be fit to recently available OD versus dOD/dv*v data without knowing whether the contamination level falls into the region of a fixed exponent. This fitting may be done using a weighted least-squares (WLS) algorithm, as described above. The weighed least-squares process may assign higher weights to the most recent data points in the WLS fitting. When the contamination level is high, the estimated intercept may likely be in error. Accordingly, as a result, the estimated contamination level is inaccurate. However, with further pumping, the contamination may be reduced, and the accuracy of the estimated intercept may reach a value close to the true end point, and consequently, the difference between the estimated and true contamination may be small (e.g. <1 percent). Based on the simulation results, this may occur when the flowline contamination is in the range of 5-10 percent. In other words, with a target contamination level of 5 percent or less to sample, the estimated contamination based on the proposed technique may potentially be quite close to the true contamination.

EXAMPLES

Figure 4:
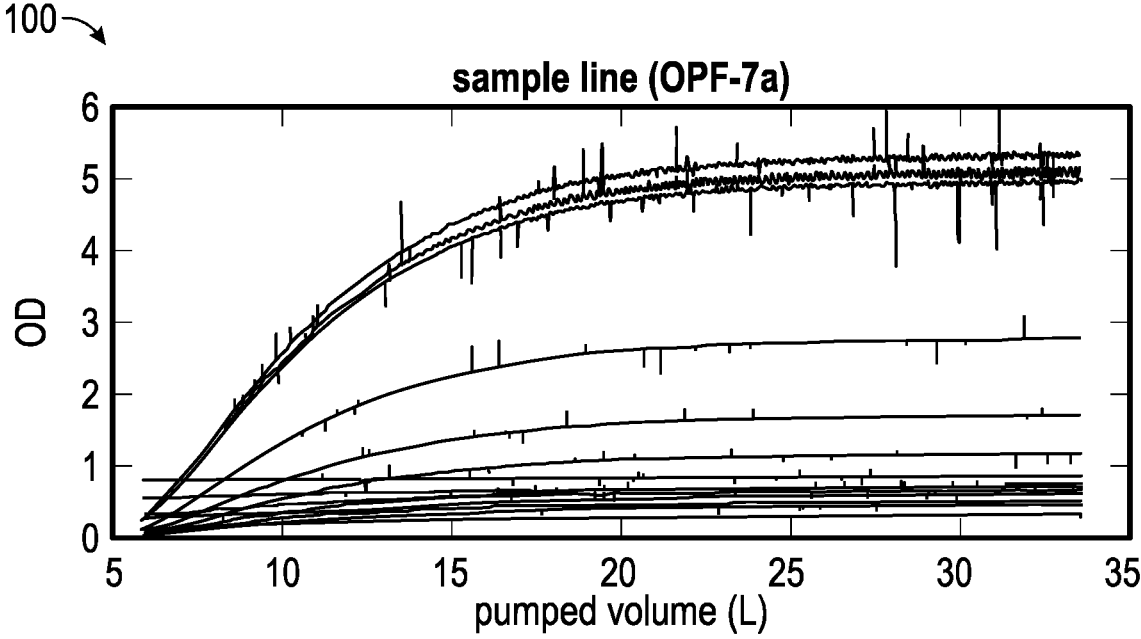
FIG. 4 illustrates example plots illustrating simulated 20-channel optical spectrometer data in the sample flowline (top) and guard flowline (bottom) using the OPF-7a focused sampling contamination profiles in FIG. 3, in accordance with an example of the present techniques.
Figure 4:
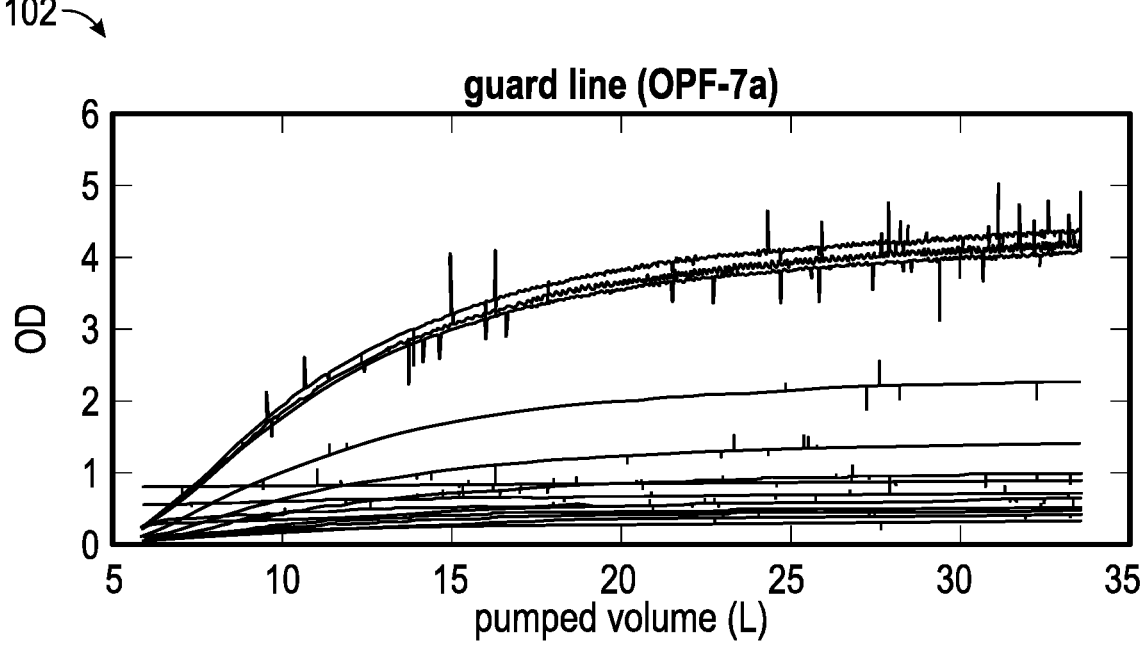

The disclosed method and system may use the ECLIPSE simulation results, as discussed in detail below. For example, the first example disclosed herein uses results from a focused sampling system, OPF-7a (plot 94 shown in FIG. 3), with the following fluid and formation parameters: horizontal permeability (kh)=10 millidarcy (md); vertical permeability (kv)/kh=1; oil based mud (OBM) viscosity=1 centipoise (cp), density=0.855 gram/cubic centimeter (g/cc); formation oil=1 cp, density=0.855 g/cc; Invasion depth=4 inches (in.); formation porosity=0.2, wellbore diameter=8.5 in. Accordingly, the 20-channel optical spectrometer data in the sample flowline 24 and the guard flowline 26 obtained using the OPF-7a focused sampling contamination profiles may be generated using the OPF-7a focused sampling contamination profiles shown in FIG. 3, as shown in FIG. 4. As illustrated in FIG. 4, the simulated 20-channel optical spectrometer data in the sample flowline 24 is shown in plot 100 and plot 102 illustrates the simulated 20-channel optical spectrometer data in the guard flowline 26. The simulated data may be generated using the linear mixing rule (e.g., Beer-Lambert Law) using a crude oil and OBM filtrate spectra generated in a laboratory as the end-point values. In one example, noise may be added to the simulated data.

Figure 5:
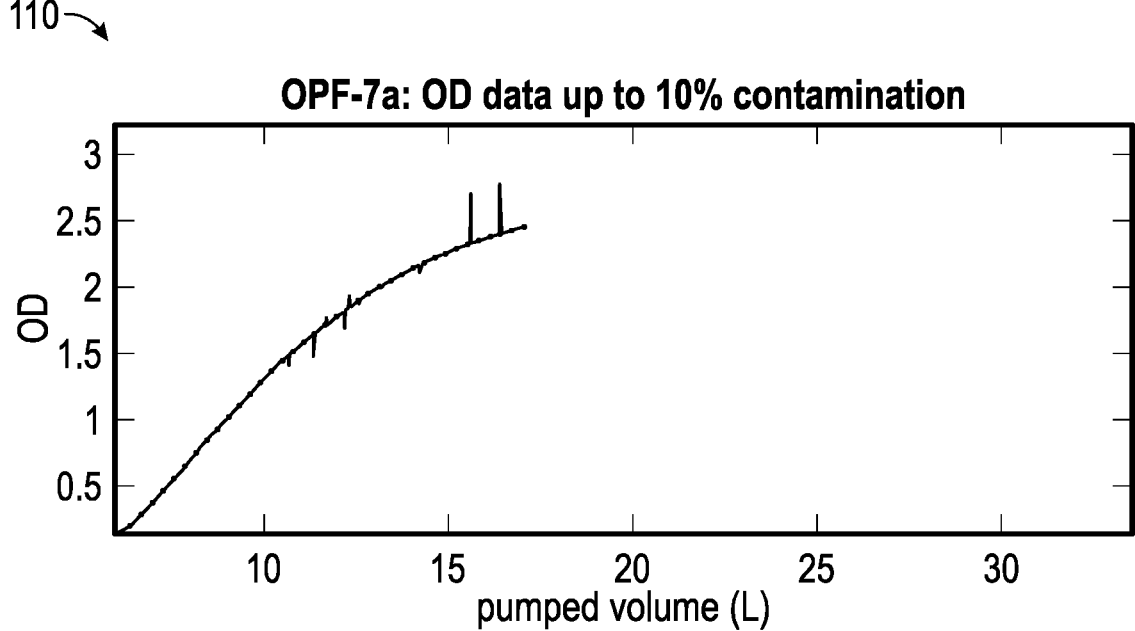
FIG. 5 illustrates example plots illustrating the OD channel data (at the wavelength channel of 1070 nm) in the sample line with the latest contamination level reaching at about 10% (top) and the derivative of OD with respect to pumped volume (i.e. dOD/dv) (bottom), in accordance with an example of the present techniques.
Figure 5:
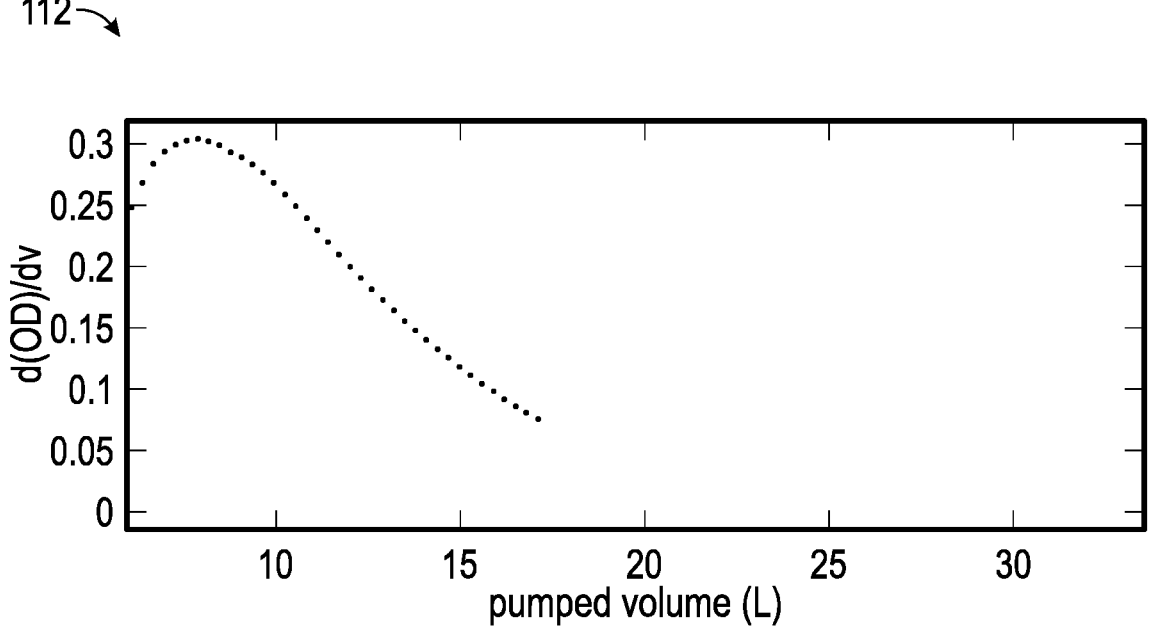
Figure 6:
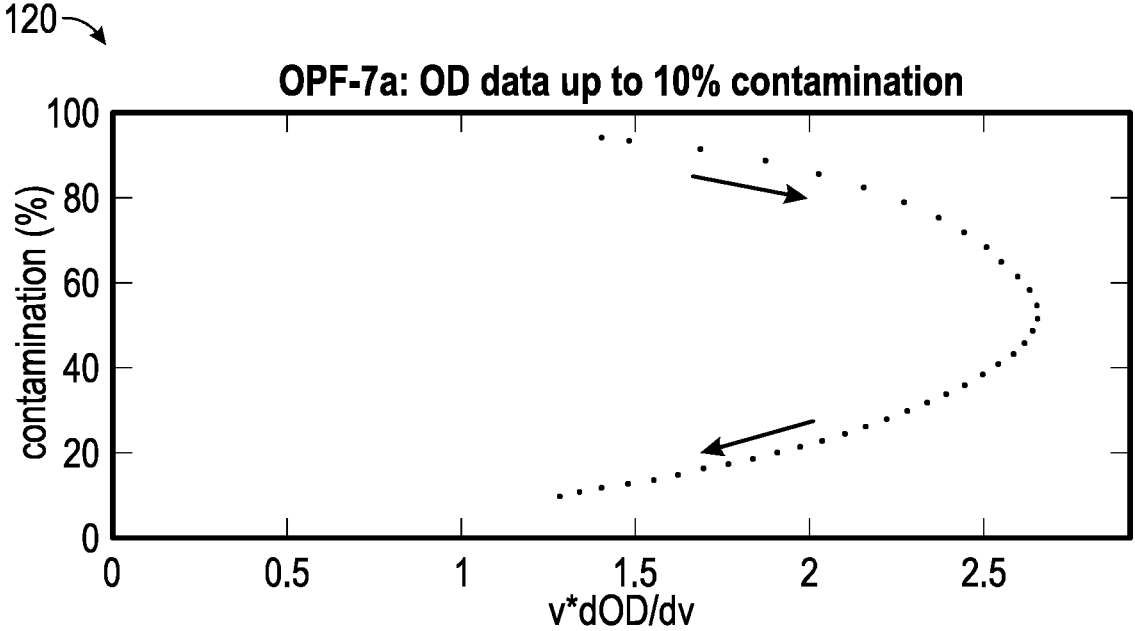
FIG. 6 illustrates example plots illustrating the contamination versus computed v*dOD/dv for the data shown in FIG. 4 (top) and the OD versus computed v*dOD/dv (bottom), in accordance with an example of the present techniques.
Figure 6:
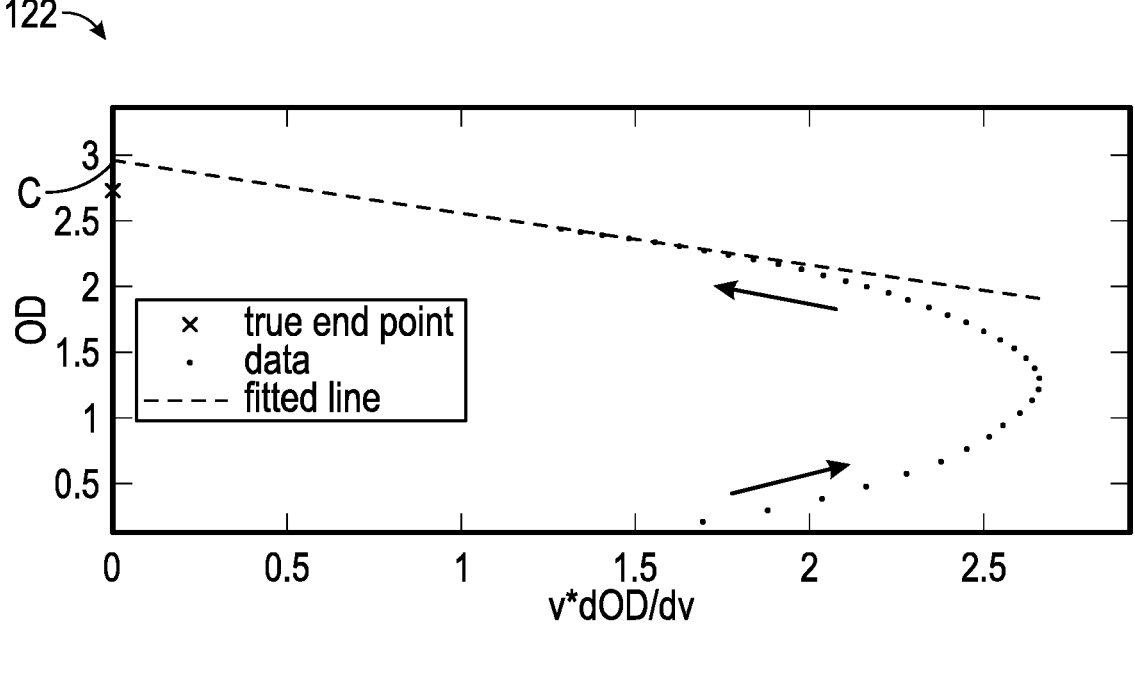
Figure 7:
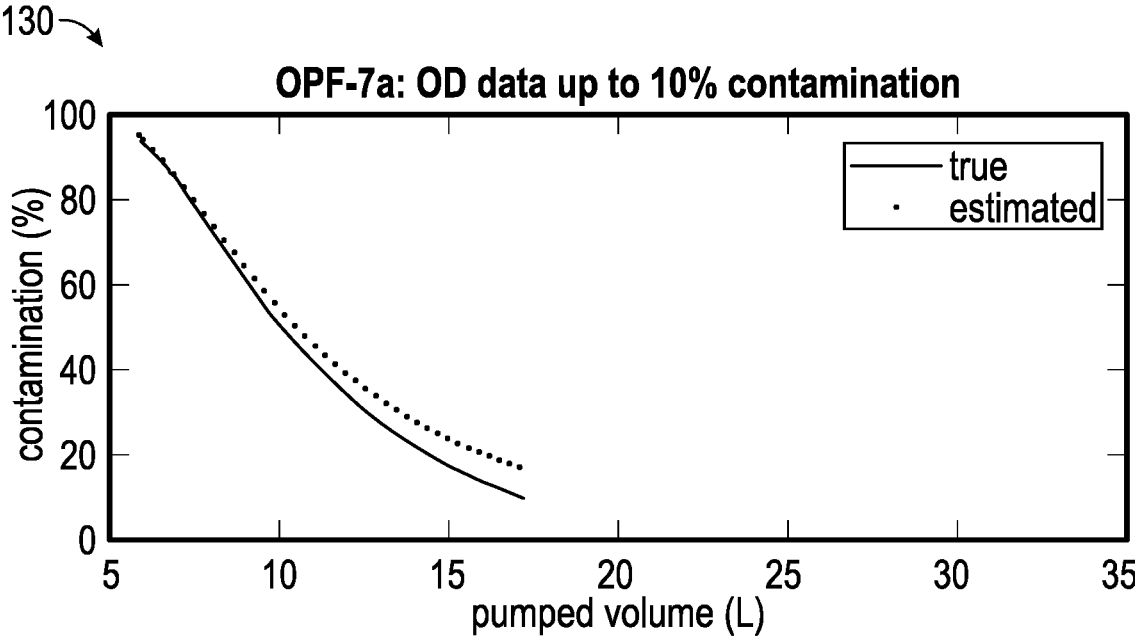
FIG. 7 illustrates example plots illustrating the estimated contamination (e.g., dots) based on the estimated end-point value (e.g., intercept C in FIG. 6) versus the true contamination in the sample flowline (top) and a difference between the estimated end-point value and the true contamination (bottom), in accordance with an example of the present techniques.
Figure 7:
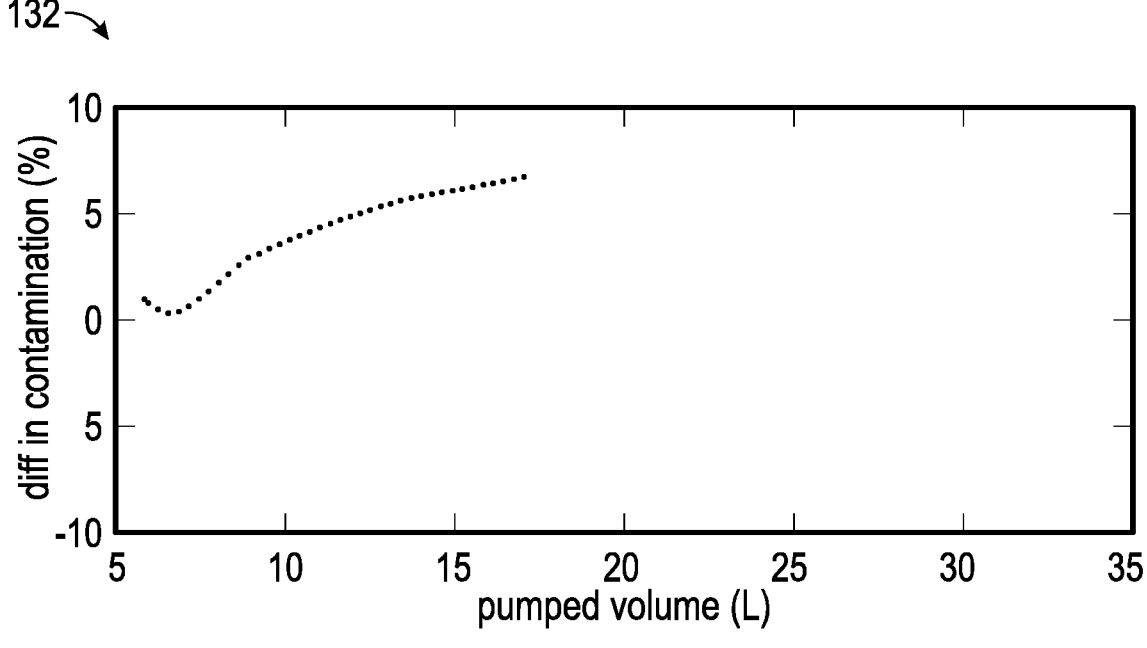

FIGS. 5-7 illustrate step-by-step results of an example of the disclosed method that uses the OD data up to 10 percent contamination. For example, in FIG. 5, plot 110 illustrates OD channel data (at a wavelength channel of 1070 nm) in the sample flowline 24 with the latest contamination level reaching about 10 percent. The data points on the data curve (e.g., solid line) is calculated filtered/smoothed data at decimated locations using the algorithm disclosed herein. Plot 112 is the corresponding derivative of OD with respect to pumped volume (i.e. dOD/dv). With respect to FIG. 6, plot 120 illustrates contamination versus computed v*dOD/dv for the data shown in FIG. 4. The arrows illustrated in the plot 120 indicate increasing pumped volume. As illustrated, at the end (e.g., a point indicating a maximum amount of pumped volume), the data reaches the contamination level of 10 percent. Plot 122 illustrates the OD versus computed v*dOD/dv. The data points shown in the plot 122 are used to fit a straight line approximation based on the weighted least-squares criterion, which makes the line closely follow the most recent data points. In this example, the intercept (e.g., the estimated end point) of the straight line is still somewhat off the true end-point value (e.g., represented by the "X") because the fixed exponent trend has not been fully developed yet. Plot 130 illustrated in FIG. 7 shows the estimated contamination (e.g., data points) based on the estimated end-point value (e.g., intercept C in FIG. 6) versus the true contamination in the sample flowline 24. The difference between the estimated end-point value and the true contamination is clearly shown, and reaches approximately 6 percent, as shown in plot 132. This may be caused by the inaccurate end point estimate. However, with further pumping, improvement may be seen when the contamination level becomes lower in the sample flowline 24.

Figure 8:
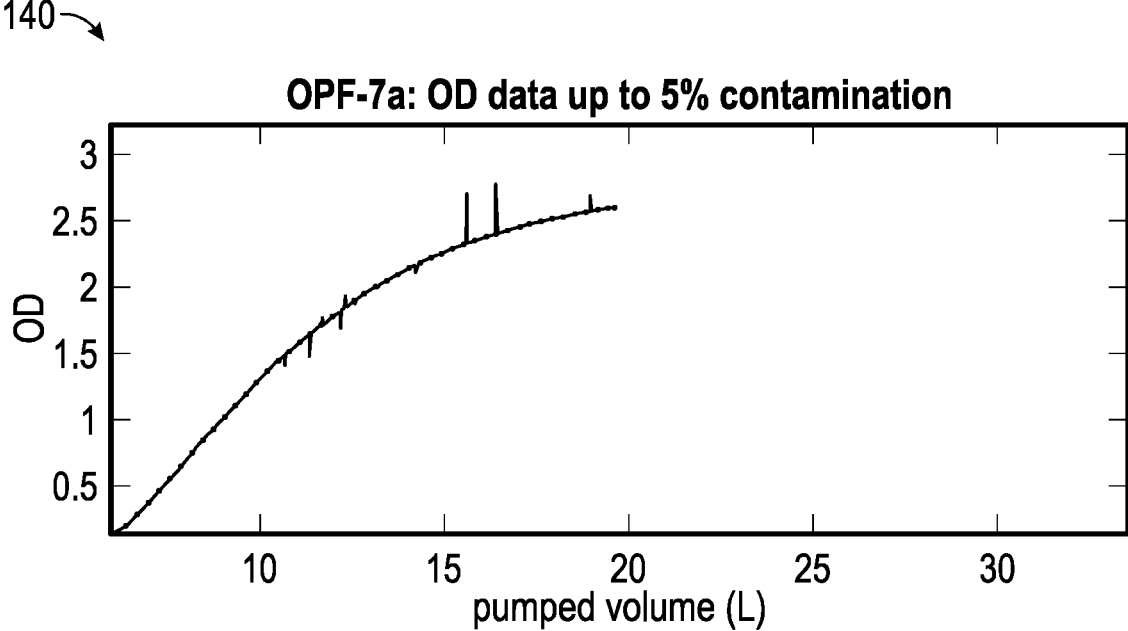
FIG. 8 illustrates example plots illustrating the OD channel data in the sample line with the latest contamination level reaching at about 5 percent (top) and the derivative of OD with respect to pumped volume (e.g., dOD/dv) (bottom), in accordance with an example of the present techniques.
Figure 8:
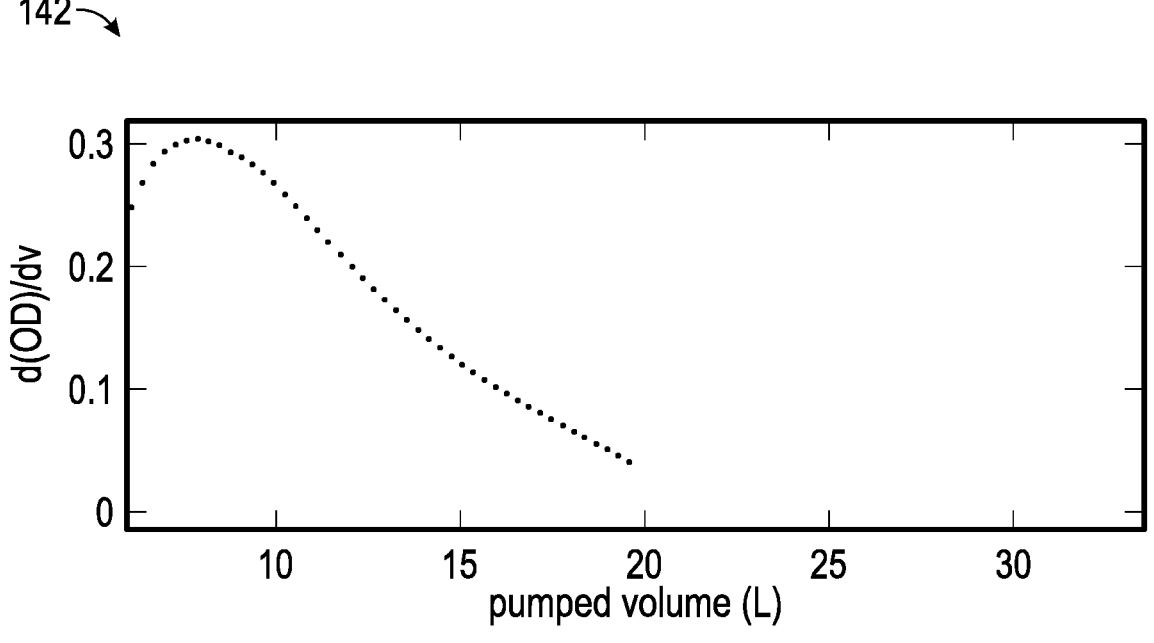
Figure 9:
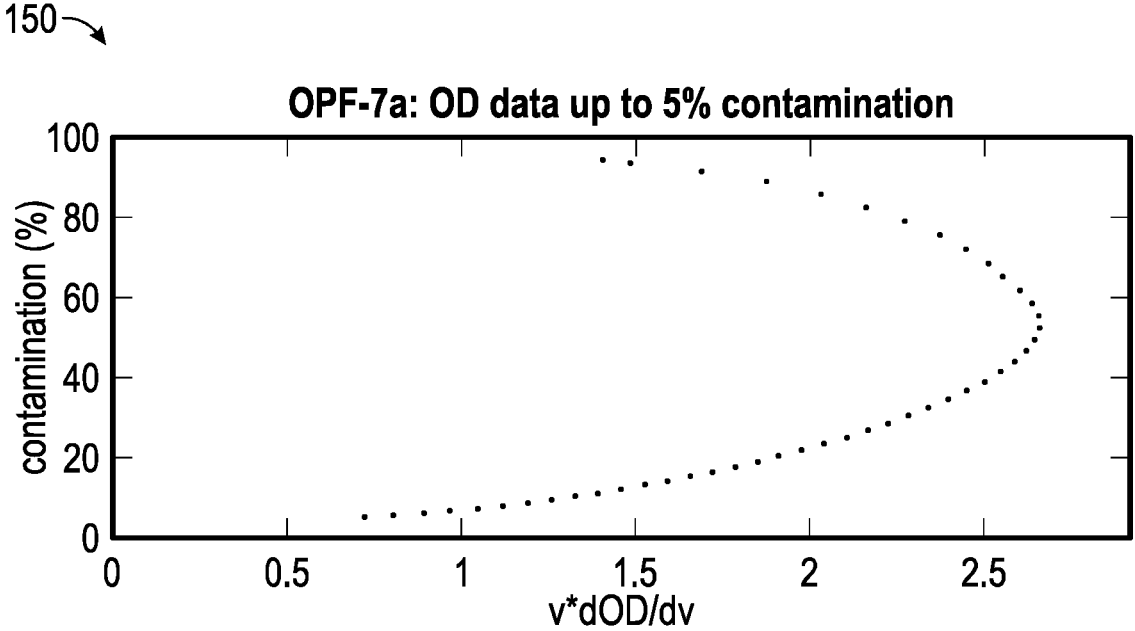
FIG. 9 illustrates example plots illustrating the contamination versus computed v*dOD/dv for the data shown in FIG. 6 (top) and the OD versus computed v*dOD/dv (bottom), in accordance with an example of the present techniques.
Figure 9:
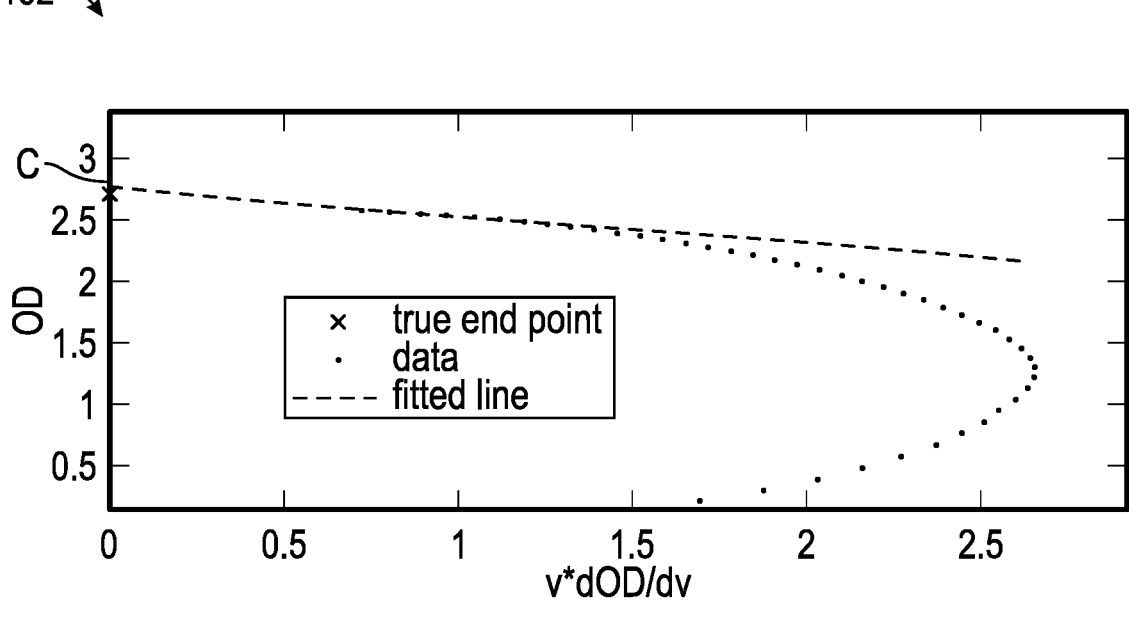
Figure 10:
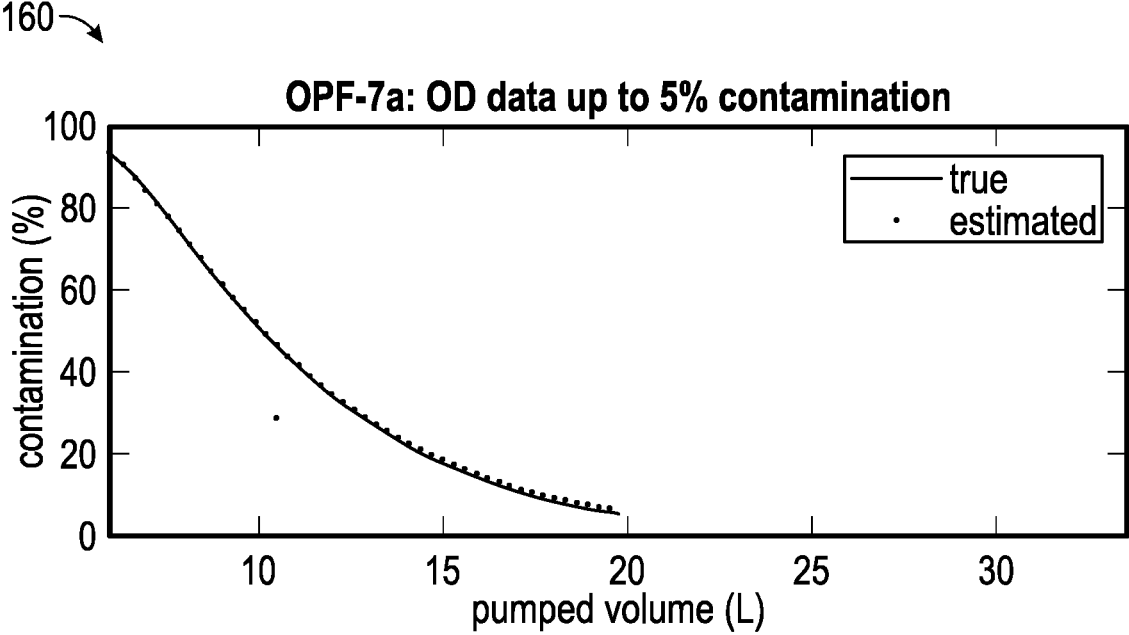
FIG. 10 illustrates example plots illustrating the true contamination in the sample line versus the estimated contamination (e.g., dots) which is obtained using the intercept C from FIG. 9 (top) and a difference between the estimated end-point value and the true contamination (bottom), in accordance with an example of the present techniques.
Figure 10:
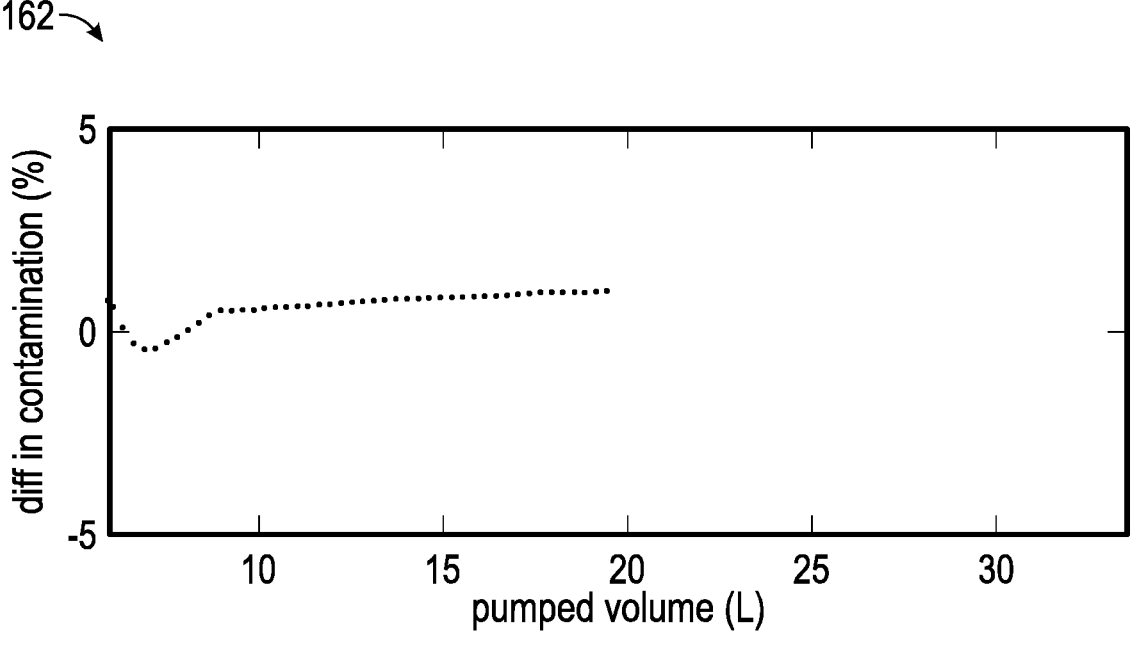

For comparison, FIGS. 8-10 illustrate a similar step-by-step result using data up to 5 percent contamination. In this particular example, improvement in the accuracy of the contamination estimate with low contamination data in the sample flowline 24, which asymptotically approaches a power law trend with a fixed exponent, is seen. Specifically, for the latter case (e.g., data up to 5 percent contamination), the difference between the estimate and true contamination is less than 1 percent. As shown in plot 140 illustrated in FIG. 8, with increased pumping (e.g., pumped volume), the OD channel data in the sample flowline 24 with the latest contamination level reaches about 5 percent. The data points may be calculated filtered/smoothed at the decimated locations up to the 5 percent contamination level. Shown on plot 142 is the corresponding derivative of OD with respect to pumped volume (i.e. dOD/dv). The data shown in FIG. 9 is similar to that shown in FIG. 6 except that more data points are becoming available because of continuous pumping to achieve the contamination level of 5 percent. The data points shown in plot 150 of FIG. 9 are the linear approximation to the recent data points based on the weighted least-squares criterion. In this particular example, the intercept (e.g., the estimated end point) of the straight line is substantially close to the true end-point value, as shown in plot 152 of FIG. 9. Plot 160 of FIG. 10 shows the true contamination (e.g., solid line) in the sample flowline versus the estimated contamination (e.g., dots) that is obtained using the intercept C from FIG. 9. The difference between the true contamination and the estimated contamination is small (i.e. less than 1 percent), as shown in plot 162. Accordingly, as shown in FIG. 10, the accuracy of the contamination estimate determined using the disclosed method with lower contamination data in the flowline, which approaches a power law trend with fixed exponent, may be improved. Specifically, for the latter example, the difference between the estimate and true contamination is less than approximately 1 percent.

Figure 11:
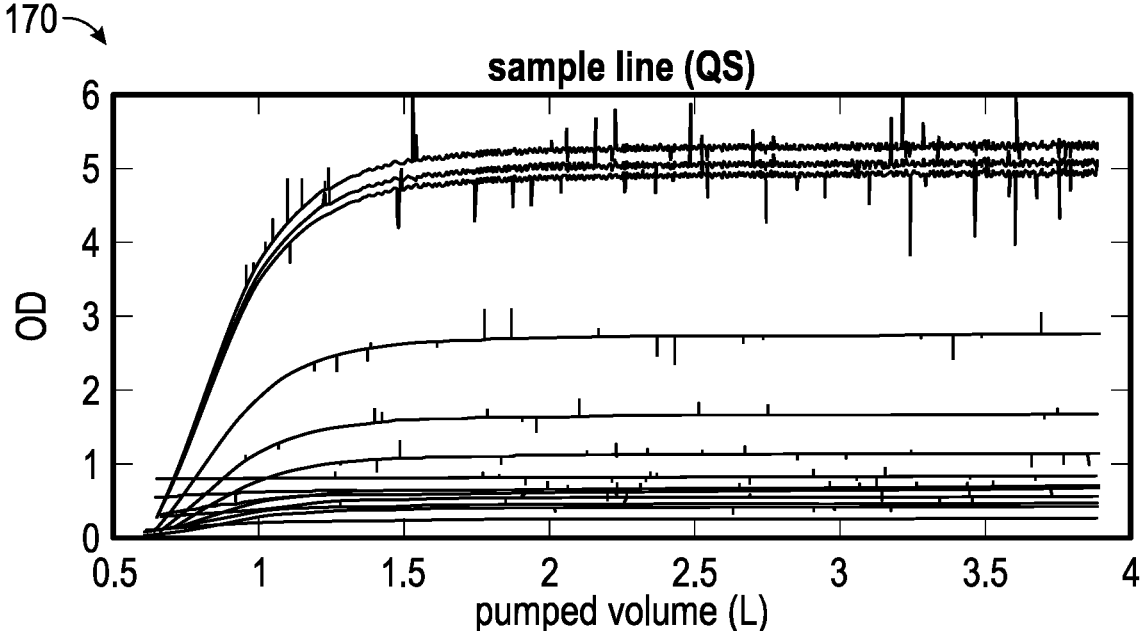
FIG. 11 illustrates example plots of simulated 20-channel optical spectrometer data of the sample flowline (top) and the guard flowline (bottom) using the Quick-silver (QS) focused sampling contamination profiles of FIG. 3, in accordance with an example of the present techniques.
Figure 11:
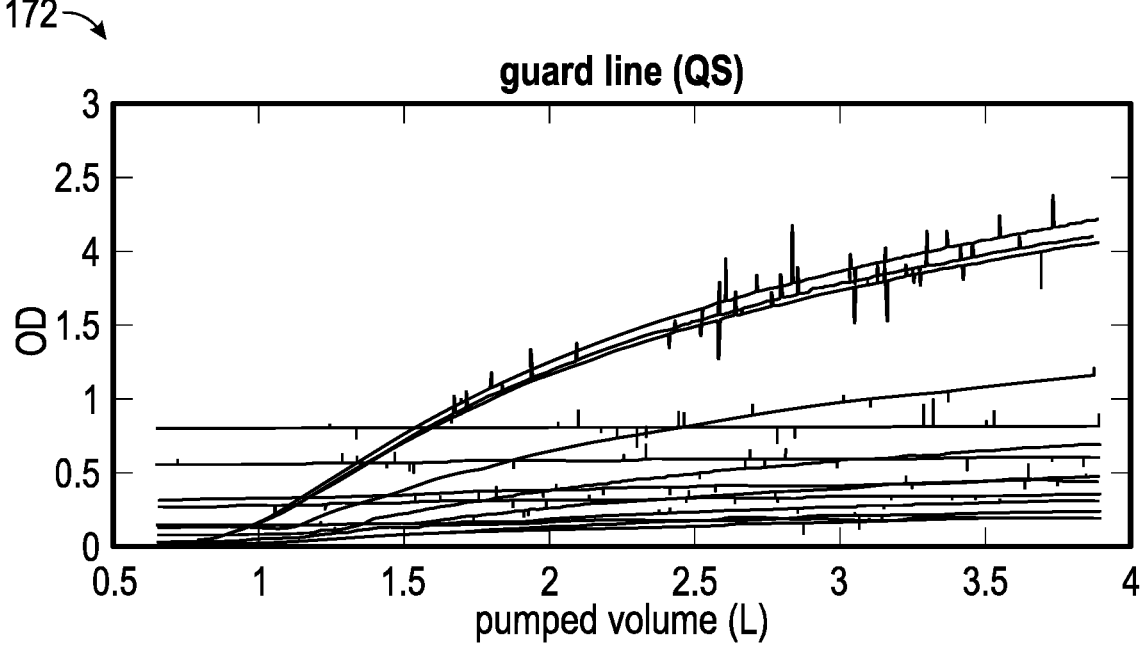
Figure 12:
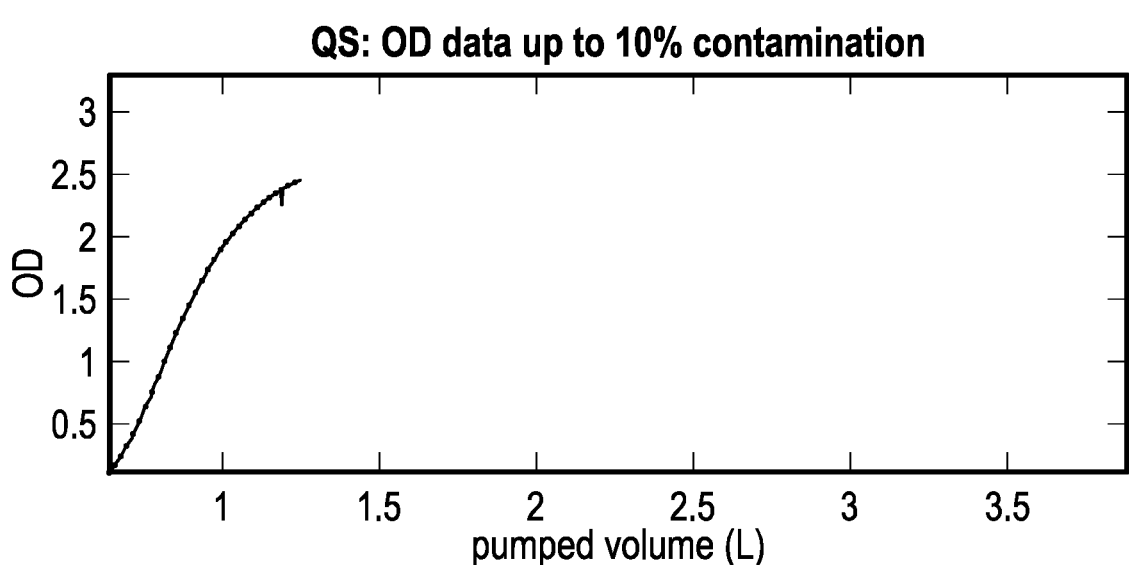
FIG. 12 illustrates example plots of the QS OD channel data (at the wavelength channel of 1070 nm) in the sample flowline with the latest contamination level reaching approximately 10 percent (top) and the corresponding derivative of OD with respect to pumped volume (i.e. dOD/dv) (bottom), in accordance with an example of the present techniques.
Figure 12:
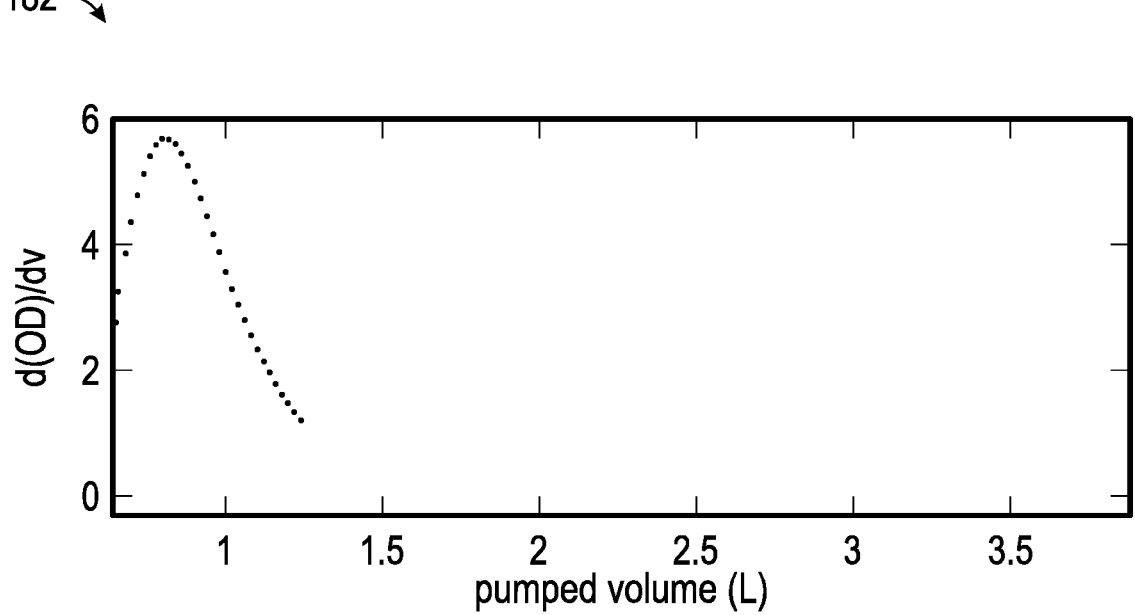
Figure 13:
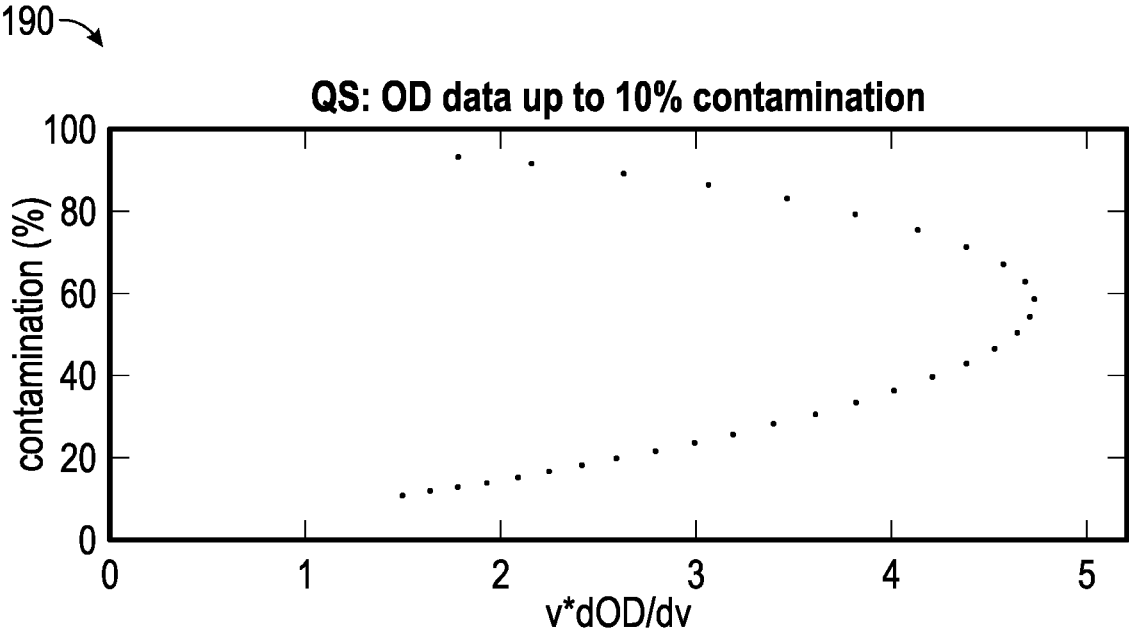
FIG. 13 illustrates example plots illustrating contamination versus computed v*dOD/dv for the QS data (up to 10 percent contamination) shown in FIG. 4 (top) and the OD versus computed v*dOD/dv (bottom); in accordance with an example of the present techniques.
Figure 13:
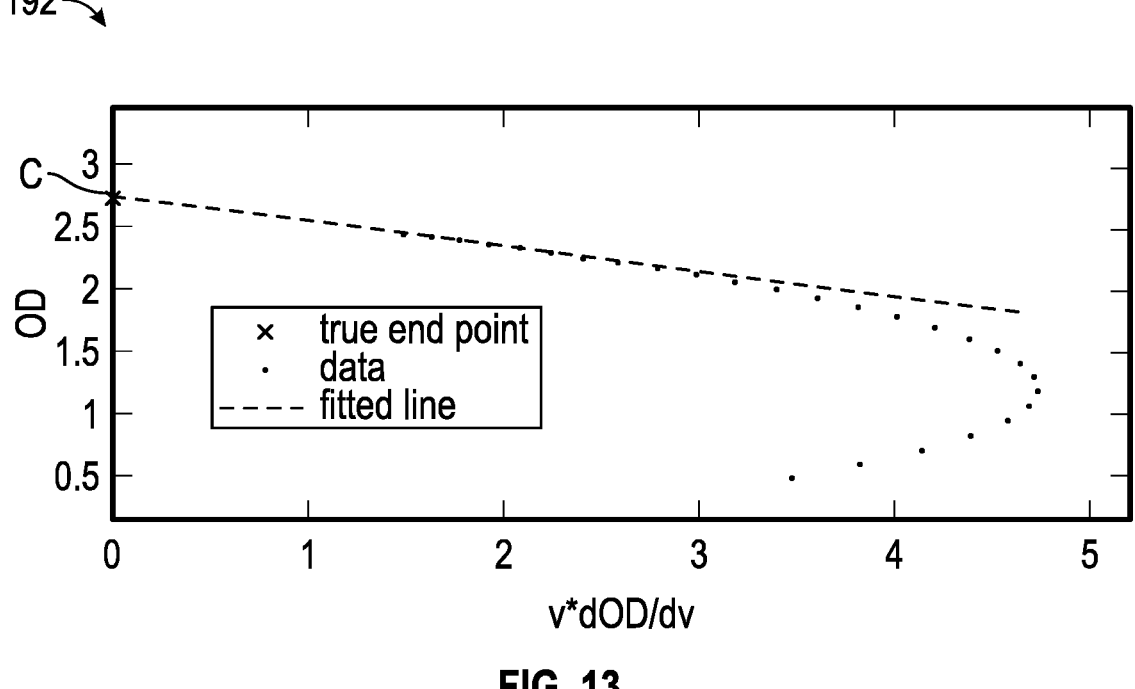
Figure 14:
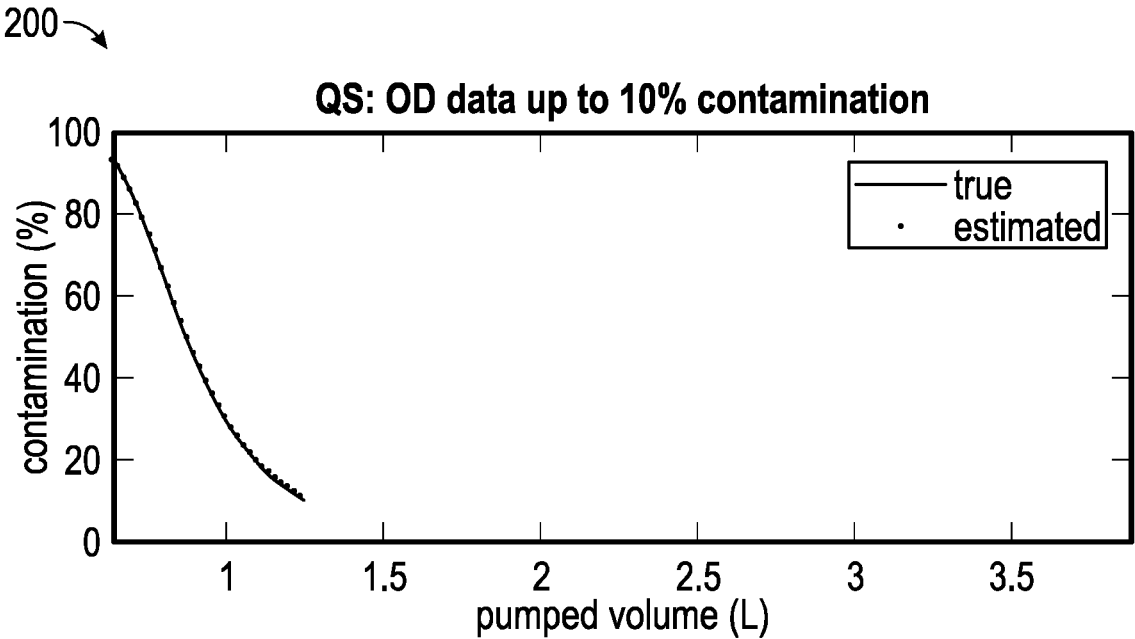
FIG. 14 illustrates example plots illustrating the true contamination in the sample flowline versus the estimated contamination (e.g., dots) which is obtained using the intercept C in FIG. 13 (top) and a difference between the estimated contamination and the true contamination (bottom), in accordance with an example of the present techniques.
Figure 14:
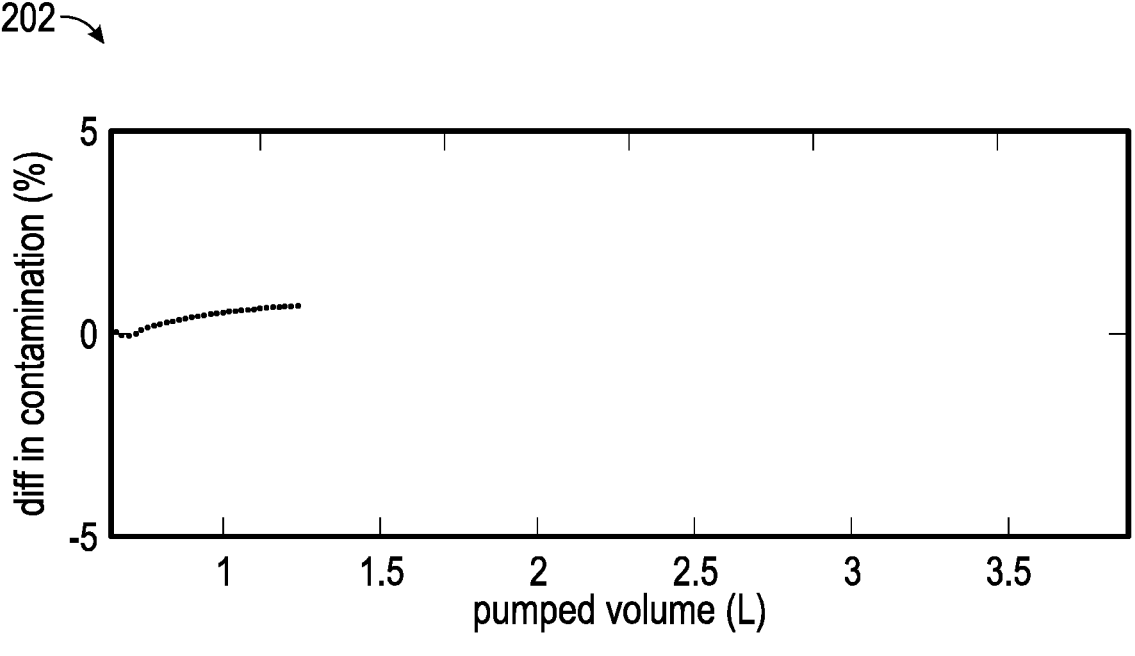
Figure 15:
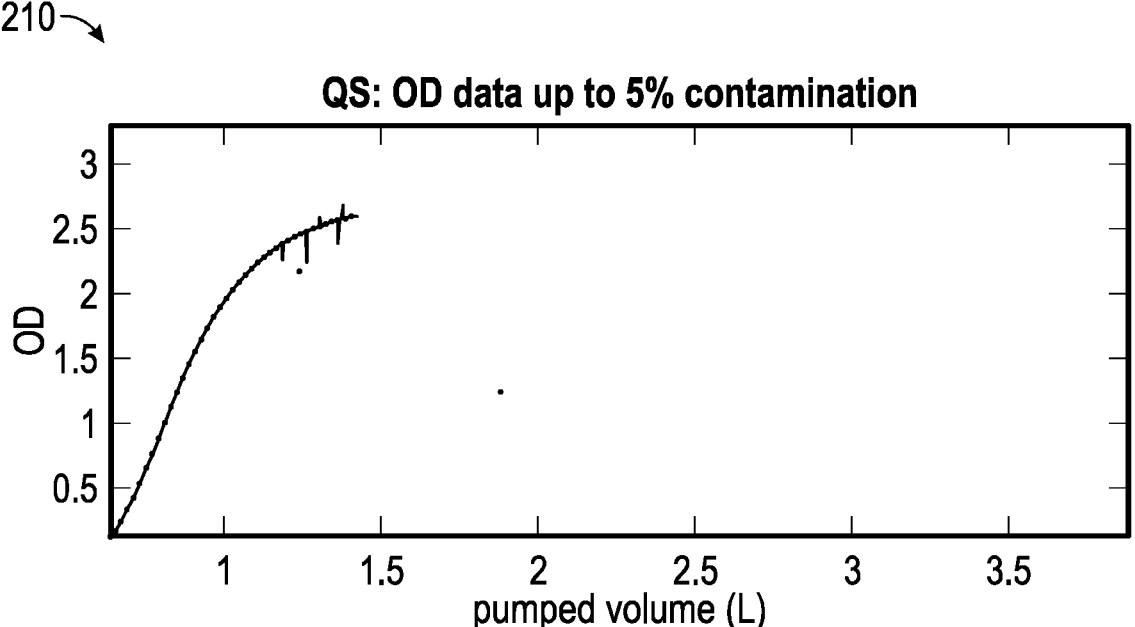
FIG. 15 illustrates example plots illustrating the QS OD channel with the latest contamination level reaching approximately 5 percent (top) and the corresponding derivative of OD with respect to pumped volume (e.g., dOD/dv) (bottom), in accordance with an example of the present techniques.
Figure 15:
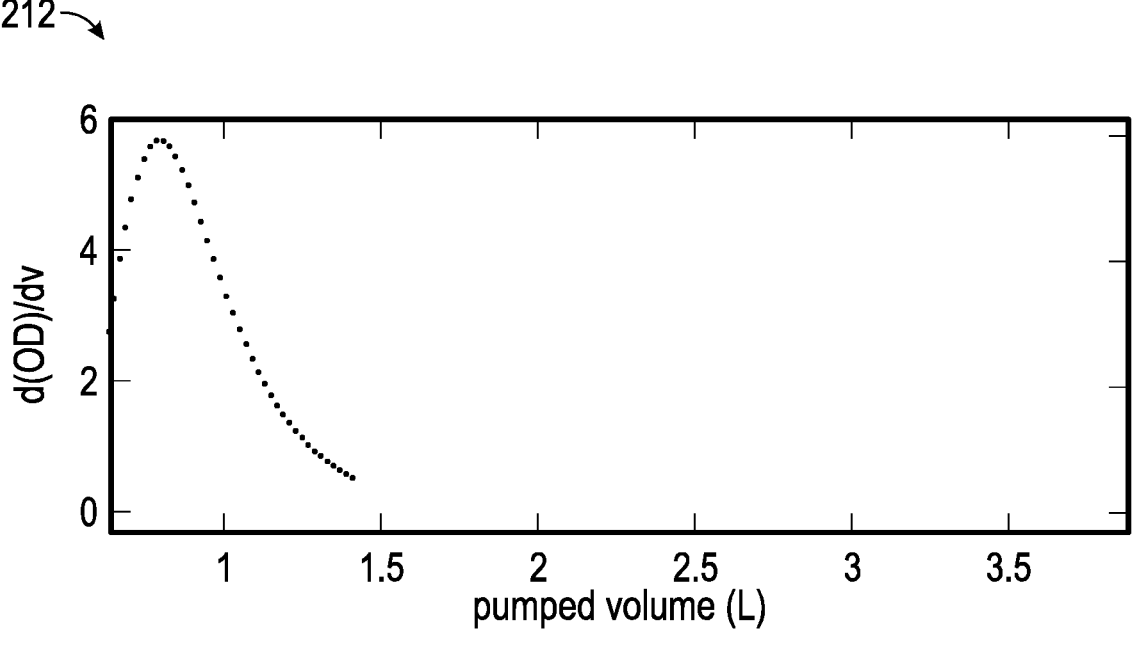
Figure 16:
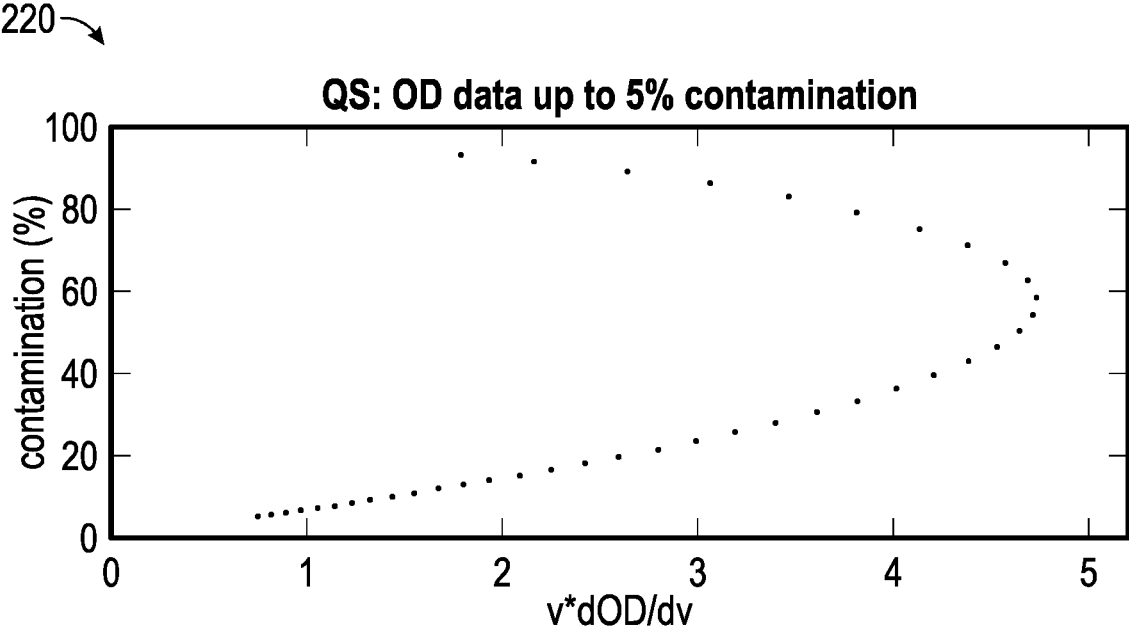
FIG. 16 illustrates example plots illustrating contamination versus computed v*dOD/dv for the QS data (up to 5 percent contamination) shown in FIG. 4 (top) and the OD versus computed v*dOD/dv (bottom), in accordance with an example of the present techniques.
Figure 16:
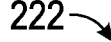
Figure 16:
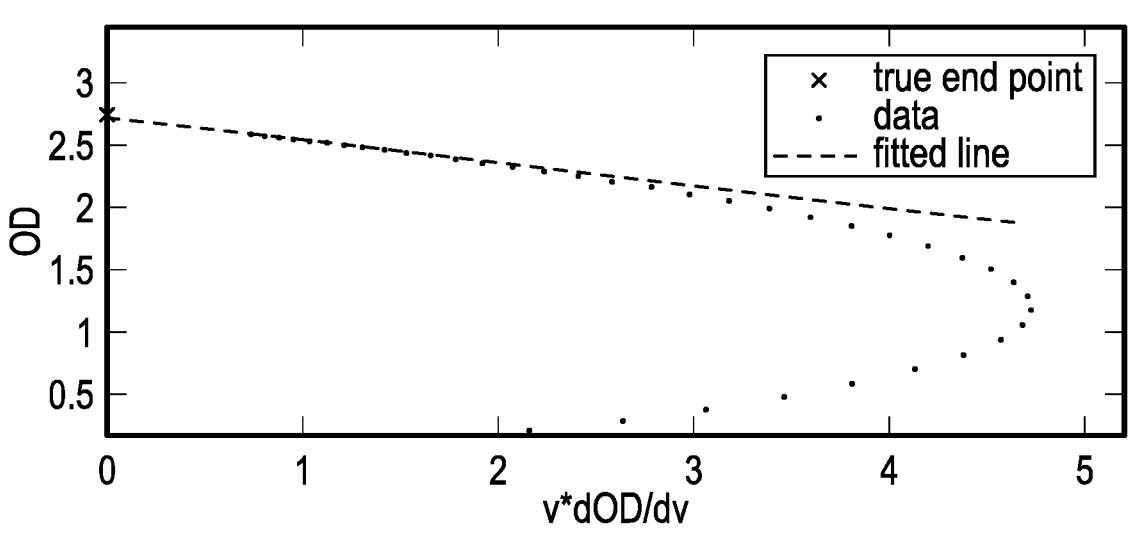
Figure 17:
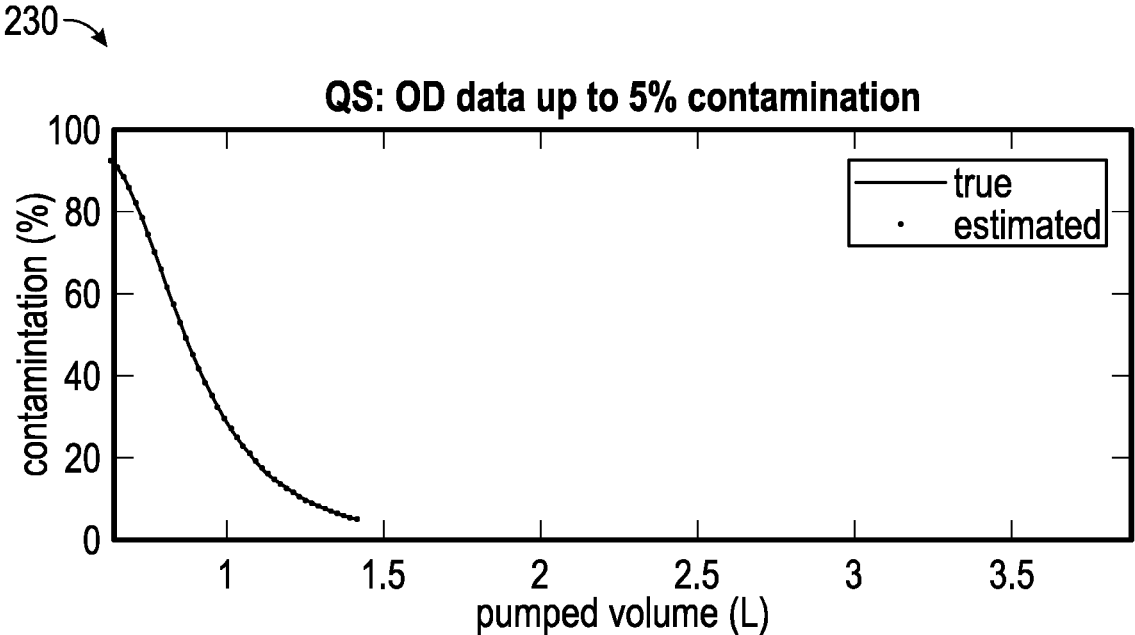
FIG. 17 illustrates example plots illustrating the true contamination in the sample flowline versus the estimated contamination (e.g., dots) which is obtained using the intercept C in FIG. 16 (top) and a difference between the estimated contamination and the true contamination (bottom), in accordance with an example of the present techniques.
Figure 17:
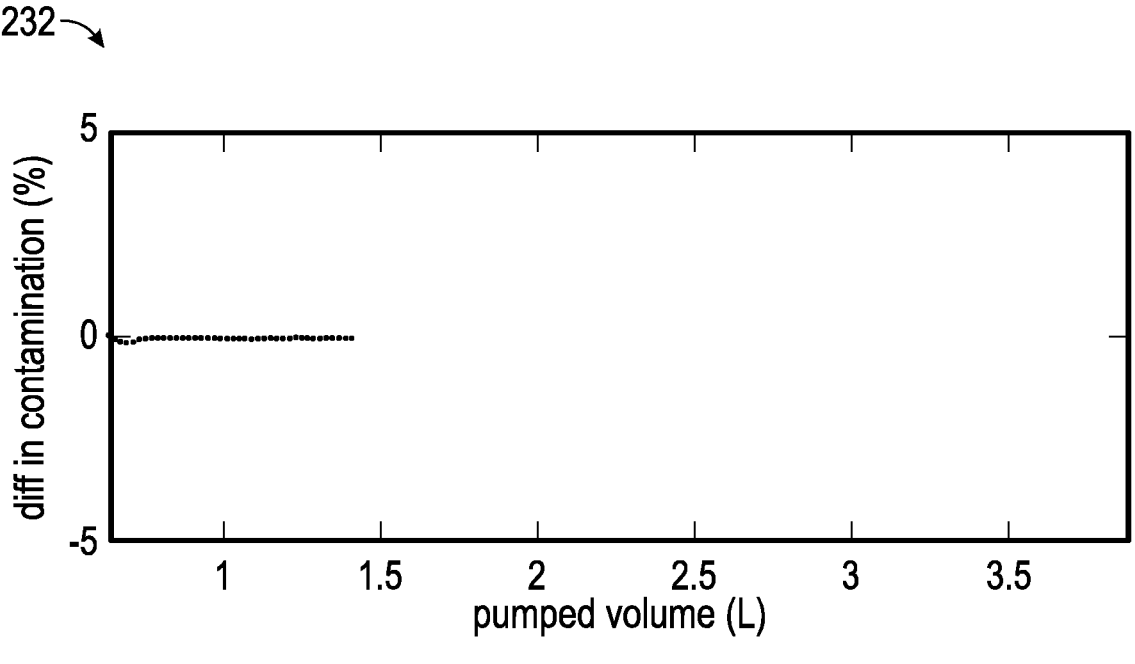

FIGS. 11-17 show the similar comparison using the Quick-silver probe data shown in FIG. 3. As shown in FIG. 11, the generated 20-channel optical spectrometer data is shown for the sample flowline 24 in plot 170 and the guard flowline 26 in plot 172. The simulated 20-channel optical spectrometer data is similar to that data shown in FIG. 4, except the simulated 20-channel optical spectrometer data in FIG. 11 was generated using the Quick-silver (QS) focused sampling contamination profiles in FIG. 3 (e.g., plot 92) instead of the OPF-7a focused sampling contamination profile. FIGS. 12-14 show the step-by-step results of the disclosed method using the data up to 10 percent contamination whereas FIGS. 15-17 show the step-by-step results using the data up to 5 percent contamination. The results suggest that the method disclosed herein performs better for the QS than for the OPF-7a probe. This is not surprising because, based on the simulation results in FIG. 3, the QS probe is faster to develop a power law trend with a fixed exponent when the contamination level drops to below approximately 30-40 percent when compared to other focus sampling probes.

Plot 180 of FIG. 12 shows the Quick-silver OD channel data (at the wavelength channel of 1070 nanometers (nm)) in the sample flowline 24 with the latest contamination level reaching approximately 10 percent. The estimated data (e.g., dots) overlaid on the measured data (curved) is the calculated filtered/smoothed data at the decimated locations using the disclosed system and methods. Plot 182 illustrated in FIG. 12 is the corresponding derivative of OD with respect to pumped volume (i.e. dOD/dv). As shown in FIG. 12, the data is similar to that in FIGS. 6 and 9 using the QS data. As shown in FIG. 13, plot 190 illustrates contamination versus computed v*dOD/dv for the data shown in FIG. 12. Plot 192 of FIG. 13 shows that the intercept of linear approximation (i.e. dash line) is relatively close to the true end point. This may not be unexpected based on the simulation results in FIG. 3. As discussed above, the QS probe may be faster to develop a power law trend with a fixed exponent when the contamination level drops to below 30-40 percent compared to other focus sampling probes. Therefore, most recent QS data points are already in the fixed exponent region in this case.

Plot 200 of FIG. 14 shows the true contamination in the sample flowline 24 versus the estimated contamination (e.g., dots) which is obtained using the intercept C in FIG. 13. The difference between the two is about 0.7%, as shown in plot 202 of FIG. 14. With further pumping, the contamination level reaches approximately 5 percent, as shown in plot 210 of FIG. 15. The dots overlaid on the data are the calculated filtered/smoothed data at the decimated locations whereas the data points on plot 212 correspond to a derivative of OD with respect to pumped volume (e.g., dOD/dv). FIG. 16 illustrates plots similar to those in FIG. 13. The plots illustrated in FIG. 16 use the QS data (up to 5 percent contamination) from FIG. 15. For instance, plot 220 illustrates contamination versus computed v*dOD/dv for the data shown in FIG. 15. Plot 222 of FIG. 16 shows that the intercept of linear approximation (e.g., dashed line) is the true end point. Plot 230 illustrated in FIG. 17 shows the true contamination in the sample flowline 24 versus the estimated contamination (e.g., dots) which may be obtained using the intercept C from FIG. 16. In this case, with the QS data (5 percent contamination), there is nearly no difference between the estimated contamination and the true contamination, as shown in plot 232.

Table 1 is a summary of results and shows a comparison of the difference between the estimate and true contamination for OFP-7a and QS probes. Based on the data, it is clear that the lower the contamination target intended to be reached and quantified, the accuracy of the contamination level is improved using the system and method disclosed herein. As should be noted, the performance also depends on the focused sampling systems used.

TABLE 1

| Comparison of difference between estimate and true contamination for OFP-7a and QS | | |
|---|---|---|
| | Estimate - True contamination | |
| | OFP-7a | QS |
| Data reaching 10% contamination | 6.8% | 0.74% |
| Data reaching 5% contamination | 0.9% | ~0% |
| Data reaching 3% contamination | 0.2% | ~0% |

More cases with different fluid and formation parameters for OPF-7a and QS are also studied using the proposed method. Specifically, the results shown in Table 1 are based on the following set of parameters: kh=10 md, kv/kh=1, OBM viscosity=1 cp, density=0.855 g/cc, Formation oil=1 cp, density=0.855 g/cc, Invasion depth=4 in., Formation porosity=0.2, wellbore diameter=8.5 in. Other examples include changing one parameter, while keeping the remaining parameters the same. For example, in one example, kh may change from 10 md to 1 md. In another example, Invasion depth may change from 4 in. to 8 in. In other examples, the viscosity ratio (e.g., formation/filtrate) may be 10. In further examples, kv/kh may change from 1 to 10 or 0.1.

Figure 18:
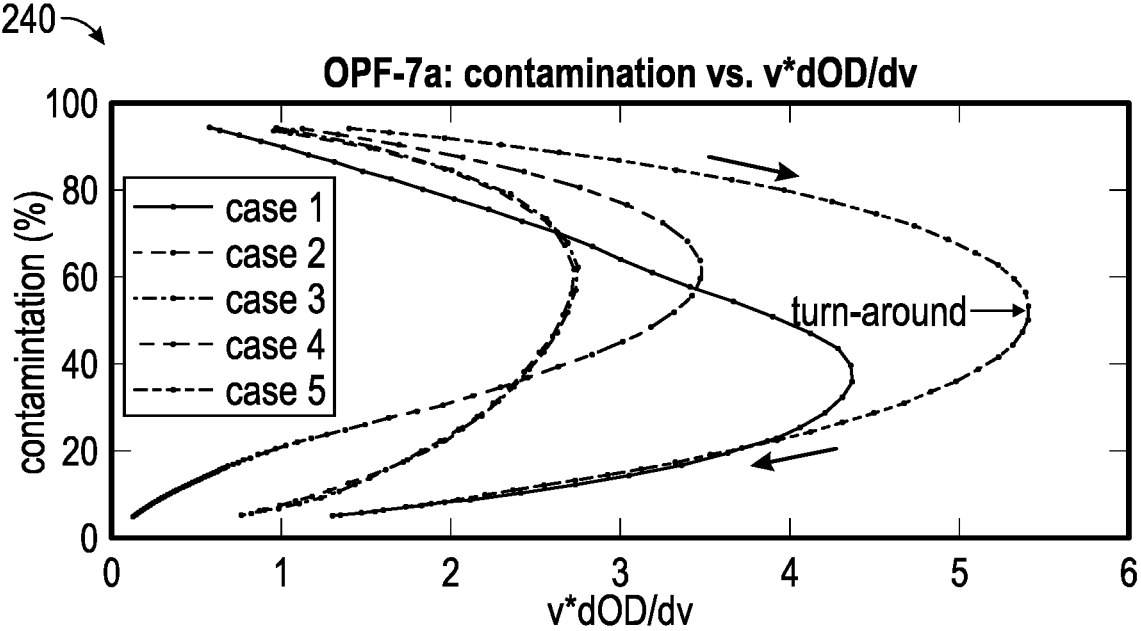
FIG. 18 illustrates example plots of the contamination versus computed v*dOD/dv (top) and the OD versus computed v*dOD/dv (bottom) for the OPF-7a probe, in accordance with an example of the present techniques.
Figure 18:
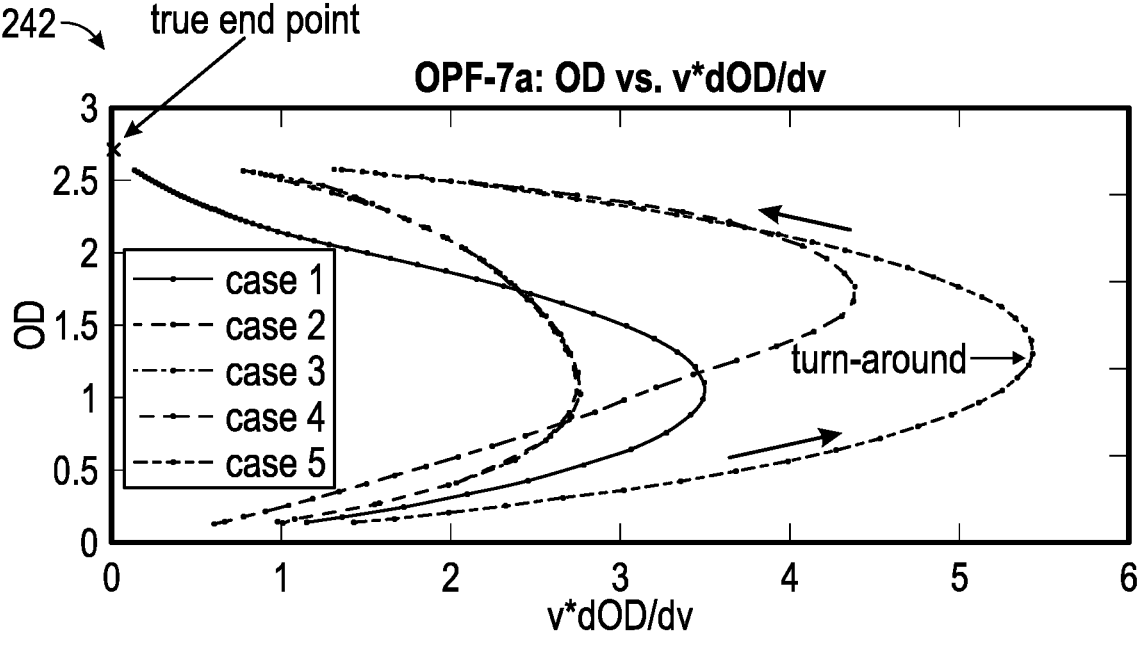

FIG. 18 illustrates the contamination versus computed v*dOD/dv in plot 240 and the OD versus computed v*dOD/dv in plot 242 for examples using the OPF-7a probe. In this example, the OD data up to 5 percent contamination is used. The arrows next to the trajectories indicate the evolution with increasing pumped volume. While the trajectory of each case is different from the others, the trajectories present two distinct features. For example, each trajectory has the signature of turn-around which occurs in the range of between approximately 40 to 60 percent contamination. While monitoring the contamination in real-time, the plot of OD versus computed v*dOD/dv data for the signature of turn-around may be checked. If not found, it may be concluded that there is a high contamination (e.g. greater than approximately 30 percent) in the flowline (e.g., the sample flowline 24). Conversely, the method disclosed herein may be utilized once the turn-around has occurred. The other distinct feature observed is that every trajectory asymptotically converges to the true end point. Specifically, fitting a straight line using the last few points of each trajectory, the intercept obtained is very close to the true end point. Of course, this relies on the fixed exponent trend at low contamination developed and available in data. It has been recognized that, based on this study, the contamination estimates about 5 percent or less may be accurately determined as shown in Table 1.

Figure 19:
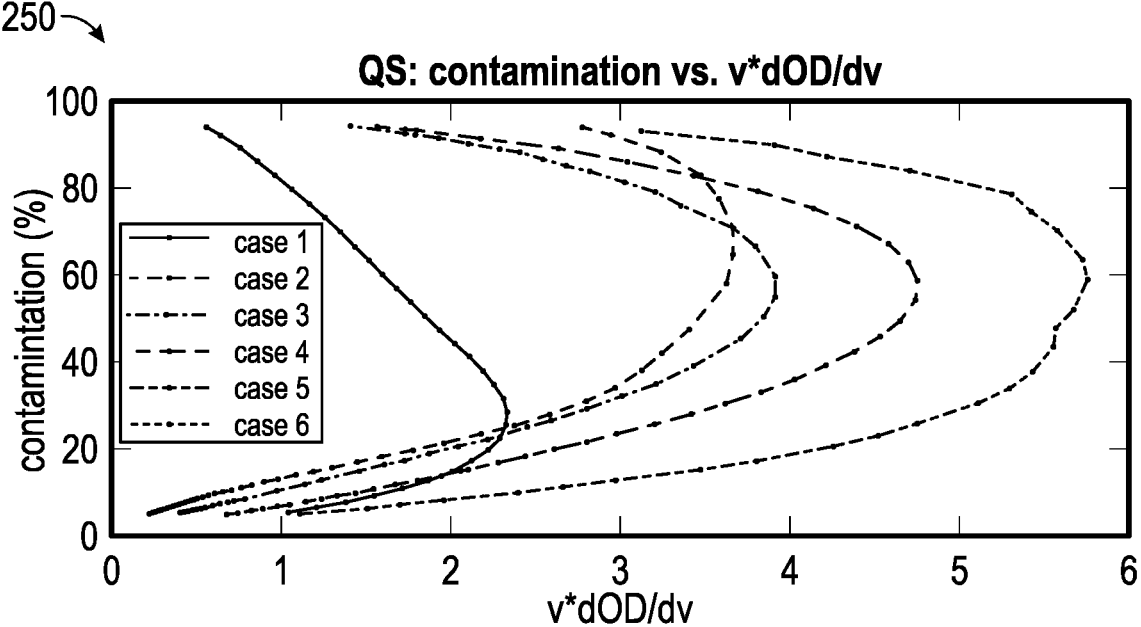
FIG. 19 illustrates example plots of the contamination versus computed v*dOD/dv (top) and the OD versus computed v*dOD/dv (bottom) for the QS probe, in accordance with an example of the present techniques.
Figure 19:
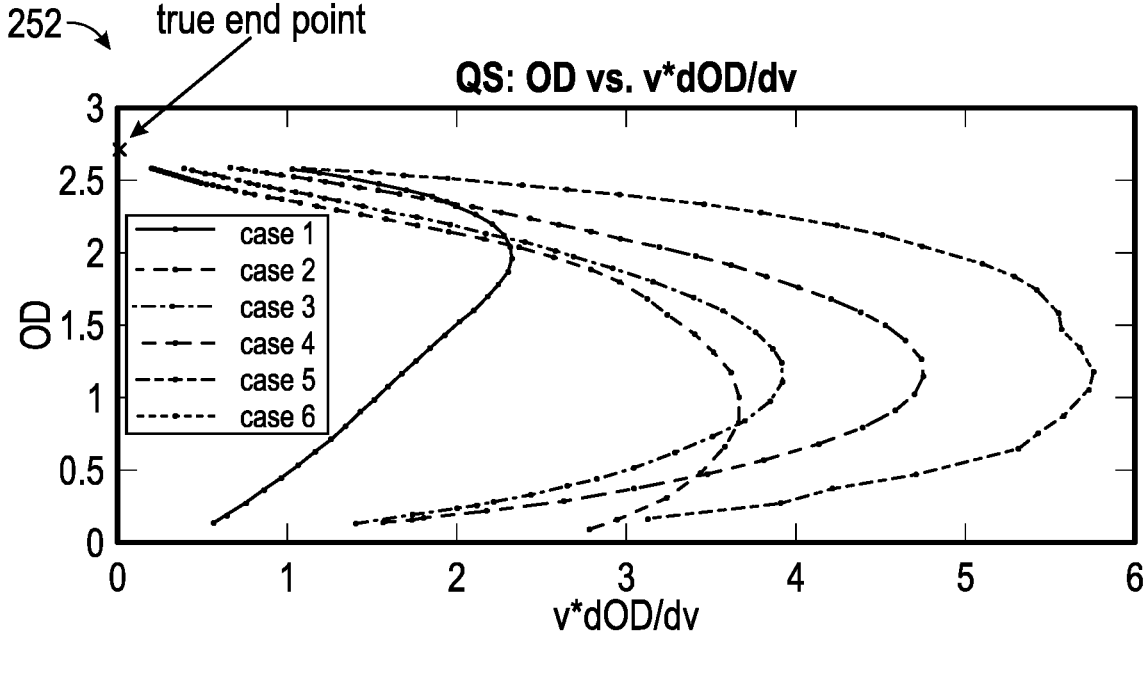

FIG. 19 illustrates plots similar to those shown in FIG. 18 for the QS probe. For example, the contamination versus computed v*dOD/dv is shown in plot 250 and the OD versus computed v*dOD/dv is shown in plot 252. As shown in the illustrated example, the two distinct features of turn-around and asymptotic convergence to the true end point are also observed for the QS probe. Similarly, fitting a straight line using the last few points of each trajectory, the obtained intercept is very close to the true end point.

Figure 20:
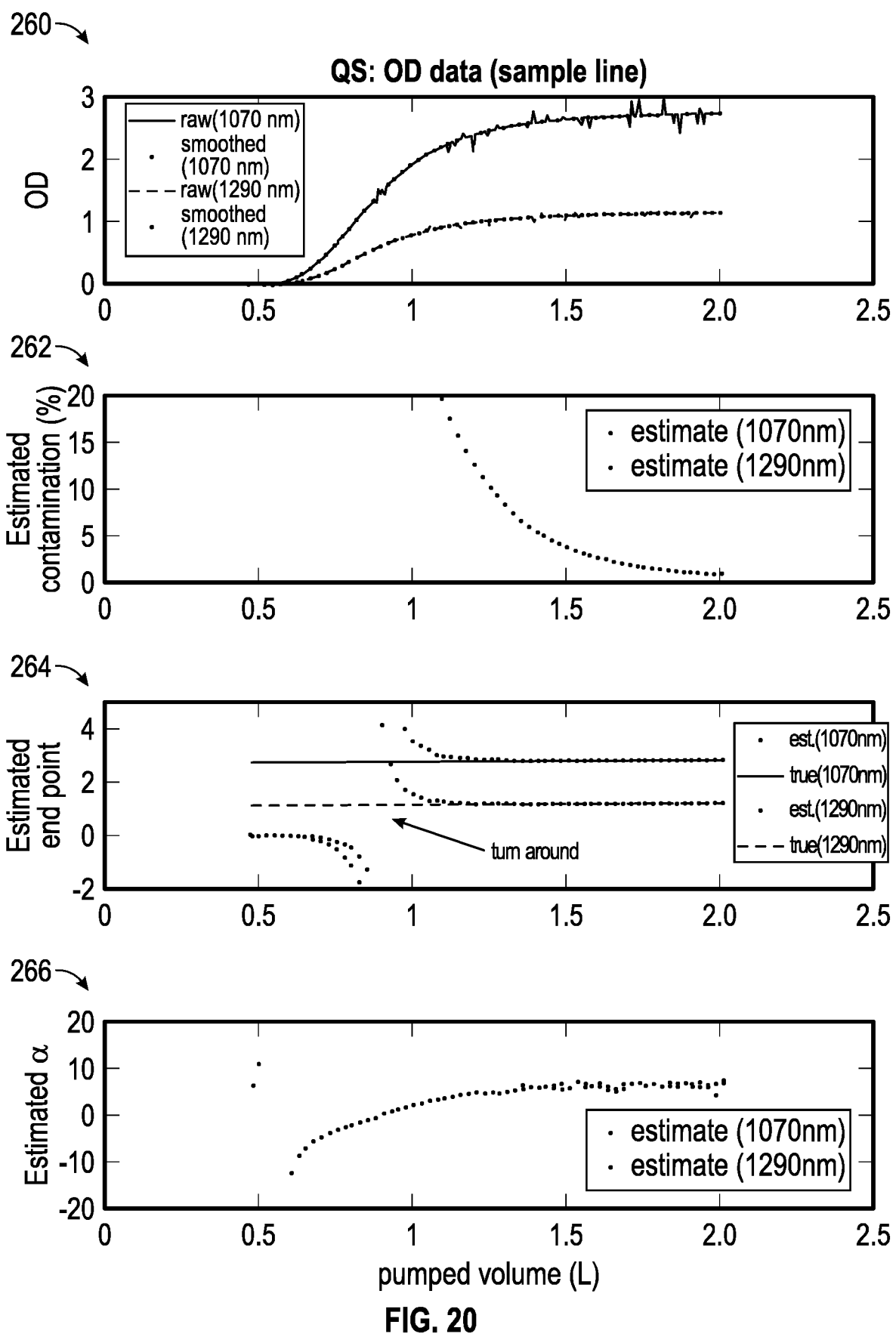
FIG. 20 illustrates example plots illustrating two selected raw channel data in real time and corresponding smooth data at decimated points (first plot) as a function of pumped volume (L) for the QS shown in FIG. 11, estimated contamination profiles obtained using the most recent end point estimates as a function of the pumped volume (second plot), historical end point estimates based on available data as a function of the pumped volume (third plot), and historical end point estimates of α as a function of the pumped volume (fourth plot) where the turn-around is indicated by the estimated value of α, in accordance with an example of the present techniques.

In terms of real-time monitoring, the estimated parameters (e.g., C and α) may be used for quality control. For example, as shown in FIG. 20, the QS data of FIG. 11 with two selected OD channels at 1070 nm and 1290 nm is used to demonstrate this capability. Plot 260 shows the data for the two selected raw channels available in real time and the corresponding smoothed data at decimated points. The smoothed data are obtained from the constant term (e.g., EQ. 5) by the weighted least-squares fitting while computing the derivative term (e.g., EQ. 6). Plot 262 illustrates the estimated contamination profiles obtained using the most recent end point estimates. Unsurprisingly, the estimated contamination from two different channels are nearly identical because the accurate end point estimates were obtained for both of them. Plot 264 tracks the historical end point estimates based on the available data at that time. Initially, the historical end point estimates are negative (which is non-physical) and then turn positive, indicating the region of turn-around as shown on the plot 264. This is corroborated by the historical estimates of α (shown in plot 266) where the turn-around is indicated by the estimated value of α going from negative to positive. Notably, the historical end point estimates asymptotically stabilize to fixed values, which is indicative of reaching the fixed-exponent region. Again, this is corroborated in the plot 266, which also shows the stabilization of estimated α at about 6.5 in this case. It should be recognized that the two channels used in FIG. 20 have different end points and therefore are stabilized to the different fixed values shown in the plot 264. Furthermore, the stabilization of estimated parameters (e.g., C and α) occur at about the pumped volume of 1.1 liters in this case, implying somewhat trustworthy contamination estimates from this point on.

Figure 21:
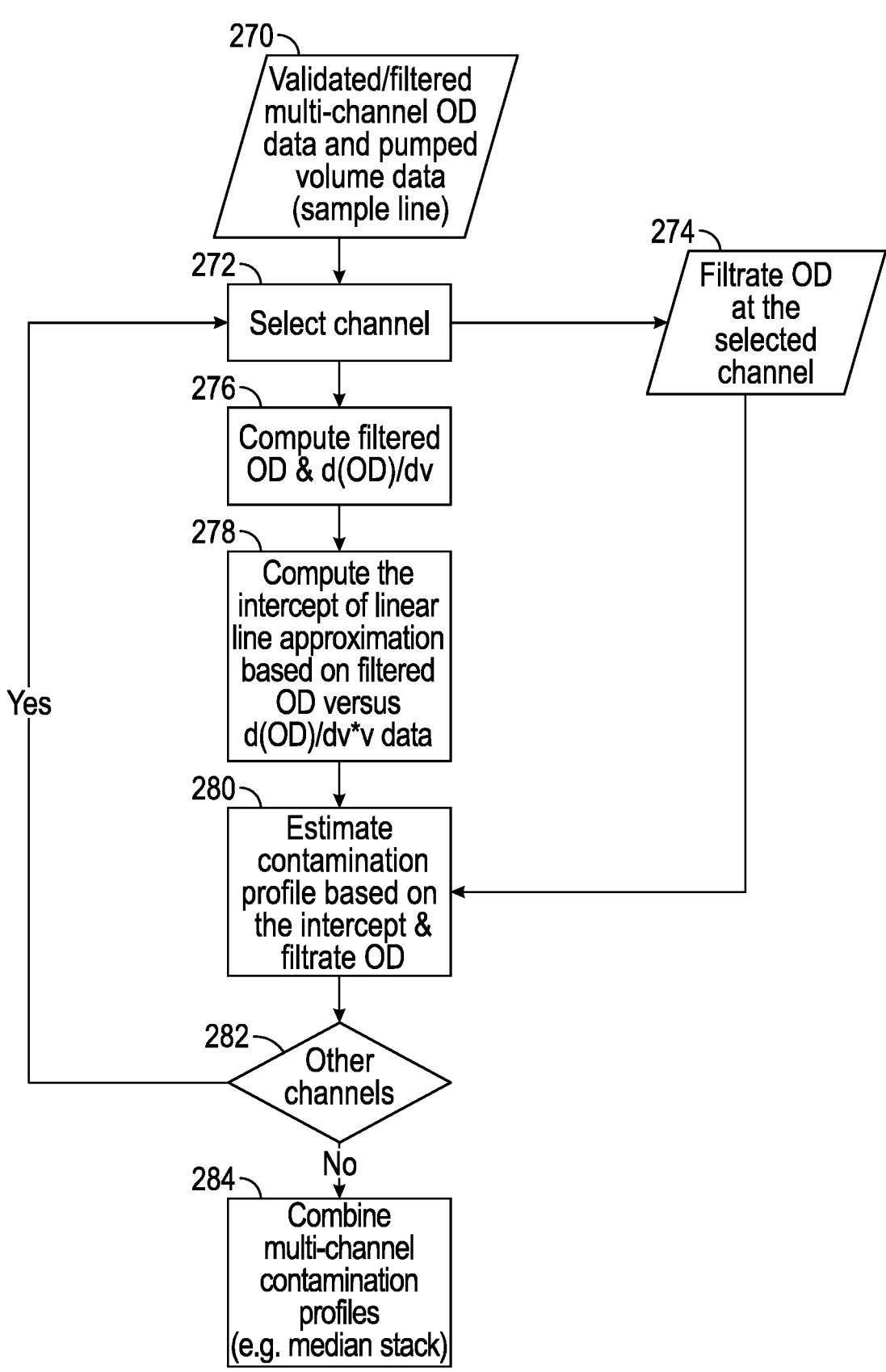
FIG. 21 is a flow diagram of a method for monitoring contamination when using focused sampling systems, in accordance with an example of the present techniques.

In summary, along with the proposed workflow and algorithms, the following real-time features are monitored: track the historical estimated parameters (e.g., estimated end point C and exponent α) and monitor for the stabilization of these estimated parameters; and when multiple channels are selected for processing, monitor the consistency of the contamination estimates and estimated exponent (i.e., α) from multi-channel data. FIG. 21 is a summary the workflow of focused-sampling contamination monitoring according to an example of the method disclosed herein. Input data 270 is the validated/filtered multi-channel OD data. A channel is selected at block 272 and a filtrate OD at the selected channel is determined at block 274. Further, at block 276, the filtered OD and d(OD)dv are calculated at the selected channel. The intercept of the linear line approximation for contamination is determined based on a plot of filtered OD versus d(OD)dv*v, as shown at block 278. The contamination may then be estimated based on the intercept (e.g., from block 278) and the filtrate OD (e.g., from block 274), as shown at block 280. The process may be repeated in an iterative manner should other channels be utilized to estimate the contamination, as shown at block 282. At block 284, the contamination profile can be estimated by combining the data from the different channels. If so, a median stack is used to obtain a single contamination estimate at the end.

As discussed above, present examples also include systems and methods for determining and monitoring the efficiency and contamination of focused sampling. For example, as discussed in further detail below, the disclosed system and method determine the efficiency of focused sampling by using the dynamic responses of contaminated fluid flow in the sample flowline 24 and the guard flowline

26. The disclosed approach integrates downhole fluid analysis data acquired in the sample flowline 24 and the guard flowline 26 during pumping operations. Furthermore, the integration may include matching responses in both flowlines and, therefore, utilize a dual-flowline spectrometer, such as FISO. The disclosed method may also allow monitoring and controlling the efficiency of focused sampling operation, while adjusting the flow rate ratio between the sample pump 12 and the guard pump 14. Finally, an indicator may be used to estimate the contamination level in the sample flowline 24, which may mitigate any drawbacks of fitting power law models for extrapolation in order to obtain the end points. Another benefit of this approach is that the uncertainty of a contamination estimate may be substantively reduced if the desirable contamination level for collecting sampled fluid is as low as a few percent.

Figure 22:
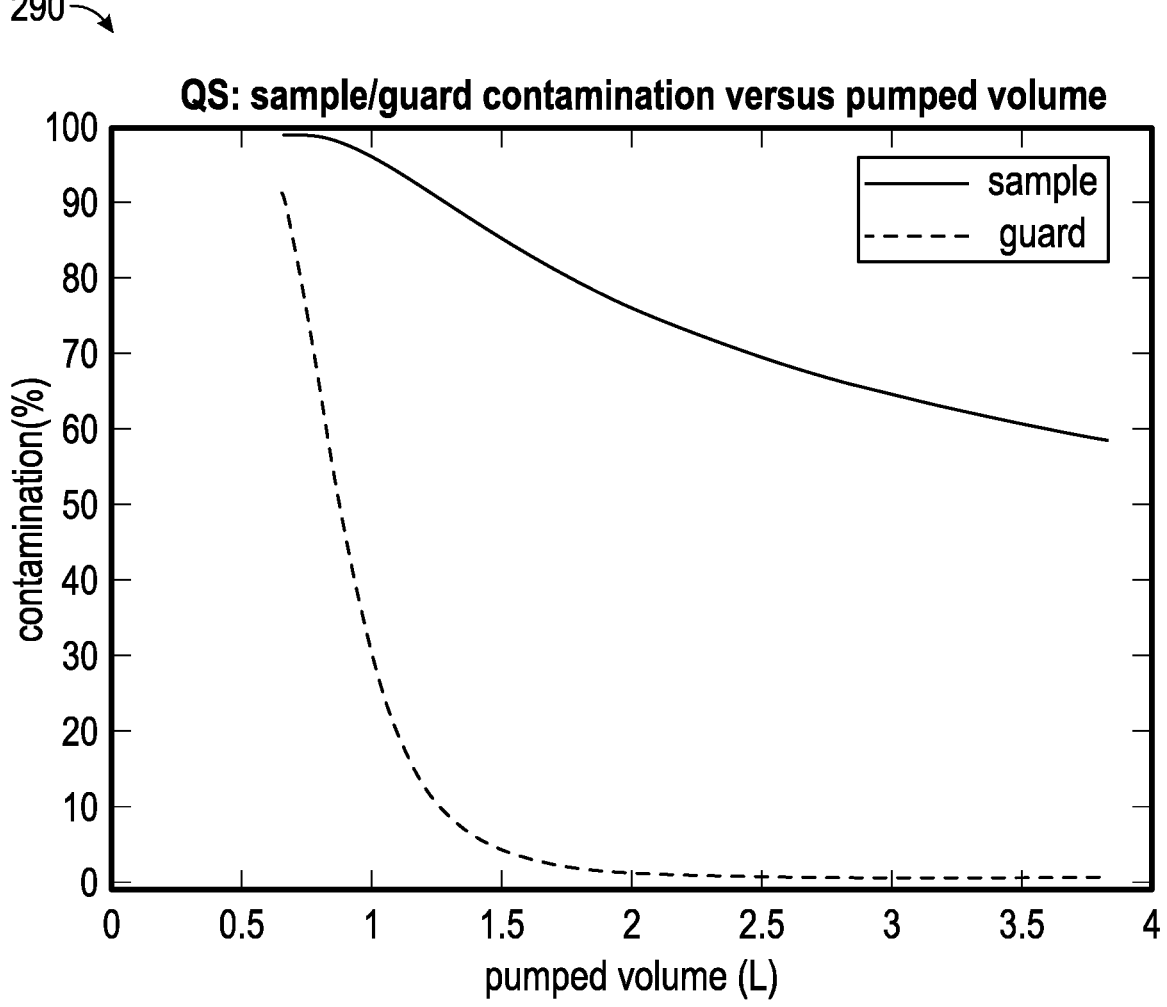
FIG. 22 is an example plot of the dynamic behavior of fluid contamination in the sample and guard flowlines of the QS probe as a function of pumped volume (L), in accordance with an example of the present techniques.

Dynamic behavior of focused sampling operation is characterized by a rapid cleanup in the sample flowline 24, while maintaining a moderately high contamination level in the guard flowline 26. For example, FIG. 22 is a plot 290 that illustrates the dynamic behavior of fluid contamination in the sample flowline 24 and the guard flowline 26 of the Quicksilver probe (QS) versus pumped volume, v. The data shown in FIG. 22 was obtained from an ECLIPSE simulation model with the following fluid and formation parameters $k_h$=10 md; $k_v/k_h$=1; OBM viscosity=1 cp; density=0.855 g/cc; Formation oil=1 cp; density=0.855 g/cc; Invasion depth=4 in.; Formation porosity=0.2, wellbore diameter=8.5 in.

Generally, the evolution of the sample and guard contamination profiles shown in FIG. 22 is expected in a focused sampling operation. Specifically, after the breakthrough of the native formation fluid (at about 0.5 liters (L) of pumped volume in the illustrated example), the contamination level in the sample flowline 24 quickly plunges with continuous pumped volume, while the contamination level in the guard flowline 26 moderately decreases. After reaching a low contamination level (e.g., less than 5 percent at about 1.5 L of pumped volume), the rate of contamination change in the sample flowline 24 dramatically slows down while the rate of contamination change in the guard flowline 26 remains about the same. However, the rate of contamination change in the guard flowline 26 is larger than that in the sample flowline 24. Further pumping (e.g., beyond 1.5 L of pumped volume), shows diminishing return in the sample flowline 24 because its rate of contamination change approaches zero and most of the pumping effort is directed to the reduction of the contamination level in the guard flowline 26.

The symbols $\eta_s(v)$ and $\eta_g(v)$ denote the contamination profile versus the pumping volume (e.g., v) for the sample flowline 24 and the guard flowline 26, respectively. The rate of contamination change in the sample and guard flowline (e.g., denoted $\gamma_s(v)$ and $\gamma_g(v)$) accord to the following relationships of EQ. 10 and 11, respectively:

$$\gamma_s(v) = \frac{\partial \eta_s(v)}{\partial v} \qquad \text{EQ. 10}$$

$$\gamma_g(v) = \frac{\partial \eta_g(v)}{\partial v} \qquad \text{EQ. 11}$$

17
18

The ratio of the two rates (e.g., denoted $\tau(v)$) may be represented by EQ. 12:

$$\tau(v) = \frac{\gamma_s(v)}{\gamma_g(v)}$$ EQ. 12

Using the example above, an efficient focused sampling operation may be characterized by a large ratio (e.g., $\tau(v)\gg 1$) soon after the breakthrough of the native formation fluid. The ratio (e.g., $\tau(v)$) may decrease with continuous pumping and eventually reach the break point ($\tau(v)=1$), where the rate of contamination change in the sample flowline 24 is the same as the rate of contamination change in the guard flowline 26. At this point, the contamination level in the sample flowline 24 should be generally low (e.g., approximately 5 percent in the illustrated example). Further pumping beyond the break point ($\tau(v)<1$) may result in a much slower rate of reduction of contamination in the sample flowline 24.

Figure 23:
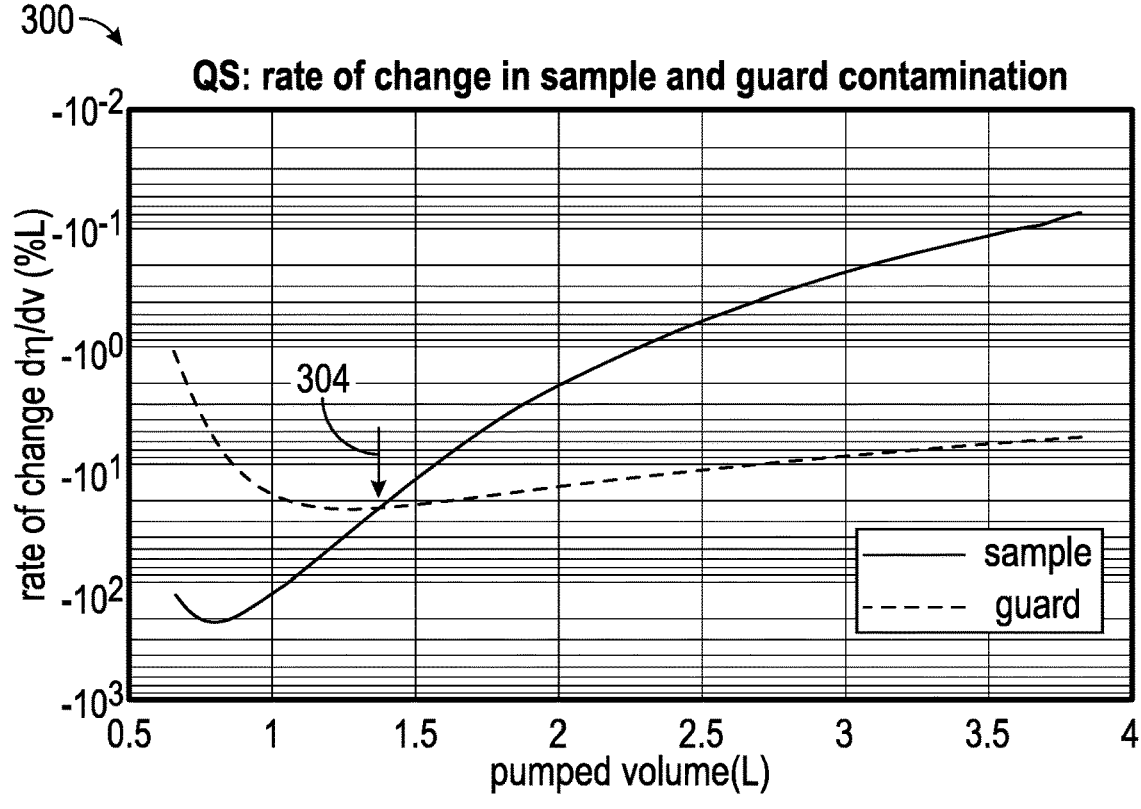
FIG. 23 illustrates example plots of the rates of change (i.e. $\gamma_s(v)$ and $\gamma_g(v)$) in the sample and guard flowlines of FIG. 22 (top) and the ratio (i.e. $\tau(v)$) of two rates of change (bottom), in accordance with an example of the present techniques.
Figure 23:
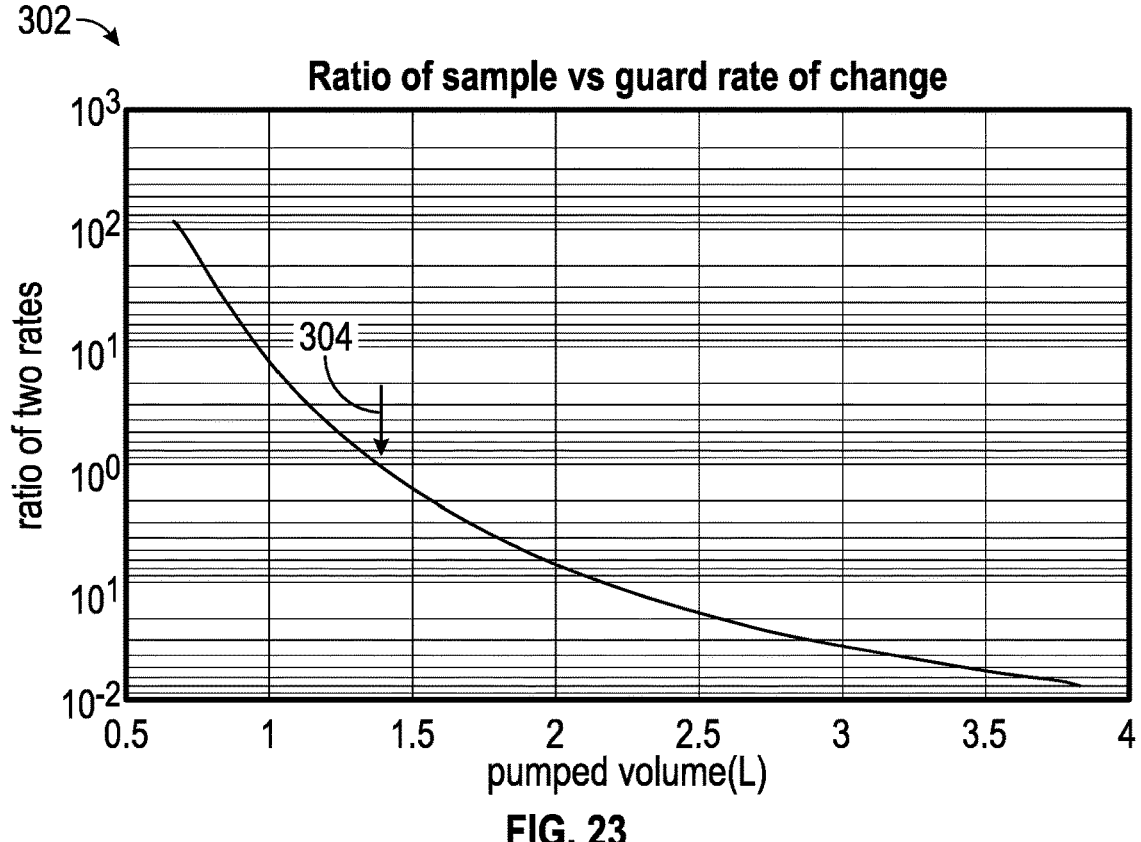

For example, FIG. 23 illustrates a plot 300 of the rates of contamination change (e.g., $\gamma_s(v)$ and $\gamma_g(v)$)) in the sample and guard flowline of FIG. 22. Additionally, plot 302 of FIG. 23 illustrates the ratio (e.g., $\tau(v)$) of the two rates. As shown in the illustrated example of FIG. 23, soon after the breakthrough (at approximately 0.5 L of pumped volume as shown in FIG. 22), the ratio is over 100, which is indicative of an efficient focused sampling operation. The break point may be reached at approximately 1.4 L of pumped volume and/or after additional pumping beyond 1.4 L of pumped volume (e.g., pumping less than 1 L). The arrows 304 on the plots 300, 302 indicate the break point, corresponding to about 5 percent contamination in the sample flowline 24 in this particular example. The information presented in $\gamma_s(v)$, $\gamma_g(v)$, and $\tau(v)$ may facilitate determining the efficiency of focused sampling operations.

However, to calculate $\gamma_s(v)$, $\gamma_g(v)$, and $\tau(v)$, the contamination values ($\eta_s(v)$ and $\eta_g(v)$) in the sample flowline 24 and the guard flowline 26 may be determined. The contamination values may be determined using the optical spectrometer data recorded in the sample flowline 24 and the guard flowline 26 (e.g., via the sample optical spectrometer 28 and the guard optical spectrometer 30, respectively). Based on the Beer-Lambert law, the contamination in the sample flowline 24 and the guard flowline 26 is related to the optical density data as follows:

$$\eta_s(v) = \frac{OD_{oil} - OD_s(v)}{OD_{oil} - OD_{fil}}$$ EQ. 13

$$\eta_g(v) = \frac{OD_{oil} - OD_g(v)}{OD_{oil} - OD_{fil}}$$ EQ. 14 where $OD_s(v)$ and $OD_g(v)$ is the optical density data at a particular wavelength (e.g. a channel) in the sample flowline 24 and the guard flowline 26, respectively, and $OD_{oil}$ and $OD_{fil}$ are the two unknown end points for native formation fluid and drilling mud filtrate, respectively, at the same wavelength. Therefore, the rate of contamination change (e.g., $\gamma_s(v)$ and $\gamma_g(v)$) are related to the derivative of OD measurements as follows:

$$\gamma_s(v) = \frac{-1}{OD_{oil} - OD_{fil}} \frac{\partial OD_s(v)}{\partial v}$$ EQ. 15

-continued $$\gamma_g(v) = \frac{-1}{OD_{oil} - OD_{fil}} \frac{\partial OD_g(v)}{\partial v}$$ EQ. 16

EQ. 15 and 16 state that the rates of contamination change in the sample flowline 24 and the guard flowline 26 are related to the derivatives of OD measurements in the respective flowline 24, 26 and scaled by an unknown constant (e.g., $-1/OD_{oil}-OD_{fil}$). Since EQ. 15 and 16 have the same scaling constant, the ratio of two rates in EQ. 12 is equal to the ratio of two OD derivatives, or the following:

$$\tau(v) = \frac{\gamma_s(v)}{\gamma_g(v)} = \frac{\frac{\partial OD_s(v)}{\partial v}}{\frac{\partial OD_g(v)}{\partial v}}$$ EQ. 17

Figure 24:
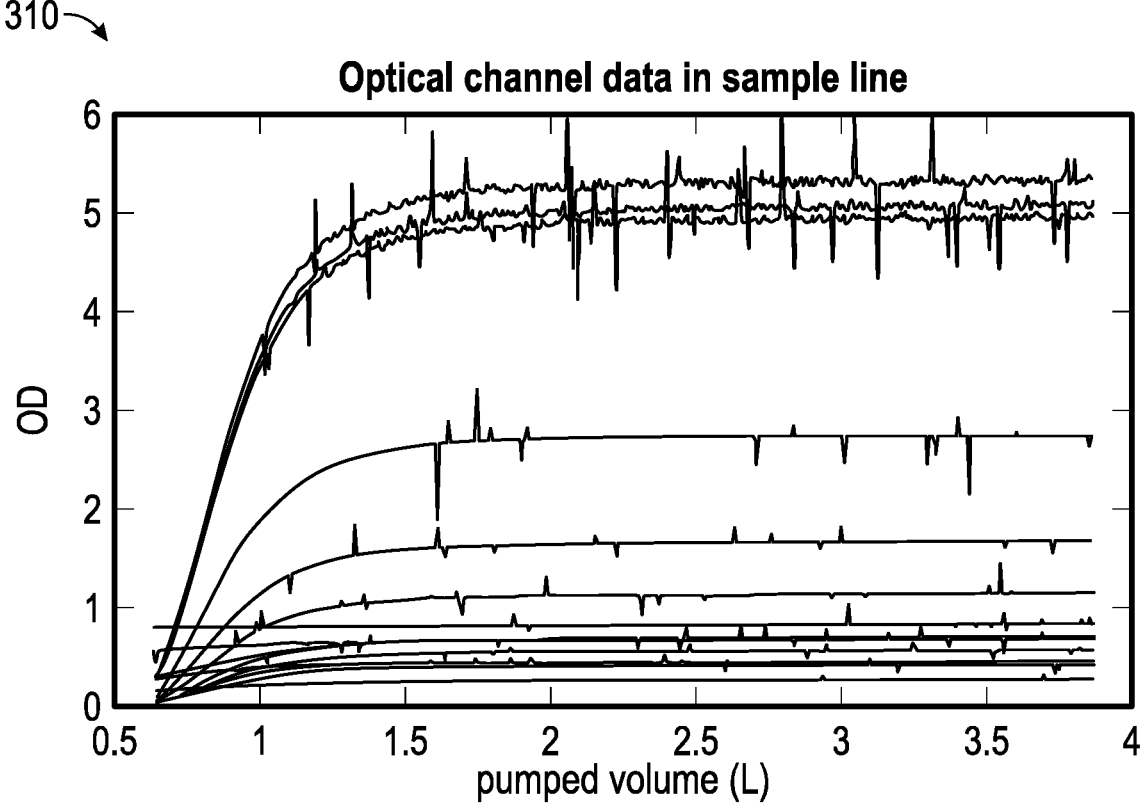
FIG. 24 illustrates example plots of simulated 20-channel spectrometer data as a function of pumped volume (L) in the sample flowline (top) and guard flowline (bottom) using the contamination profiles in FIG. 22, in accordance with an example of the present techniques.
Figure 24:
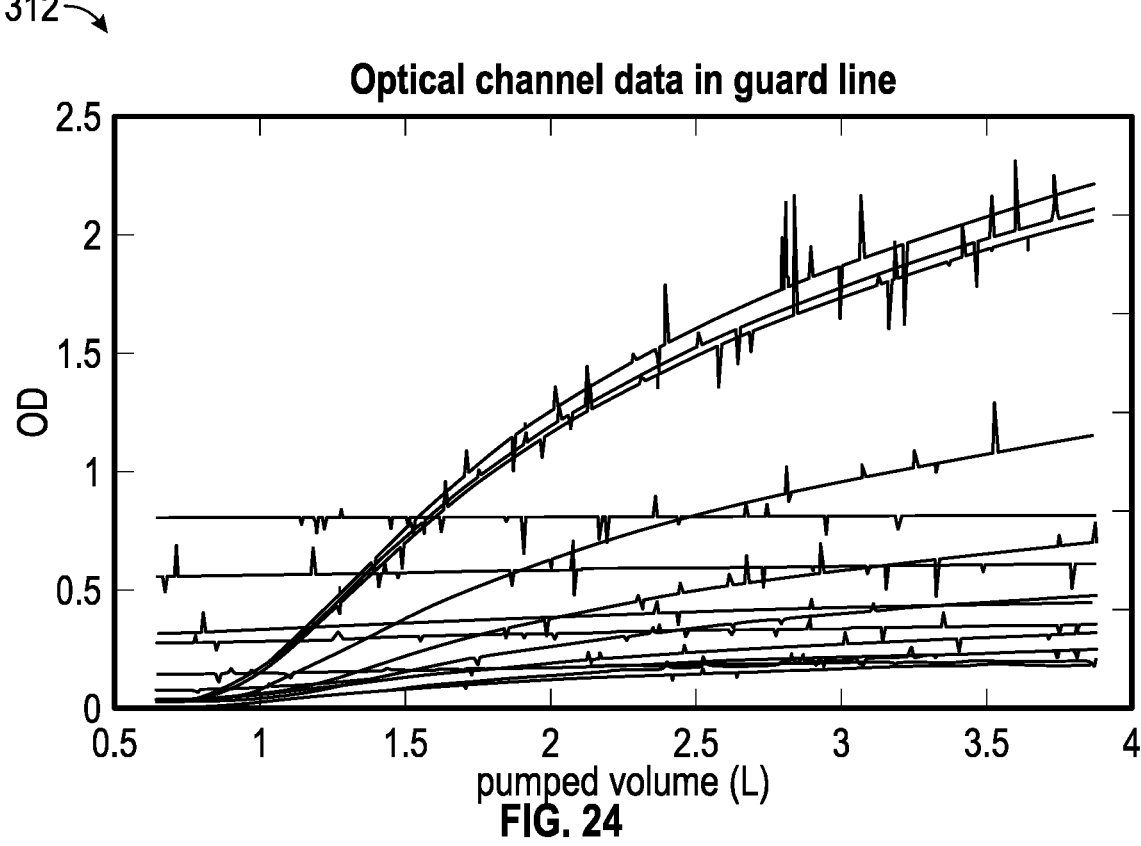

For example, downhole spectrometer data in the sample flowline 24 and the guard flowline 26 may be generated based on the contamination profiles shown in FIG. 22. A set of laboratory-recorded live oil and OBM filtrate spectral data may be used to represent the two end-point measurements. Furthermore, random noise is added to the simulated data. For example, FIG. 24 shows simulated 20-channel spectrometer data in the sample flowline 24 in plot 310 and simulated 20-channel spectrometer data in the guard flowline 26 in plot 312. Using the method in FIG. 21 for estimating contamination level in focused sampling systems to filter, validate, and merge/fuse the optical channel data, clean optical density data (corresponding to the wavelength of 1070 nm) in the sample flowline 24 and the guard flowline 26 may be obtained, as shown in plot 320 of FIG. 25.

Figure 25:
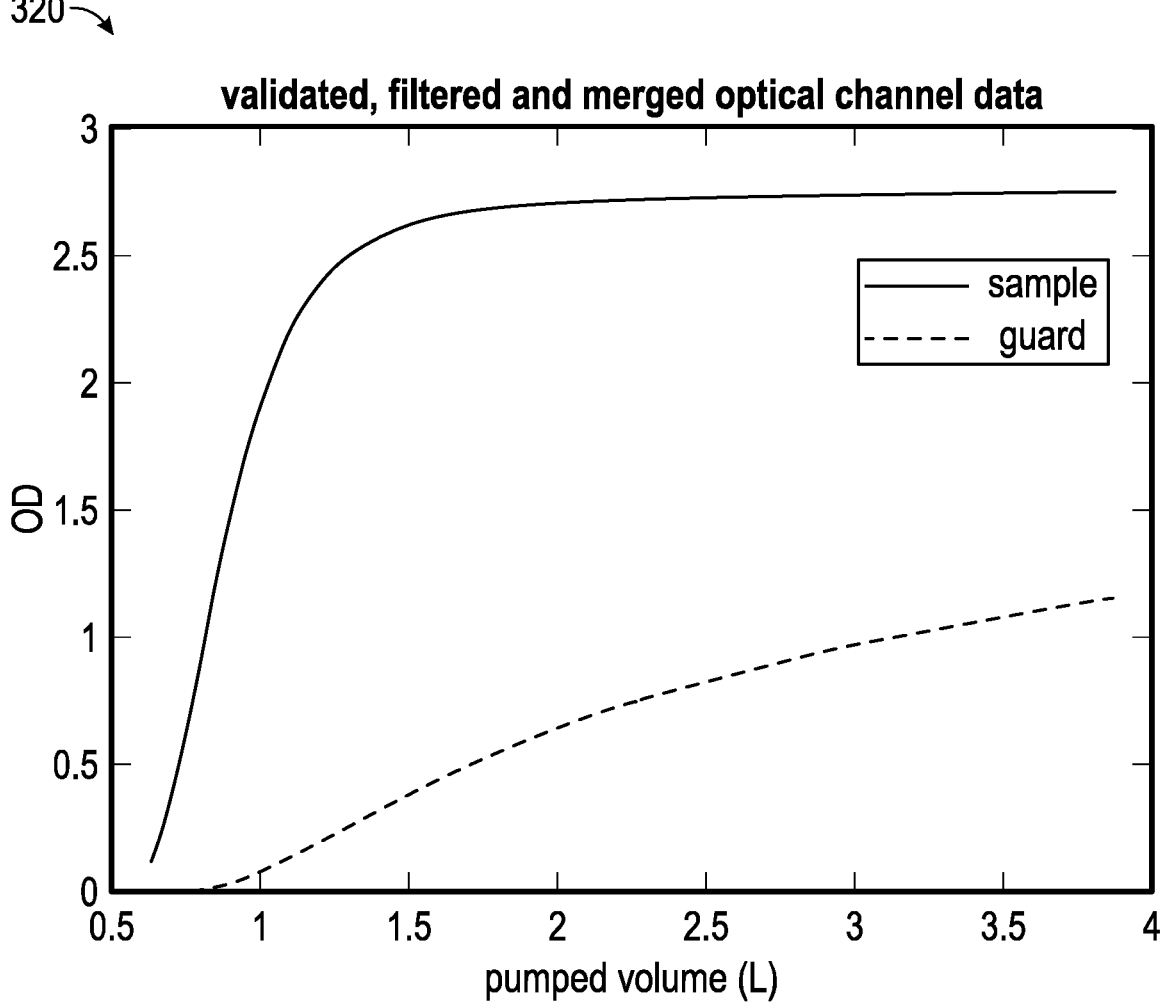
FIG. 25 is an example plot of filtered, validated, and merged optical density data (corresponding to the wavelength of 1070 nm) at the sample flowline and the guard flowline, in accordance with an example of the present techniques.
Figure 26:
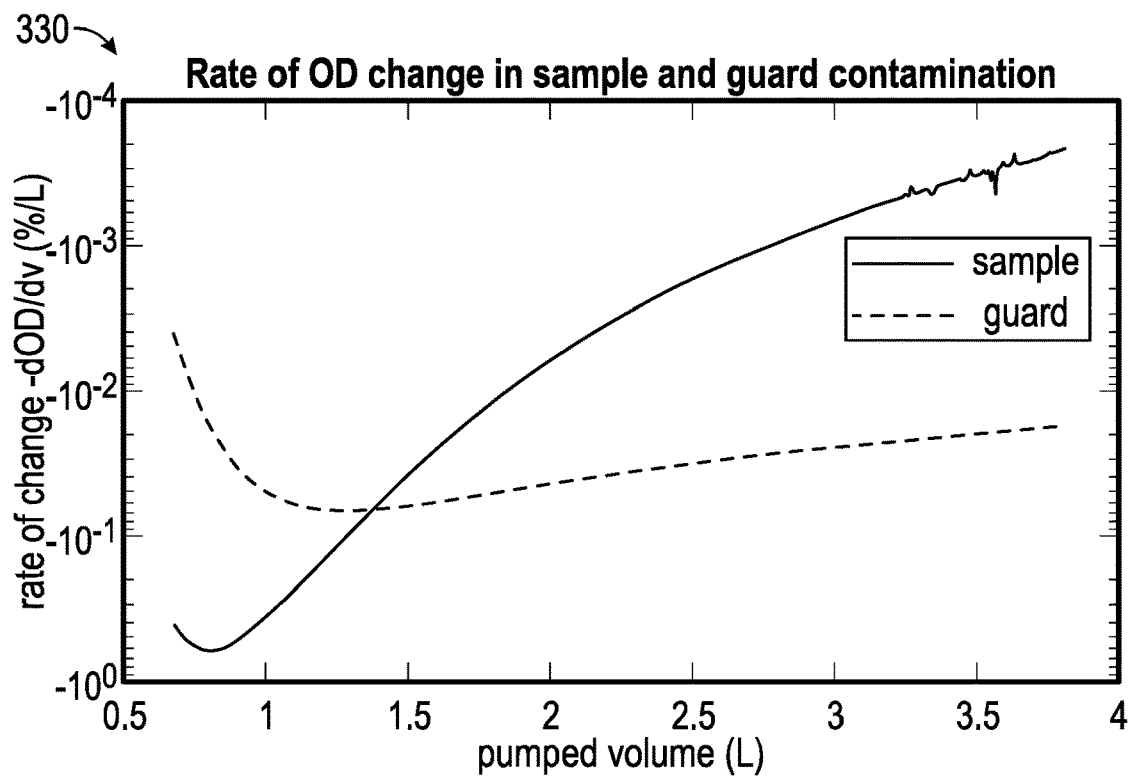
FIG. 26 illustrates example plots of OD derivatives in the sample and guard flowlines (top) and the ratio of two OD derivatives (bottom) based on the optical density data in FIG. 25, in accordance with an example of the present techniques.
Figure 26:
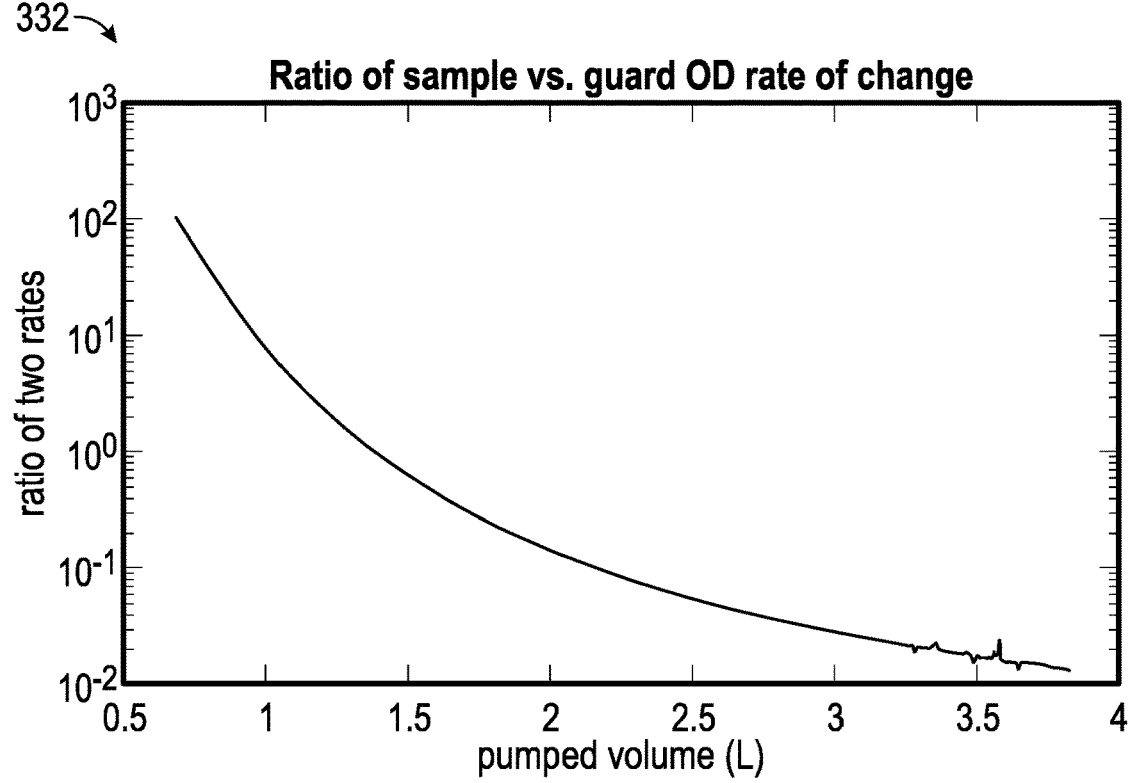

Based on the optical density data shown in FIG. 25, the OD derivatives in the sample flowline 24 and the guard flowline 26 may be determined, as shown in plot 330 of FIG. 26. Further, the ratio of the two OD derivatives may be determined, as shown in plot 332 of FIG. 26. With the exception of the scaling constant, the OD derivatives maintain the same shape as the rates of contamination change in the plot 300 of FIG. 23. The ratio of OD derivatives is also identical to the ratio of rates of contamination change (e.g., $\tau(v)$) shown in the plot 302 of FIG. 23. Therefore, the ratio of the two OD derivatives can be used as $\tau(v)$ to determine the efficiency of focused sampling.

Figure 27:
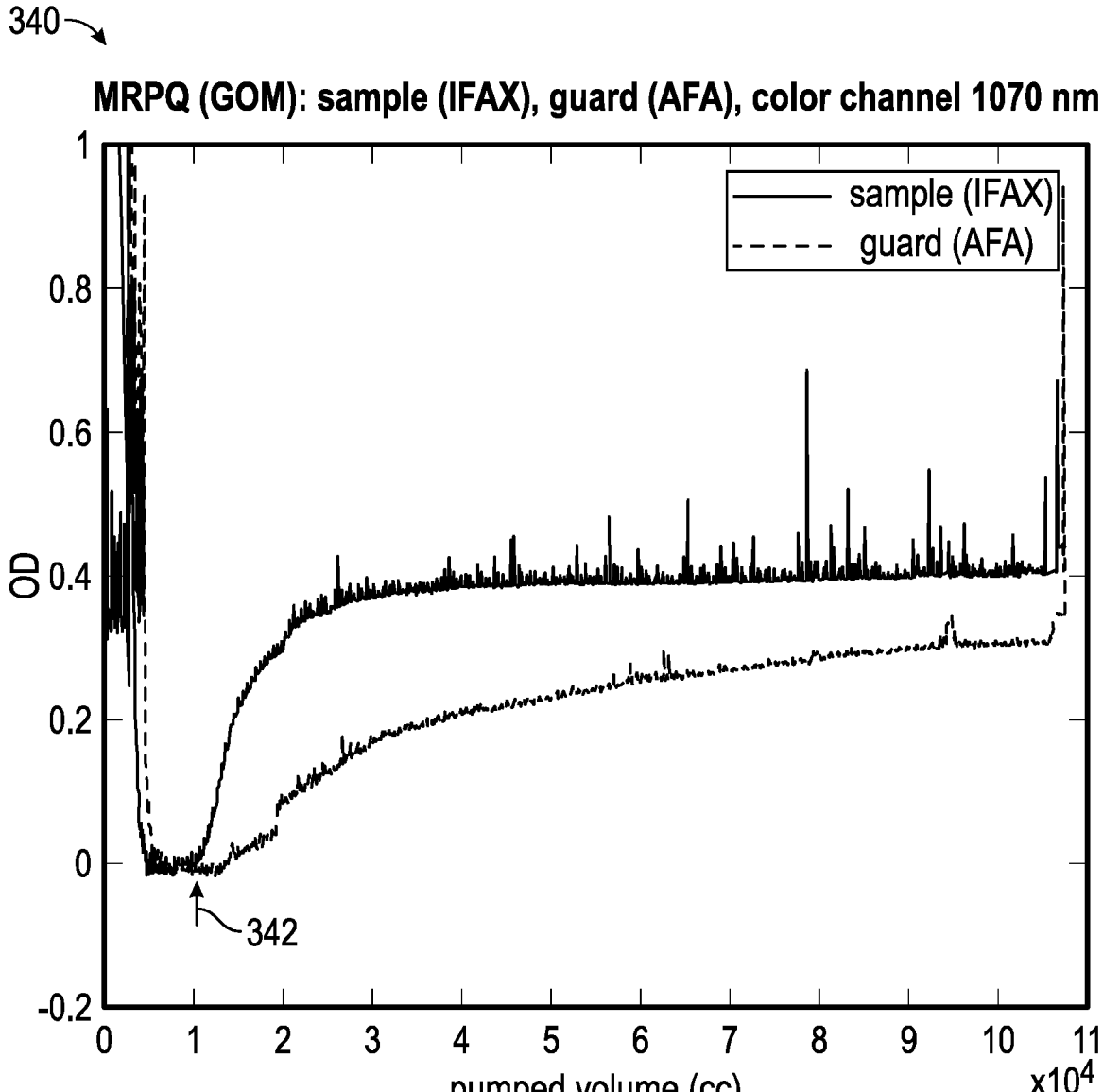
FIG. 27 is an example plot of the common wavelength channel of 1070 nm in AFA and IFAX from a GOM example, in accordance with an example of the present techniques.

FIG. 27 is an example of a plot 340 that demonstrates the consistent dynamic behavior as predicted in the ECLIPSE simulated data. The data may be acquired using the MDT Quicksilver sampling probe. The splitting of sample flow and guard flow is observed from the beginning without a commingled flow period. Located on the sample flowline 24 is a 20-channel IFAX filterspectrometer (e.g., the sample optical spectrometer 28), whereas located on the guard flowline is a 10-channel AFA filterspectrometer (e.g., the guard optical spectrometer 30). The common wavelength channel of 1070 nm in AFA and IFAX is identified and displayed in FIG. 27. The breakthrough of native formation fluid occurs roughly at about 10 L of pumped volume indicated by arrow 342. After the breakthrough, the OD in the sample flowline 24 quickly builds up, whereas the OD in the guard flowline 26 only gradually increases. The OD in the sample flowline 24 approximately reaches a plateau at about 30 L of pumped volume, but the OD in the guard flowline 26 continuously increases beyond 30 L of pumped volume.

Figure 28:
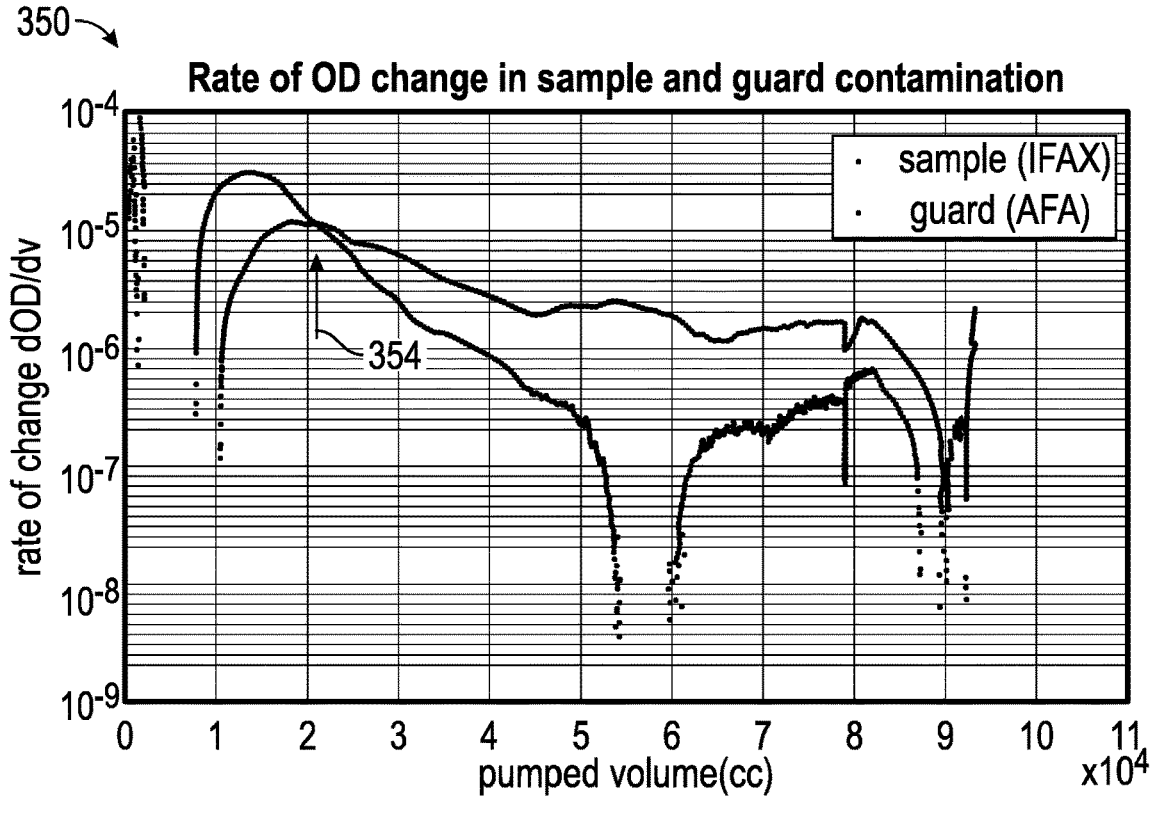
FIG. 28 illustrates example plots of computed OD derivatives in the sample and guard flowline (top) and the computed ratio of two OD derivatives (bottom) based on the OD data in FIG. 27, in accordance with an example of the present techniques.
Figure 28:
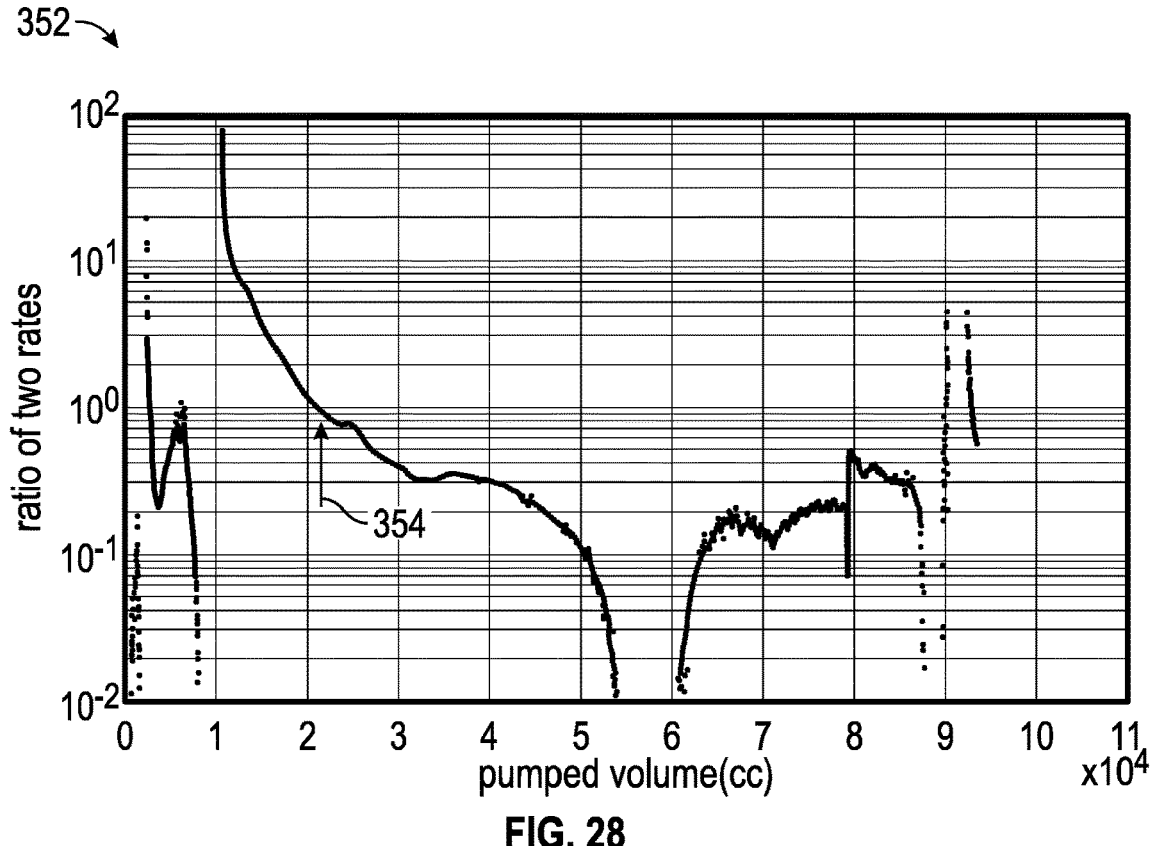

Based on the data in FIG. 27, the computed OD derivatives in the sample flowline 24 and the guard flowline 26 are shown in plot 350 of FIG. 28. The derivatives are computed using noisy raw data from FIG. 27 without applying the filtering, validating, and merging processing shown in the method of FIG. 21. The computed ratio of the two OD derivatives is shown in plot 352 of FIG. 28. The rate change $\tau(v)$ is large shortly after breakthrough at about 10 L of pumped volume. The ratio drops quickly and reaches the break point $\tau(v)=1$ (e.g., shown by arrow 354) at about 21 L of pumped volume. These observations are consistent with the dynamic behavior predicted by the ECLIPSE simulation. Two different spectrometers (e.g. AFA and IFA) may include some offset, and hence, may show different responses in the OD of the sample flowline 24 and the guard flowline 26. This may change the computed derivatives and the computed value of $\tau(v)$, which may ultimately alter the location of the break point (e.g., as shown at arrow 354). The next generation optical fluid analyzer, such as FISO, measures the OD in both flow lines with the same spectrometer and avoids the variation in spectrometer responses. As such, in some examples, the sample flowline 24 and the guard flowline 26 may be monitored using a single optical spectrometer (e.g., either the sample optical spectrometer 28 or the guard optical spectrometer 28).

For formation water sampling in water based mud (WBM), the contamination in the guard flowline 26 and the contamination in the sample flowline 24 follow the linear mixing rule, such as the Beer Lambert law, which is expressed in EQ. 18 and 19. In EQ. 18 and 19, $C_{water}$ denotes the conductivity of pure formation water, $C_{WBM\ filtrate}$ is the conductivity of the water base mud filtrate, and $C_{s/g}(v)$ is the measured conductivity as a function of pumped volume in the sample flowline 24 and the guard flowline 26, respectively.

$$\eta_s(v) = \frac{C_{water} - C_s(v)}{C_{water} - C_{WBM\ filtrate}} \qquad \text{EQ. 18}$$

$$\eta_g(v) = \frac{C_{water} - C_g(v)}{C_{water} - C_{WBM\ filtrate}} \qquad \text{EQ. 19}$$

Analogous to EQs. 13 and 14, the rate of contamination change, $\gamma_s(v)$ and $\gamma_g(v)$, in the sample flowline 24 and the guard flowline 26 may be determined as follows:

$$\gamma_s(v) = \frac{-1}{C_{water} - C_{WBM\ filtrate}} \frac{\partial C_s(v)}{\partial v} \qquad \text{EQ. 20}$$

$$\gamma_G(v) = \frac{-1}{C_{water} - C_{WBM\ filtrate}} \frac{\partial C_g(v)}{\partial v} \qquad \text{EQ. 21}$$

The ratio of contamination change between the guard flowline 26 and the sample flowline 24 may be written as a function of flowline conductivity, as shown in EQ. 22:

$$\tau(v) = \frac{\gamma_s(v)}{\gamma_g(v)} = \frac{\frac{\partial C_s(v)}{\partial v}}{\frac{\partial C_g(v)}{\partial v}} \qquad \text{EQ. 22}$$

The methods disclosed herein may be performed using discrete sensors (e.g., two calibrated conductivity cells).

However, sensor offset, different dynamic responses, or variations in responses may result in inaccurate estimations of the contamination. Since the method disclosed herein uses the derivative of measurements, the sensor offset may be mitigated. However, different dynamic responses and/or variations in responses of two discrete sensors may artificially move the location of the break point and, hence, introduce inaccuracies in the estimation of the absolute contamination. Applying a carefully-designed calibration procedure may be a way to mitigate the effects of different dynamic responses and/or variations in responses of two discrete sensors. In any case, applying the disclosed method to discrete sensors may facilitate predicting the cleanup of focused water sample acquisition in a well drilled with water based mud.

Figure 29:
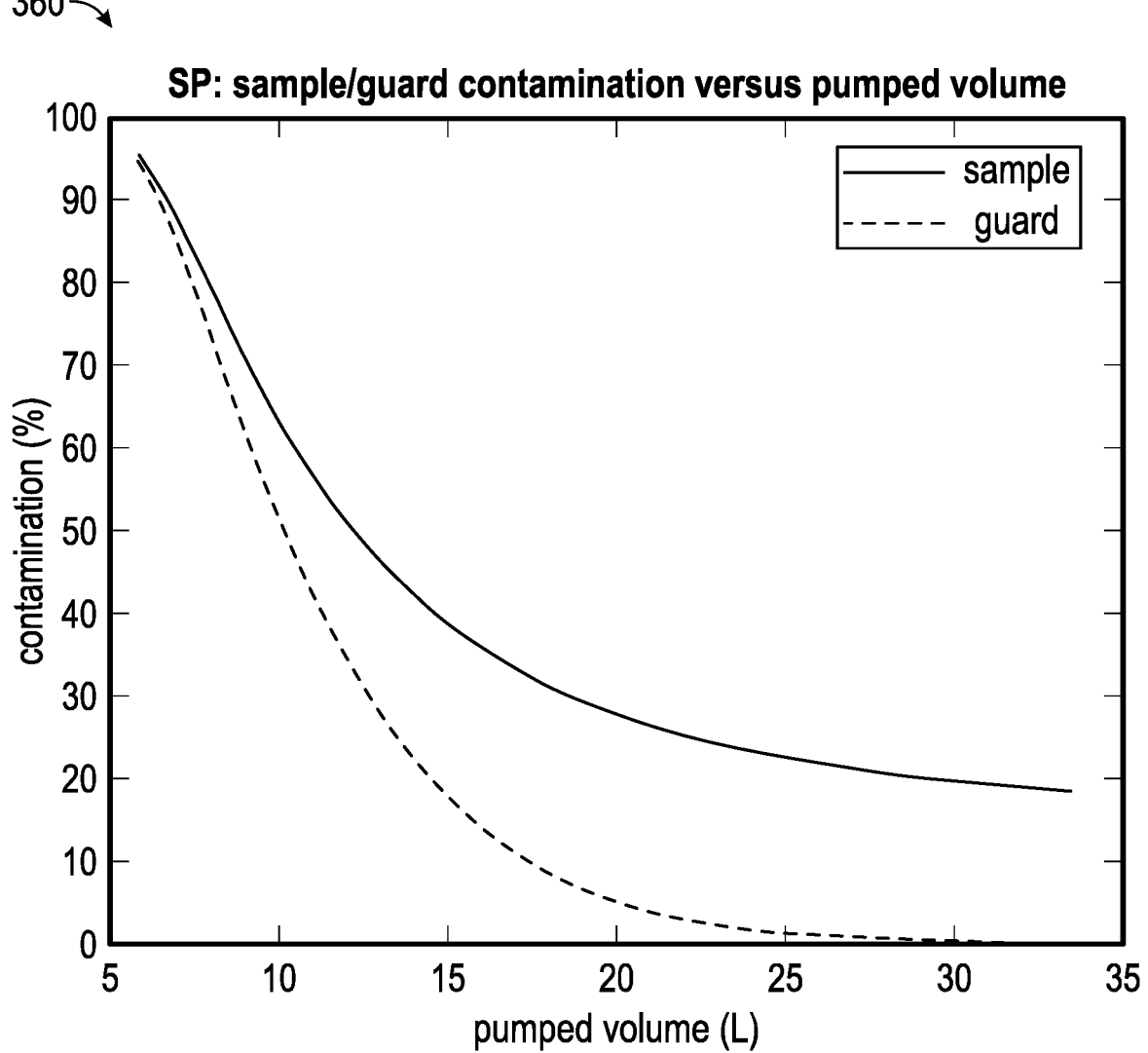
FIG. 29 is an example plot of dynamic behavior of fluid contamination in the sample and guard flowlines of a focused single packer (SP) probe versus the pumped volume (L), in accordance with an example of the present techniques.

Finally, the dynamic behavior of fluid contamination in the sample flowline 24 and the guard flowline 26 using a focused single packer (SP) may also be evaluated, as shown in plot 360 of FIG. 29. The results shown in the plot 360 are obtained from an ECLIPSE simulation model of focused SP with the same fluid and formation parameters as set forth above. Note that the cleanup in the sample flowline 24 is faster than in the guard flowline 26, but the difference is not as dramatic as shown in the Quicksilver case illustrated in FIG. 22.

Figure 30:
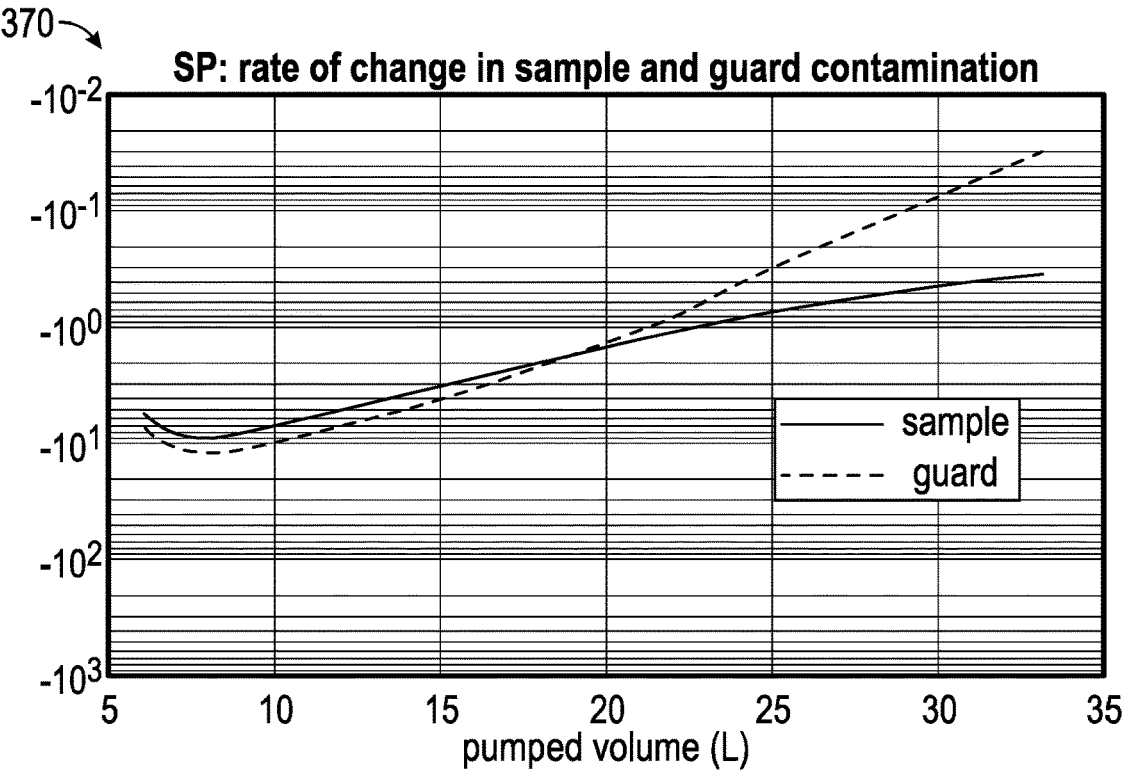
FIG. 30 illustrates example plots of the rates of contamination change (i.e. $\gamma_s(v)$ and $\gamma_g(v)$) in the sample and guard flowlines of FIG. 29 (top) and the ratio (i.e. $\tau(v)$) of two rates (bottom), in accordance with an example of the present techniques.
Figure 30:
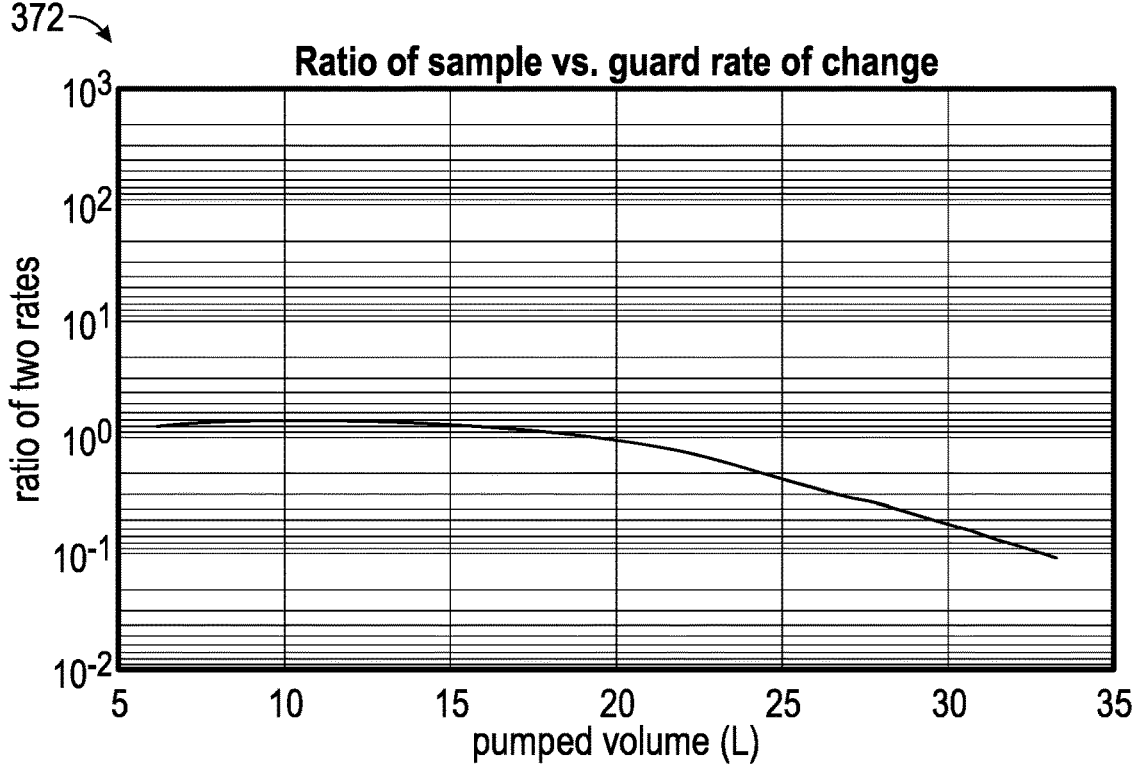

The rates of contamination change (e.g., $\gamma_s(v)$ and $\gamma_g(v)$) in the sample flowline 24 and the guard flowline 26 are shown in plot 370 of FIG. 30. Additionally, the ratio (e.g., $\tau(v)$) of the two rates of contamination change is shown in plot 372 of FIG. 30. In the illustrated example of FIG. 30, the effect of focused sampling is still observable after the breakthrough of the native formation fluid at about 5 L of pumped volume, but the rate of contamination change in the sample flowline 24 is not much larger than the rate of contamination change in the guard flowline 26. The break point is shown in plot 372 as occurring at about 19 L of pumped volume, where the contamination level in the sample flowline 24 is approximately 5 percent, similar to the QS case. The focused 3D radial probe possess a large inlet flow area and allows a faster and a large quantity of fluid pumping with small drawdown. Therefore, the focused 3D radial probe enables more efficient sampling in a low-mobility formation.

An important task for implementing the method disclosed herein is the computation of the OD derivative with respective to the pumped volume. A straightforward numerical differentiation is known to be unstable and sensitive to noise. Therefore, an improved procedure is disclosed herein. In the first step, the OD-vs-volume data is approximated locally around $v_0$ using the following second-order polynomial model:

$$OD(v) = a + b(v - v_0) + c(v - v_0)^2, \ v_0 - \frac{v_w}{2} \leq v \leq v_0 + \frac{v_w}{2} \qquad \text{EQ. 23}$$

where $OD(v)$ is the OD-vs-volume response, $v_0$ and $v_w$ are the center and size of a local volume window. Specifically, the local window slides through the OD-vs-volume data and at each location (specified by $v_0$) the data within the local window are fitted with the model in EQ. 23. Once the fitting is done, "a" represents the filtered/smoothed data at $v_0$, whereas "b" and "c" are related to the first and second derivative of the optical signal response at $v_0$, respectively, e.g., $$OD(v_0) = a \qquad\qquad \text{EQ. 24}$$

$$\left.\frac{dOD}{dv}\right|_{v=v_0} = b \qquad\qquad \text{EQ. 25}$$

$$\left.\frac{d^2 OD}{dv^2}\right|_{v=v_0} = 2c \qquad\qquad \text{EQ. 26}$$

The fitting may be done with the least-squares criterion, as shown in EQ. 27 below.

$$\min_{a,b,c} \sum_{v=v_0 - v_w/2}^{v=v_0 + v_w/2} (M(v) \ OD(v))^2 \qquad\qquad \text{EQ. 27}$$

In EQ. 27, $M(v)$ is the measured optical signal versus volume data. Since the least-squares criterion is not effective in removing the spiky noise or outliers in the data, a robust scheme based on the least-absolute error criterion (e.g., $L_1$-norm) is disclosed. For example, EQ. 28 shows the least-absolute error criterion.

$$\min_{a,b,c} \sum_{v=v_0 - v_w/2}^{v=v_0 + v_w/2} |M(v) \ OD(v)| \qquad\qquad \text{EQ. 28}$$

The fitting with the $L_1$-norm in EQ. 28 may be accomplished (e.g., the parameters a, b and c are solved) using an iterative re-weighted least-squares (IRWLS) algorithm.

As noted above, the computed ratio $\tau(v)$ can be used to determine the efficiency of focused sampling operation. This value may be large after the initial breakthrough and subsequently drops with continuous pumping until reaching the breakpoint characterized by $\tau(v)=1$. Dropping below 1 means that continuous pumping may reduce the contamination level in the guard flowline 26 faster than reducing the contamination level in the sample flowline 24. Normally, this may also suggest that the contamination level in the sample flowline 24 is low (e.g. a few percent) at the break point.

Figure 31:
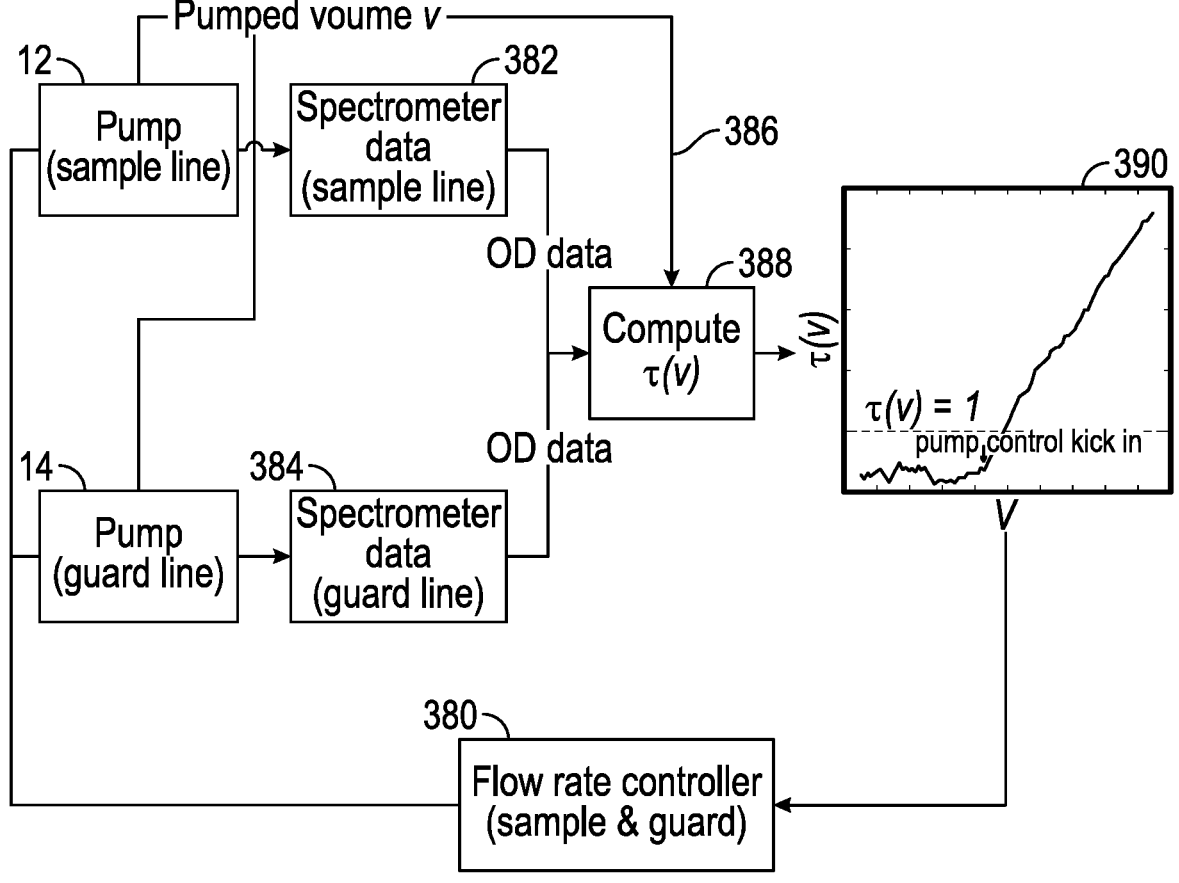
FIG. 31 is a diagram of usage of the indicator $\tau(v)$ for the closed-loop control of improved efficiency of focused sampling operation, in accordance with an example of the present techniques.

The computed ratio $\tau(v)$ can be used as an indicator for real-time monitoring and control of the pumps 12, 14. Initially, the value of the computed ratio $\tau(v)$ hovers around 1 or below 1 after the breakthrough, indicating a poor performance of focused sampling operation. The flowrates of the sample flowline pump 12 and the guard flowline pump 14 may be adjusted to improve the efficiency of focused sampling. Whether the manipulation of flowrates would achieve improved efficiency can be visualized and realized by the display of indicator $\tau(v)$ in real-time. For example, FIG. 31 illustrates usage of the indicator $\tau(v)$ for the closed-loop control of improved efficiency of a focused sampling operation. As shown in the illustrated example of FIG. 31, a flow rate controller 380 is utilized to control the pumps 12, 14 based on the indicator $\tau(v)$. For instance, first spectrometer data 382 from the sample optical spectrometer 28, second spectrometer data 384 from the guard optical spectrometer 30, and pumped volume data 386 (e.g., from the pumps 12, 14) are utilized to calculate the indicator $\tau(v)$, as shown at block 288. In some examples, the indicator $\tau(v)$ is calculated as a function of the pumped volume data 386 to form a plot 390. Based on the calculated indicator $\tau(v)$ and/or the plot 390, the flow rate controller 380 may adjust a speed of the pumps 12, 14. After the pump control kicks in, the value of $\tau(v)$ increases and ultimately exceeds a value of 1. This may suggest the improved efficiency of the focused sampling operation with the manipulating the pump flow rates.

Another application of $\tau(v)$ is the estimation of contamination level in the sample flowline 24. Four parameters may affect the dynamic behavior of a focused sampling operation. These parameters include permeability (e.g., $k_h$) and its anisotropy (i.e. $k_v/k_h$), the viscosity contrast between the filtrate and the formation fluid, and the depth of invasion (DOI) of the mud filtrate. The effect of these parameters on the computed $\tau(v)$ for the case of Quicksilver sampling probe are described below.

Figure 32:
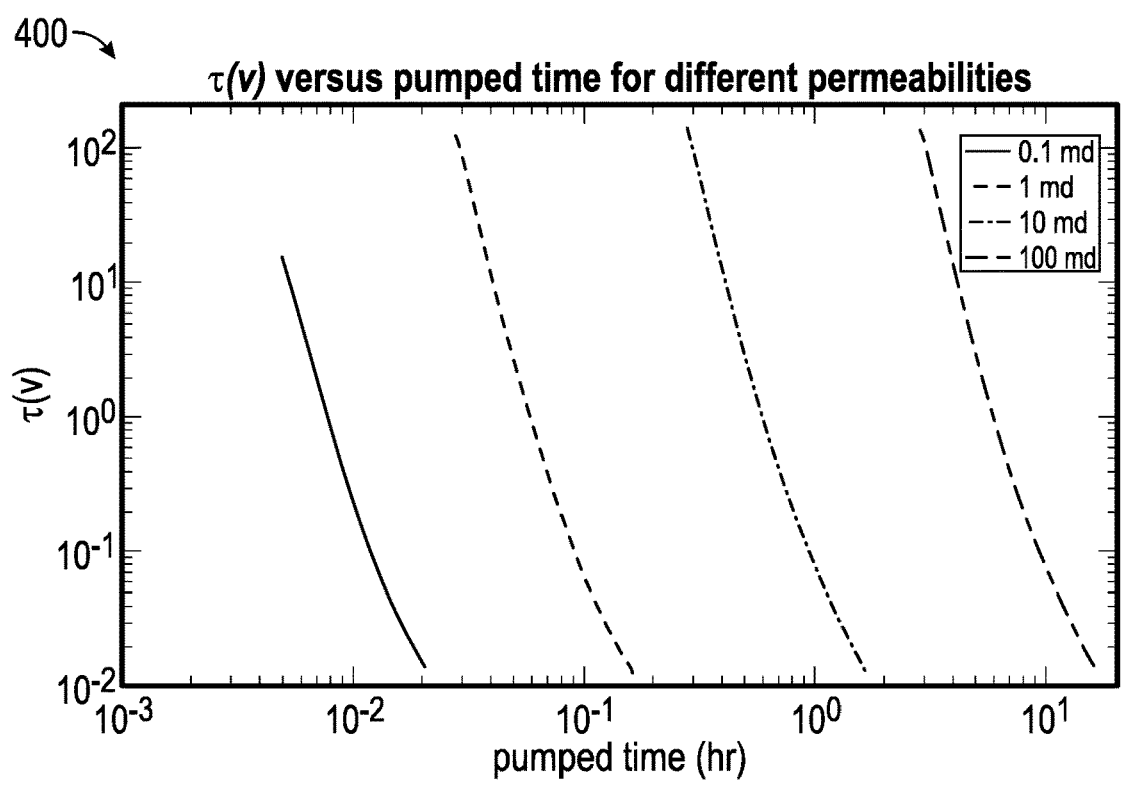
FIG. 32 illustrates example plots of $\tau(v)$ versus the pumped time (top) and $\tau(v)$ versus the contamination level in the sample flowline (bottom) for different absolute permeability, in accordance with an example of the present techniques.
Figure 32:
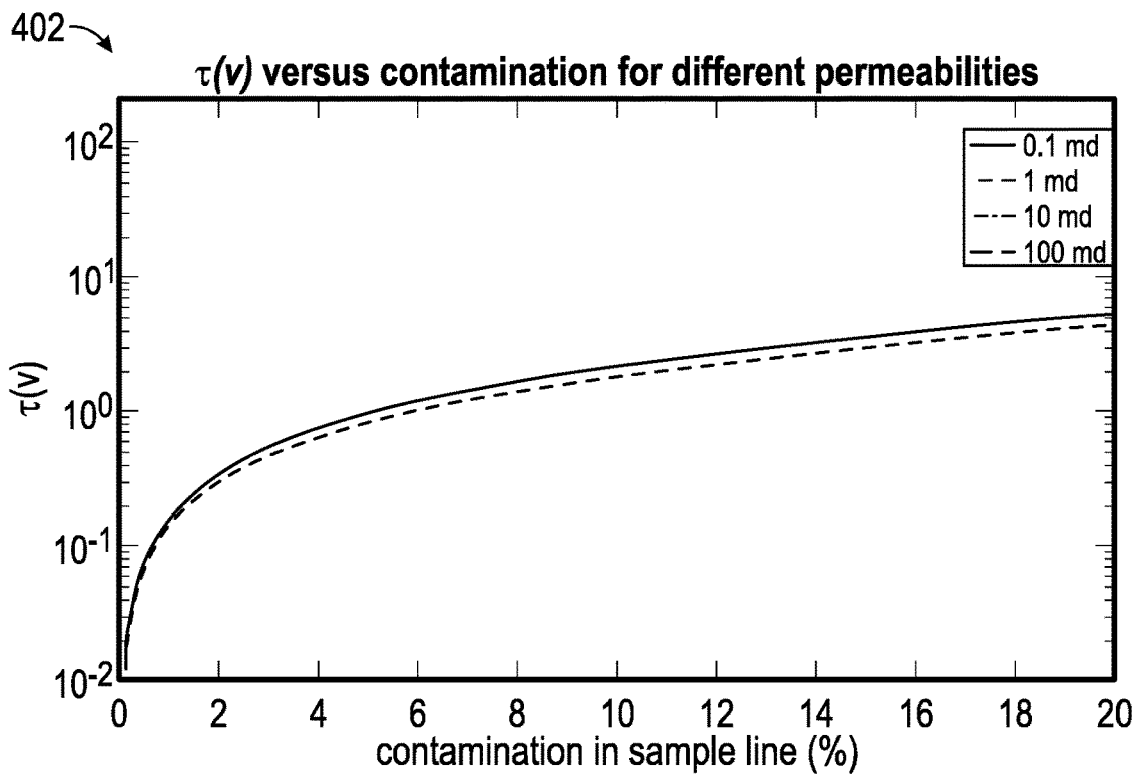

As noted in the example of FIG. 22, the absolute permeability $k_h$ may be changed, while the remaining parameters remain fixed. FIG. 32 illustrates a plot 400 of $\tau(v)$ versus pumped time (in hours) at different absolute permeabilities, $k_h$, and a plot 402 of $\tau(v)$ versus the contamination level in the sample flowline 24 at different absolute permeabilities, $k_h$. The plots 400, 402 show the results of ECLIPSE simulations for $k_h=0.1$ md, 1 md, 10 md, and 100 md. As illustrated in FIG. 32, the absolute permeability of a formation may affect the breakthrough time: the higher the permeability, the faster the breakthrough time. Furthermore, it may take longer to reach the same level of contamination (or the same level of $\tau(v)$) for low permeability formations. However, the plot 402 shows an invariant behavior in $\tau(v)$ versus the contamination in the sample flowline 24. That is, the computed $\tau(v)$ may be used to estimate the contamination level in the sample flowline 24 regardless of absolute permeability. For example, the contamination level in the sample flowline 24 is between approximately 5-6 percent at the break point (i.e. $\tau(v)=1$).

Figure 33:
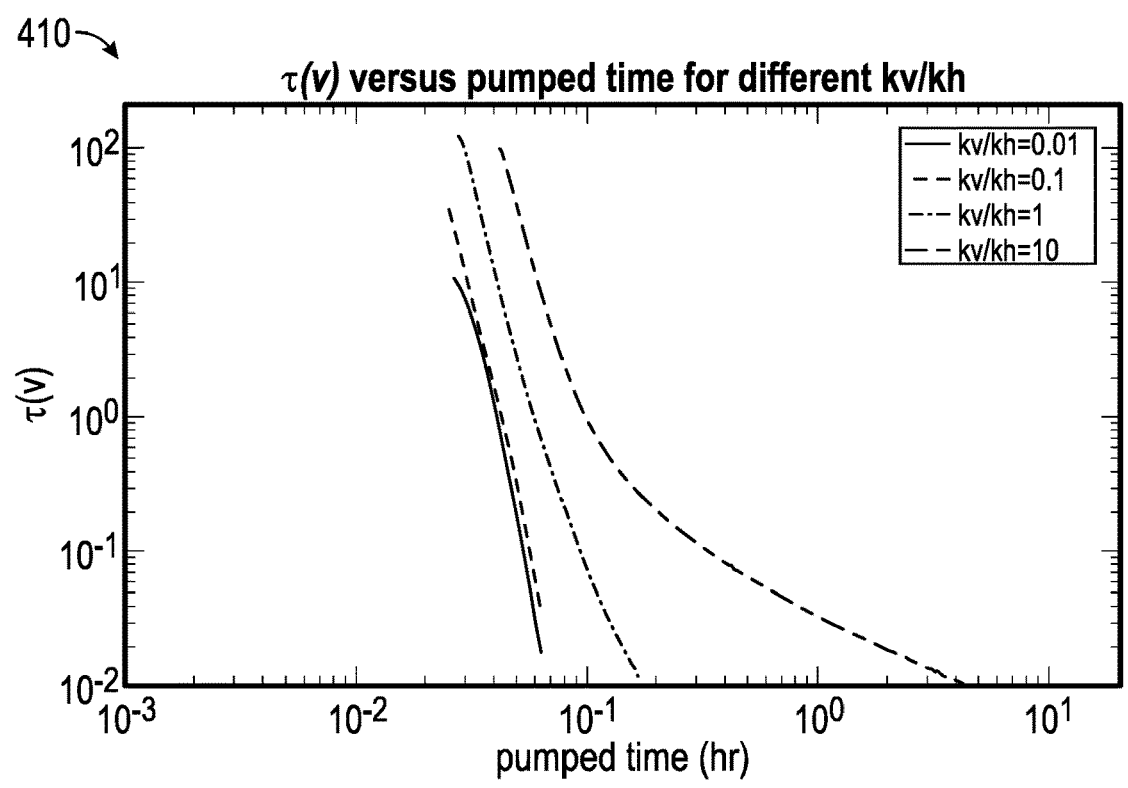
FIG. 33 illustrates example plots of $\tau(v)$ versus the pumped time (top) and $\tau(v)$ versus the contamination level in the sample flowline (bottom) for different anisotropies, in accordance with an example of the present techniques.
Figure 33:
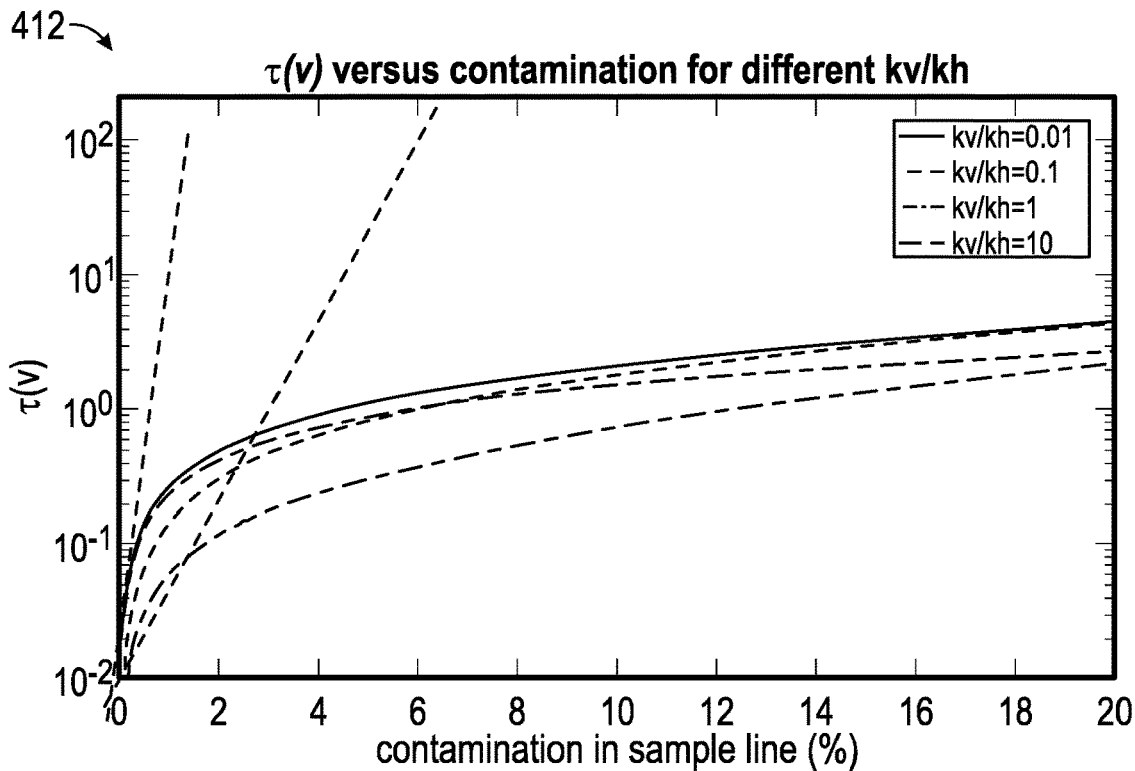

The permeability anisotropy (e.g., $k_v/k_h$), however, affects the results differently from absolute permeability. For example, FIG. 33 illustrates a plot 410 of $\tau(v)$ versus pumped time (in hours) at different permeability anisotropies, $k_v/k_h$, and a plot 412 of $\tau(v)$ versus the contamination level in the sample flowline 24 at different permeability anisotropies, $k_v/k_h$. In the example illustrated in FIG. 33, $k_v/k_h$ is changed (e.g., 0.01, 0.1, 1 and 10), while the remaining parameters in the ECLIPSE simulations are maintained at fixed values. With, $k_v/k_h \leq 1$, the curves of $\tau(v)$ versus contamination in the sample flowline in the plot 412 are closely bundled together with similar behavior. For example, the contamination level is between approximately 5-6 percent at the breakpoint (e.g., $\tau(v)=1$). For $k_v/k_h=10$, however, the curve deviates from the bundle, showing an increasing uncertainty for estimating the contamination using $\tau(v)$. However, the funnel shape (i.e. dotted lines) of all curves converges at low contamination, implying reduced uncertainty of the estimate of contamination at high permeability anisotropies if the desirable contamination level for collecting sampled fluid is as low as a few percent.

Figure 34:
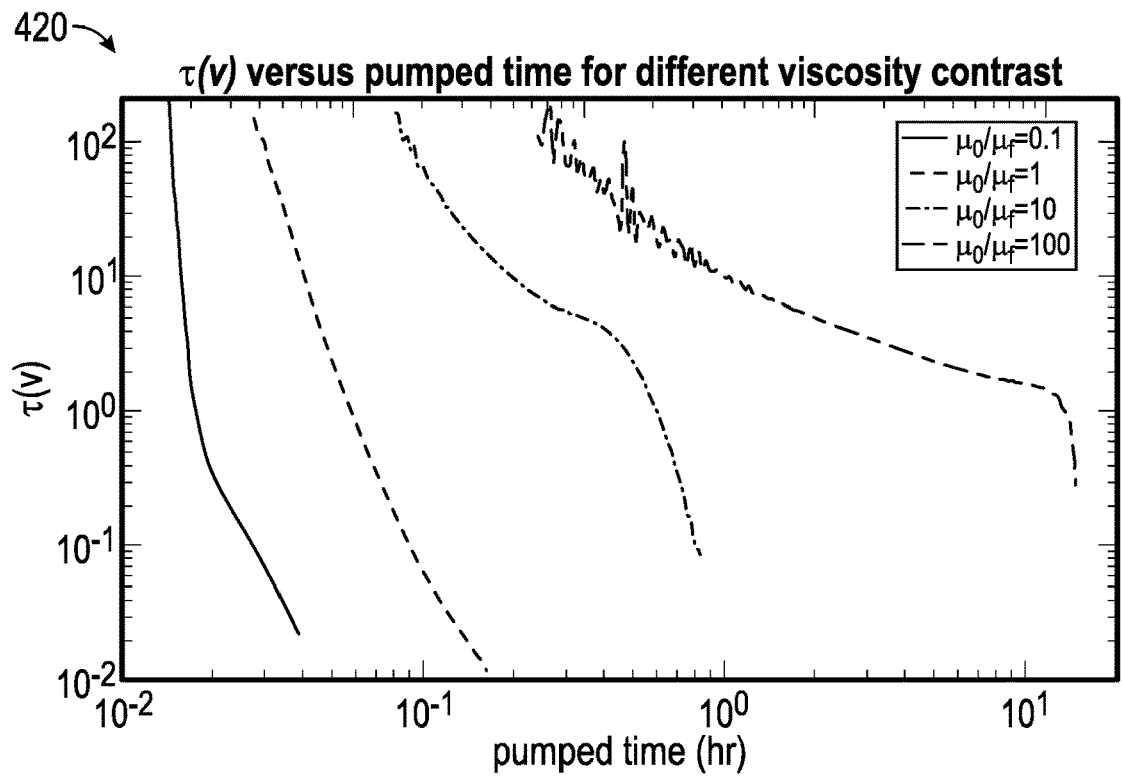
FIG. 34 illustrates example plots of $\tau(v)$ versus the pumped time (top) and $\tau(v)$ versus the contamination level in the sample flowline (bottom) for different formation fluid to filtrate viscosities, in accordance with an example of the present techniques.
Figure 34:
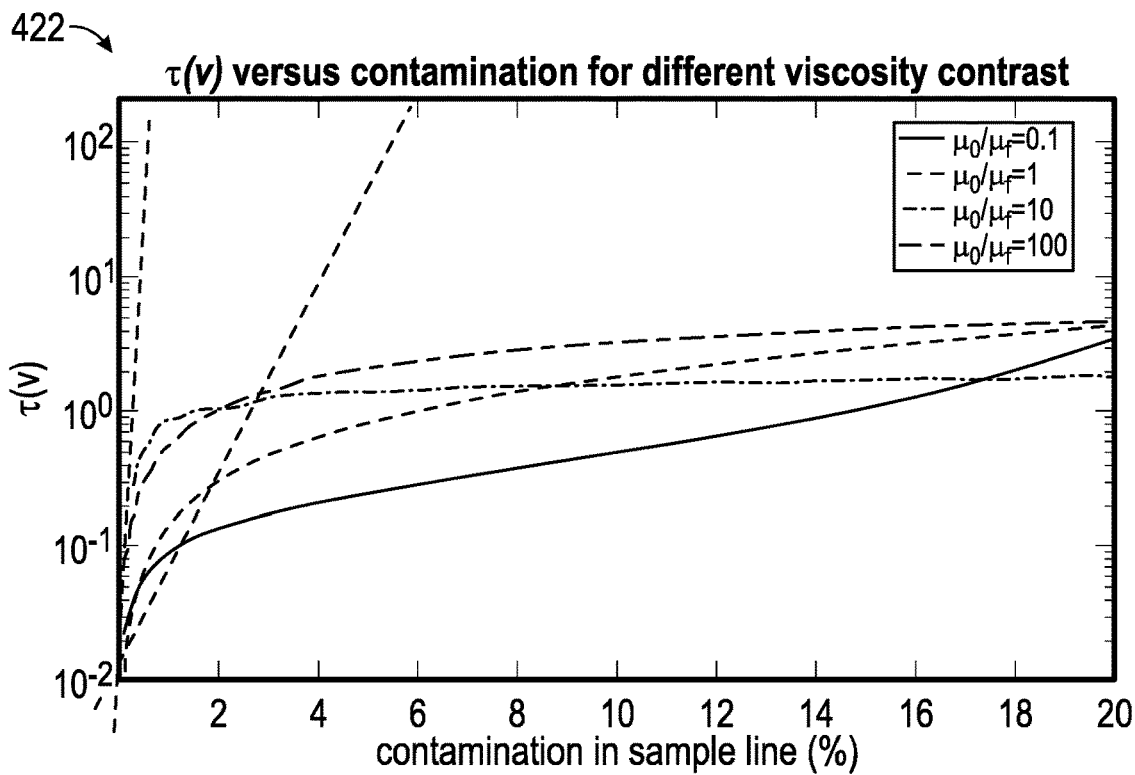

A viscosity contrast between filtrate and the formation fluid also affects the estimate of contamination using $\tau(v)$, as shown in FIG. 34. This may occur for heavy oil or gas sampling where the viscosity contrast is expected to be large. In the ECLIPSE simulations, the filtrate viscosity is fixed at 1 cp, while the formation fluid viscosity is changed from 0.1 cp (gas), 1 cp, 10 cp, and 100 cp (heavy oil) with other parameters in the ECLIPSE simulations maintained at fixed values. FIG. 34 illustrates the results of computed $\tau(v)$ versus pumped time (in hours) for various viscosity contrasts in plot 420. Additionally, FIG. 34 illustrates the results of computed $\tau(v)$ versus contamination in the sample flow line 24 for various viscosity contrasts in plot 422. For gas sampling with low viscosity contrast (e.g. $\mu_o/\mu_f=0.1$), the cleanup occurs relatively quickly. However, a lower value of τ(v) may be needed to identify low contamination. In other cases, including the heavy oil case, the break point is a good indicator of contamination lower than 10 percent. The funnel-shape for each of the curves occurs at relatively low contamination (e.g., a few percent), which indicates a reduction in uncertainty of the estimation of contamination using the disclosed method.

Figure 35:
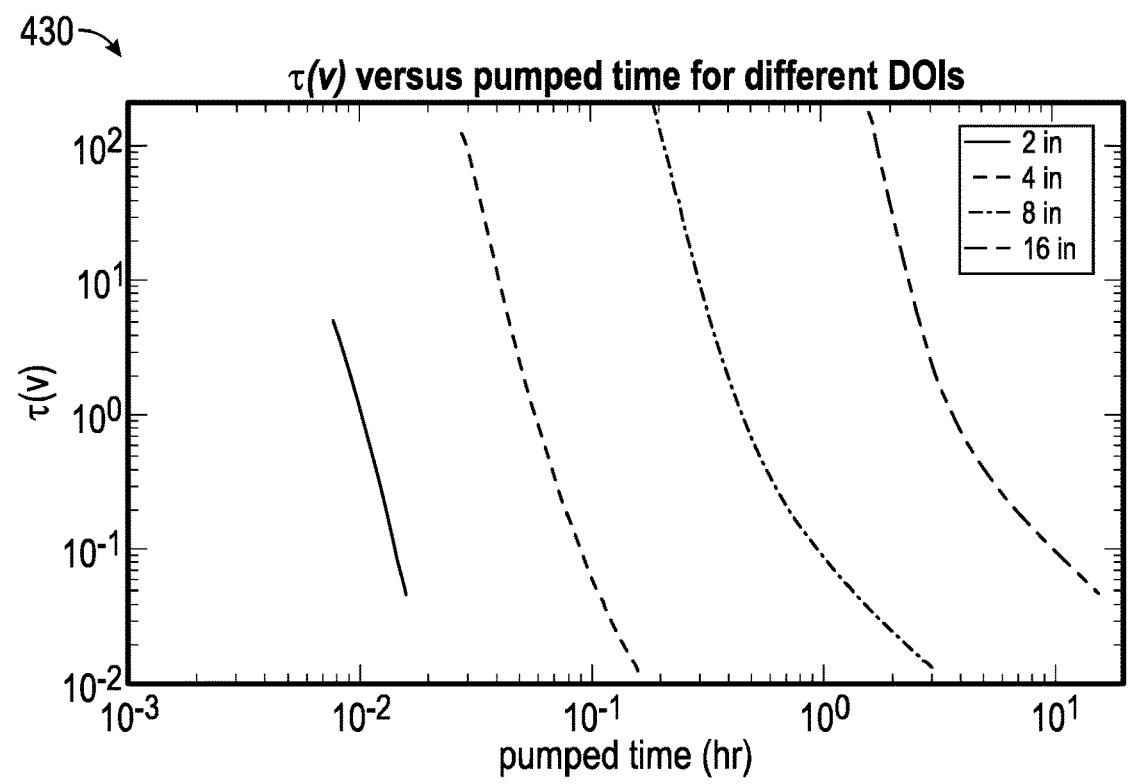
FIG. 35 illustrates example plots of $\tau(v)$ versus the pumped time (top) and $\tau(v)$ versus the contamination level in the sample flowline (bottom) for different depths of invasion, in accordance with an example of the present techniques.
Figure 35:
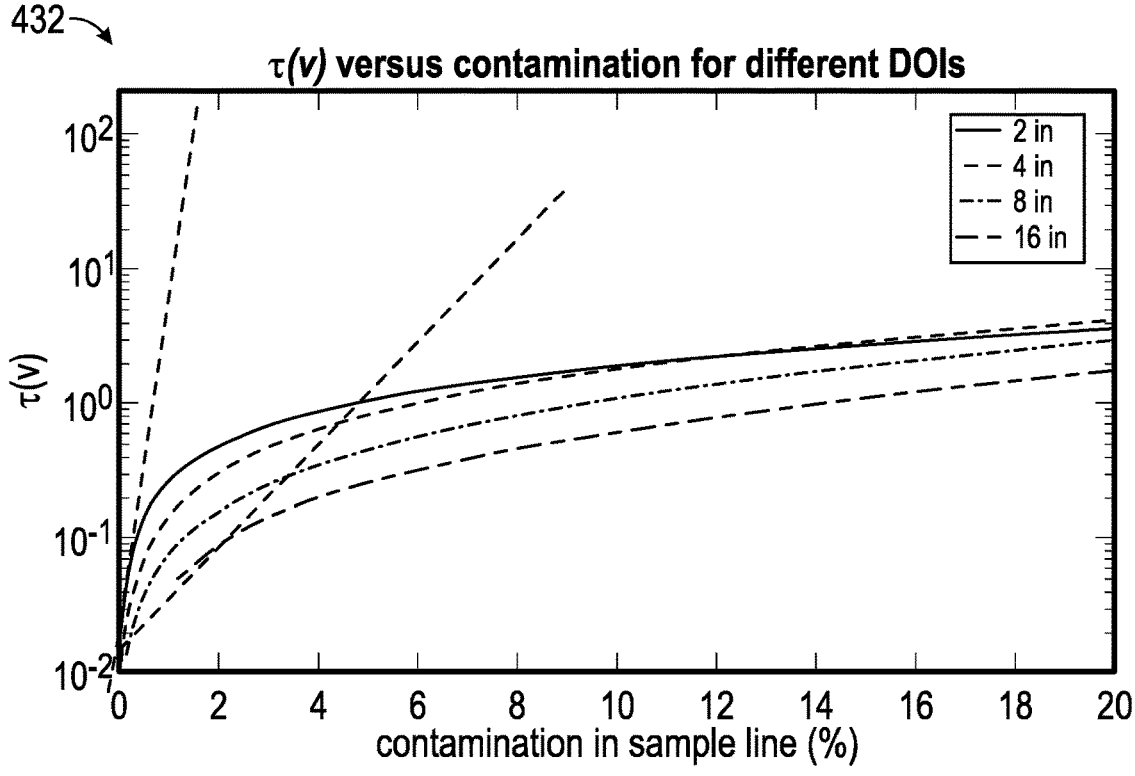

Depth of invasion (DOI) may also affect the estimation of contamination using τ(v). For instance, FIG. 35 illustrates a plot 430 of computed τ(v) versus pumped time (in hours) for different DOI's and a plot 432 of computed τ(v) versus contamination for different DOI's. As shown in the illustrated example of FIG. 35, the deeper DOI's takes a relatively long time to break through and a relatively long time to cleanup, similar to the effects of low absolute permeability. However, the computed τ(v) versus the contamination in the sample flowline 24 do not merge together as in the case of absolute permeability. Nevertheless, the funnel-shape convergence at low contamination is still observed, meaning a large reduction of uncertainty as discussed above.

Figure 36:
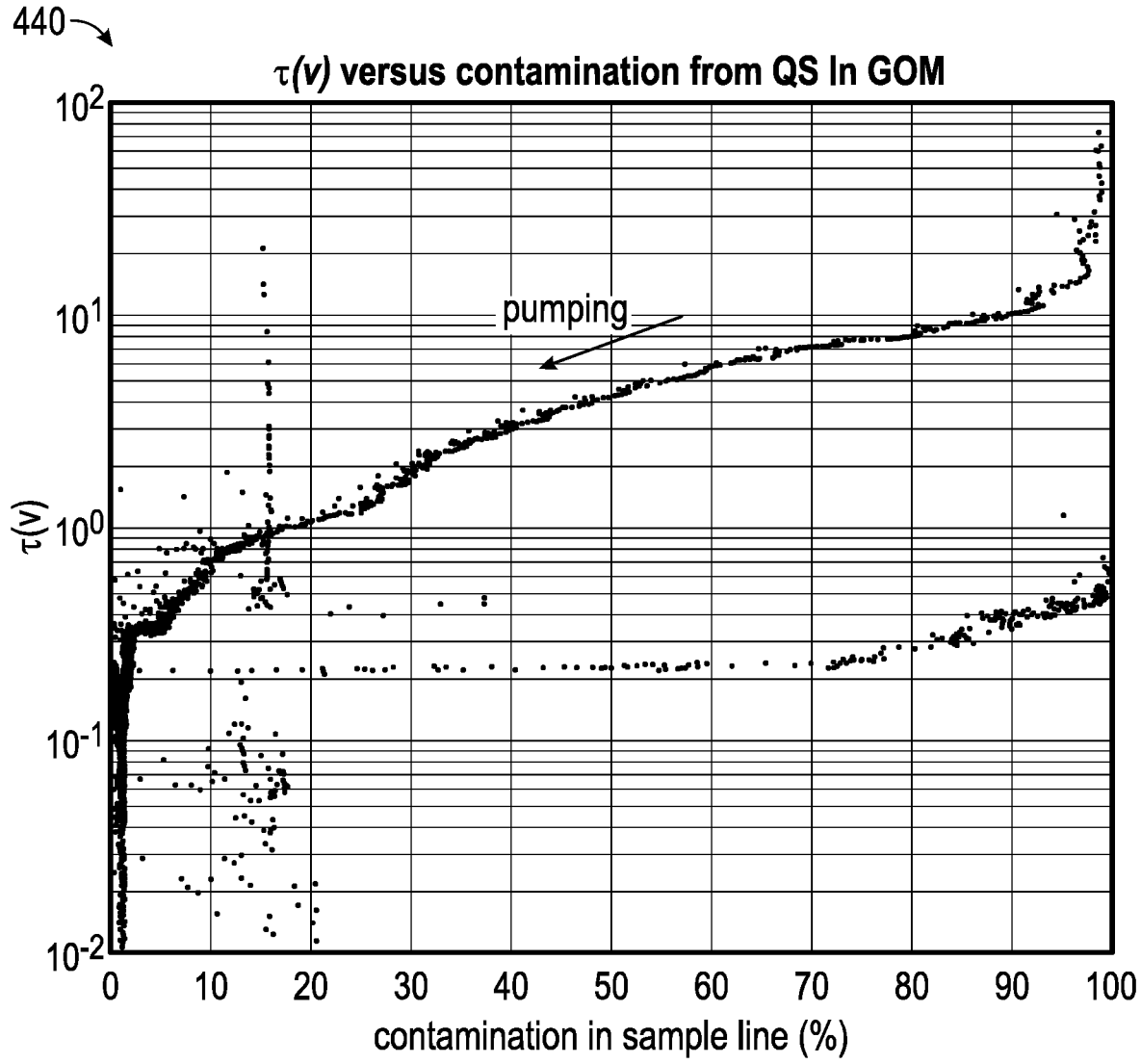
FIG. 36 is a plot of computed $\tau(v)$ versus the estimated contamination in the sample flowline for the GOM focused sampling data shown in FIGS. 27 and 28, in accordance with an example of the present techniques.

FIG. 36 is a plot 440 of the computed τ(v) versus the estimated contamination in the sample flowline 24 for the GOM focused sampling data shown in FIGS. 27 and 28. In this example, a live fluid sample was taken at the end of pumping. The PVT analysis of the sample shows the contamination level of 3.7 percent, which may be used to back-calculate the OD value of formation fluid end point. The end point value and the acquired OD measurements in FIG. 27 are then used to estimate the contamination over the entire station interval. A similar dynamic response as predicted by the ECLIPSE simulations in FIGS. 32-35 is observed: a large τ(v) initially at high contamination, followed by a decreasing trend with continuous pumping and a funnel-shape behavior at very low contamination.

In summary, the proposed indicator to estimate the contamination level in the sample flowline eliminates the pitfalls of fitting power law models for extrapolation in order to obtain the end points. Another added benefit of the present disclosure is that the uncertainty of a contamination estimate is substantively reduced if the desirable contamination level for collecting sampled fluid is as low as a few percent.

The foregoing outlines features of several example so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the example introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method comprising:
receiving, using a first sensor coupled to a sample flowline of a focused sampling system, first optical density data of a native formation fluid drawn into the sample flowline from a hydrocarbon reservoir via a first pump;
receiving, using a second sensor coupled to a guard flowline of the focused sampling system, second optical density data of a contaminant fluid drawn into the guard flowline from the hydrocarbon reservoir via a second pump;

combining the first optical density data and the second optical density data to generate combined optical density data;
determining a derivative of the combined optical density data as a function of pumped volume of the native formation fluid through the sample flowline and the contaminant fluid through the guard flowline;
performing a linear analysis based on the combined optical density data with respect to the derivative of the combined optical density data to determine an intercept, wherein the linear analysis includes a fitting of the combined optical density data with the derivative of the combined optical density data multiplied by pumped volume, and wherein the fitting includes a weighted least squares algorithm that assigns higher weights to most recent data points of the combined optical density data and the derivative of the combined optical density data multiplied by pumped volume;
estimating a contamination profile of the native formation fluid based on the intercept and the combined optical density data; and
adjusting, by an electronic controller based at least in part on the contamination profile, the first pump to adjust a native fluid flow rate of the native formation fluid through the sample flowline or the second pump to adjust a contaminant fluid flow rate of the contaminant fluid through the guard flowline.

2. The method of claim 1, wherein the first optical density data includes a plurality of first optical density data points measured at a plurality of wavelengths, and wherein the second optical density data includes a plurality of second optical density data points measured at the plurality of wavelengths.

3. The method of claim 2, wherein performing the linear analysis includes iteratively performing the linear analysis based on the combined optical density data and the derivative of the combined optical density data at each wavelength of the plurality of wavelengths to determine a plurality of intercepts.

4. The method of claim 3, wherein iteratively performing the linear analysis to determine the plurality of intercepts includes using a RANSAC algorithm.

5. The method of claim 1, wherein performing the linear analysis to determine the intercept includes using the Beer-Lambert law.

6. The method of claim 1, wherein performing the linear analysis to determine the intercept includes performing the linear analysis after a target amount has passed through one or both of the sample flowline and the guard flowline.

7. The method of claim 1, further comprising adjusting, by the electronic controller based at least in part on the contamination profile, a valve of the focused sampling system to cause a portion of the native formation fluid to enter a sample bottle from the sample flowline.

8. The method of claim 1, wherein the native formation fluid is pumped through the sample flowline in a flow direction by the first pump, and wherein the first pump is coupled to the sample flowline upstream of the first sensor in the flow direction.

9. The method of claim 1, wherein determining the derivative of the combined optical density data includes determining the derivative according to:

$$OD = C - \frac{1}{\alpha}\frac{dOD}{dv}v$$

where OD is the combined optical density data, v is the pumped volume, C is the intercept, and α is an exponent of power-law for evolving contamination.

10. A focused sampling system, comprising:

a sample flowline;

a first pump coupled with the sample flowline, the first pump configured to draw a native formation fluid into the sample flowline from a hydrocarbon reservoir;

a guard flowline;

a second pump coupled with the guard flowline, the second pump configured to draw a contaminant fluid into the guard flowline from the hydrocarbon reservoir;

a first sensor coupled to the sample flowline and configured to generate first feedback indicative of a first optical density of the native formation fluid drawn into the sample flowline by the first pump;

a second sensor coupled to the guard flowline and configured to generate second feedback indicative of a second optical density of the contaminant fluid drawn into the guard flowline by the second pump; and a controller communicatively coupled to the first sensor and the second sensor, the controller configured to:

receive the first feedback and the second feedback;

combine the first optical density of the native formation fluid and the second optical density of the contaminant fluid to generate combined optical density data;

determine a derivative of the combined optical density data as a function of pumped volume of the native formation fluid through the sample flowline and the contaminant fluid through the guard flowline;

perform linear analysis on the combined optical density data with respect to the derivative of the combined optical density data to determine an intercept, wherein the linear analysis includes a fitting of the combined optical density data with the derivative of the combined optical density data multiplied by pumped volume, and wherein the fitting includes a weighted least squares algorithm that assigns higher weights to most recent data points of the combined optical density data and the derivative of the combined optical density data multiplied by pumped volume;

estimate a contamination profile of the native formation fluid based on the intercept and the combined optical density data; and adjust, based at least in part on the contamination profile, the first pump to adjust a native fluid flow rate of the native formation fluid through the sample flowline or the second pump to adjust a contaminant fluid flow rate of the contaminant fluid through the guard flowline.

11. The focused sampling system of claim 10, wherein the sample flowline and the guard flowline are fluidly coupled to a 3-dimensional radial probe configured to contact a sampling zone of the hydrocarbon reservoir.

12. The focused sampling system of claim 10, wherein first sensor comprises a first optical spectrometer and the second sensor comprises a second optical spectrometer separate and distinct from the first optical spectrometer.

13. The focused sampling system of claim 10, further comprising:

a sample bottle and a valve, the sample bottle configured to collect the native formation fluid from the sample flowline via the valve, wherein the controller is further configured to adjust, based at least in part on the contamination profile, the valve to direct the native formation fluid to the sample bottle.

14. The focused sampling system of claim 10, wherein the first pump is not coupled to the guard flowline and the second pump is not coupled to the sample flowline.

15. The focused sampling system of claim 10, wherein the first pump is configured to pump the native formation fluid through the sample flowline in a flow direction, and wherein the first pump is coupled to the sample flowline upstream of the first sensor in the flow direction.

16. The focused sampling system of claim 10, wherein the second sensor is separate and distinct from the first sensor.

17. A method, comprising:

receiving from a first sensor coupled to a sample flowline of a focused sampling system, a plurality of first data points associated with a native formation fluid pumped through the sample flowline via a first pump, wherein the plurality of first data points are indicative of a first optical density of the native formation fluid as a first function of pumped volume of the native formation fluid through the sample flowline;

receiving from a second sensor coupled to a guard flowline of the focused sampling system, a plurality of second data points associated with a contaminant fluid pumped through the guard flowline via a second pump, wherein the plurality of second data points are indicative of a second optical density of the contaminant fluid as a second function of pumped volume of the contaminant fluid through the guard flowline;

combining the plurality of first data points and the plurality of second data points to generate combined data;

calculating a derivative of the combined data over the pumped volume of the native formation fluid through the sample flowline, the pumped volume of the contaminant fluid through the guard flowline, or both;

performing a linear analysis based on the combined data with respect to the derivative of the combined data to determine an intercept, wherein the linear analysis includes a fitting of the combined data with the derivative of the combined data multiplied by pumped volume, and wherein the fitting includes a weighted least squares algorithm that assigns higher weights to most recent data points of the combined data and the derivative of the combined data multiplied by pumped volume;

receiving a measured optical density of the contaminant fluid;

estimating a contamination profile of the native formation fluid based on the intercept and the measured optical density of the contaminant fluid; and adjusting, by an electronic controller based at least in part on the contamination profile, the first pump to adjust a native fluid flow rate of the native formation fluid through the sample flowline or the second pump to adjust a contaminant fluid flow rate of the contaminant fluid through the guard flowline.

18. The method of claim 17, wherein the plurality of first data points are indicative of the first optical density of the native formation fluid as the first function of pumped volume of the native formation fluid through the sample flowline at a plurality of wavelengths, and wherein the plurality of second data points are indicative of the second optical density of the contaminant fluid as the second function of pumped volume of the contaminant fluid through the guard flowline at the plurality of wavelengths.

19. The method of claim 18, further comprising receiving a plurality of reference data points indicative of a third optical density of the native formation fluid as the first function of pumped volume of the native formation fluid through the sample flowline at a reference wavelength.

20. The method of claim 19, further comprising validating and filtering the plurality of first data points, the plurality of second data points, or both, based on the plurality of reference data points before combining the plurality of first data points and the plurality of second data points to generate the combined data.

* * * * *